(12) United States Patent
Sato et al.

(10) Patent No.: US 6,203,003 B1
(45) Date of Patent: Mar. 20, 2001

(54) ORIGINAL CARRYING APPARATUS FOR SCANNING ORIGINAL BEING MOVED

(75) Inventors: Chikara Sato, Hachioji; Katsuya Yamazaki, Toride; Yasuo Fukazu, Abiko; Takayuki Fujii, Tokyo; Yuzoh Matsumoto, Toride, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/236,585

(22) Filed: Jan. 26, 1999

(30) Foreign Application Priority Data

Jan. 27, 1998 (JP) .................................................. 10-014530

(51) Int. Cl.$^7$ ...................................................... B65H 5/22
(52) U.S. Cl. ..................... 271/3.01; 271/4.01; 271/10.01; 271/265.01; 271/258.01
(58) Field of Search .................................. 271/3.01, 3.14, 271/4.01, 10.01, 265.01, 258.01, 270

(56) References Cited

U.S. PATENT DOCUMENTS

| | | | |
|---|---|---|---|
| 4,579,327 | * 4/1986 | Furuichi | 271/3.01 |
| 5,347,352 | * 9/1994 | Morigami et al. | 271/3.01 |
| 5,535,012 | 7/1996 | Matsumoto et al. | 358/400 |
| 5,580,045 | 12/1996 | Matsumoto et al. | 271/298 |
| 5,656,187 | 8/1997 | Miyamoto et al. | 219/216 |
| 5,842,079 | 11/1998 | Miyamoto et al. | 399/33 |
| 6,076,821 | * 6/2000 | Embry et al. | 271/10.01 |

* cited by examiner

Primary Examiner—David H. Bollinger
(74) Attorney, Agent, or Firm—Fitzpatrick, Cella, Harper & Scinto

(57) ABSTRACT

An original carrying apparatus includes a separation unit for separating one original from a plurality of stacked originals, a carrying roller for carrying the original separated by the separation unit, a carrying belt for receiving the original carried by the carrying roller, and carrying the originals in a state where the plurality of originals are being held, wherein the carrying belt carries the original such that the original passes through an exposure position at a first speed, and a control unit for performing control to set an interval between the two originals carried by the carrying belt to be a first distance. The control unit performs the control to set the interval between the two originals to be the first distance after setting it to be a second distance shorter than the first distance, by using the carrying roller. Further, the control unit accelerates the carrying belt up to a second speed, decelerates the second speed to the first speed to set the second distance to be the first distance.

10 Claims, 50 Drawing Sheets

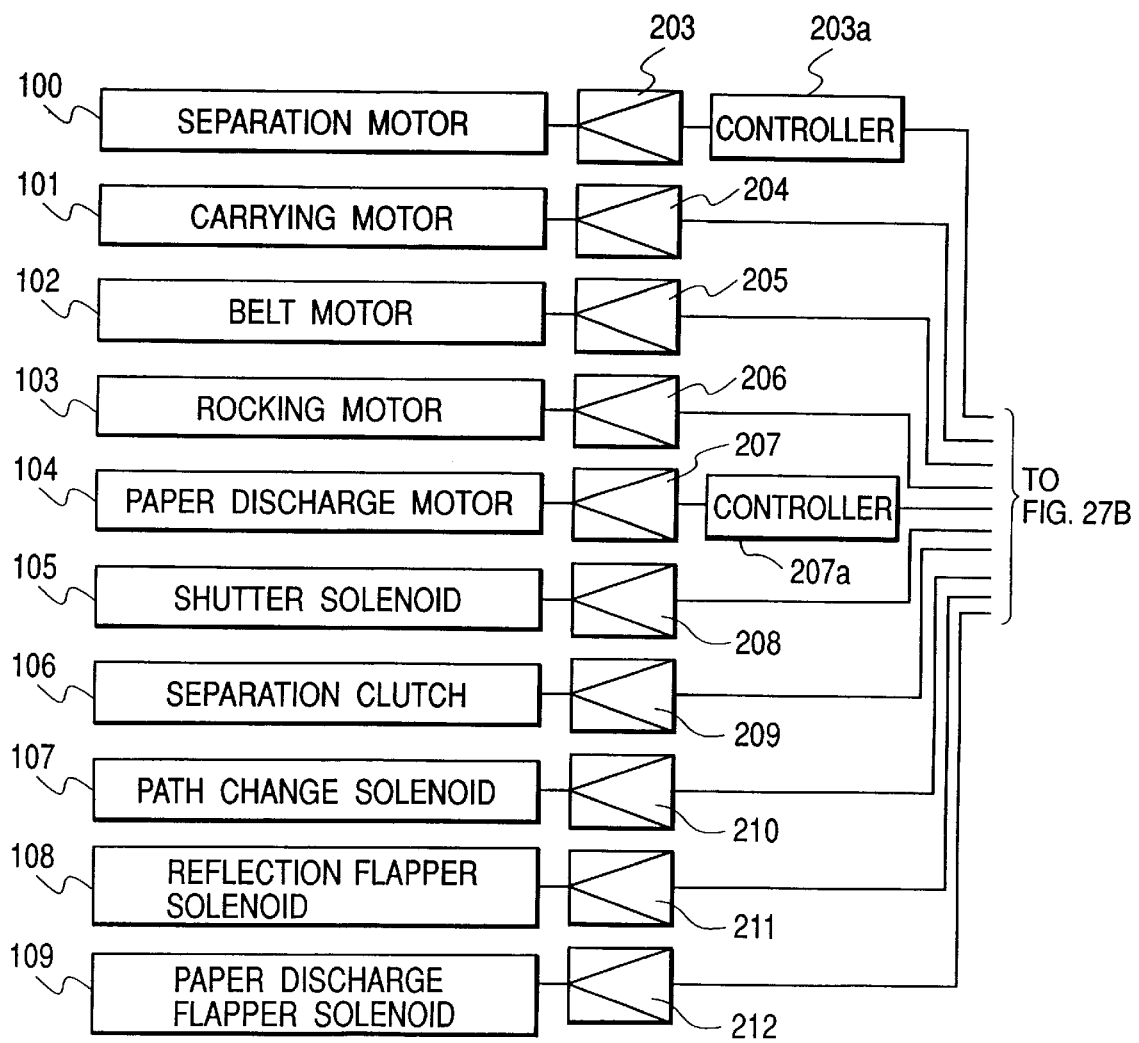

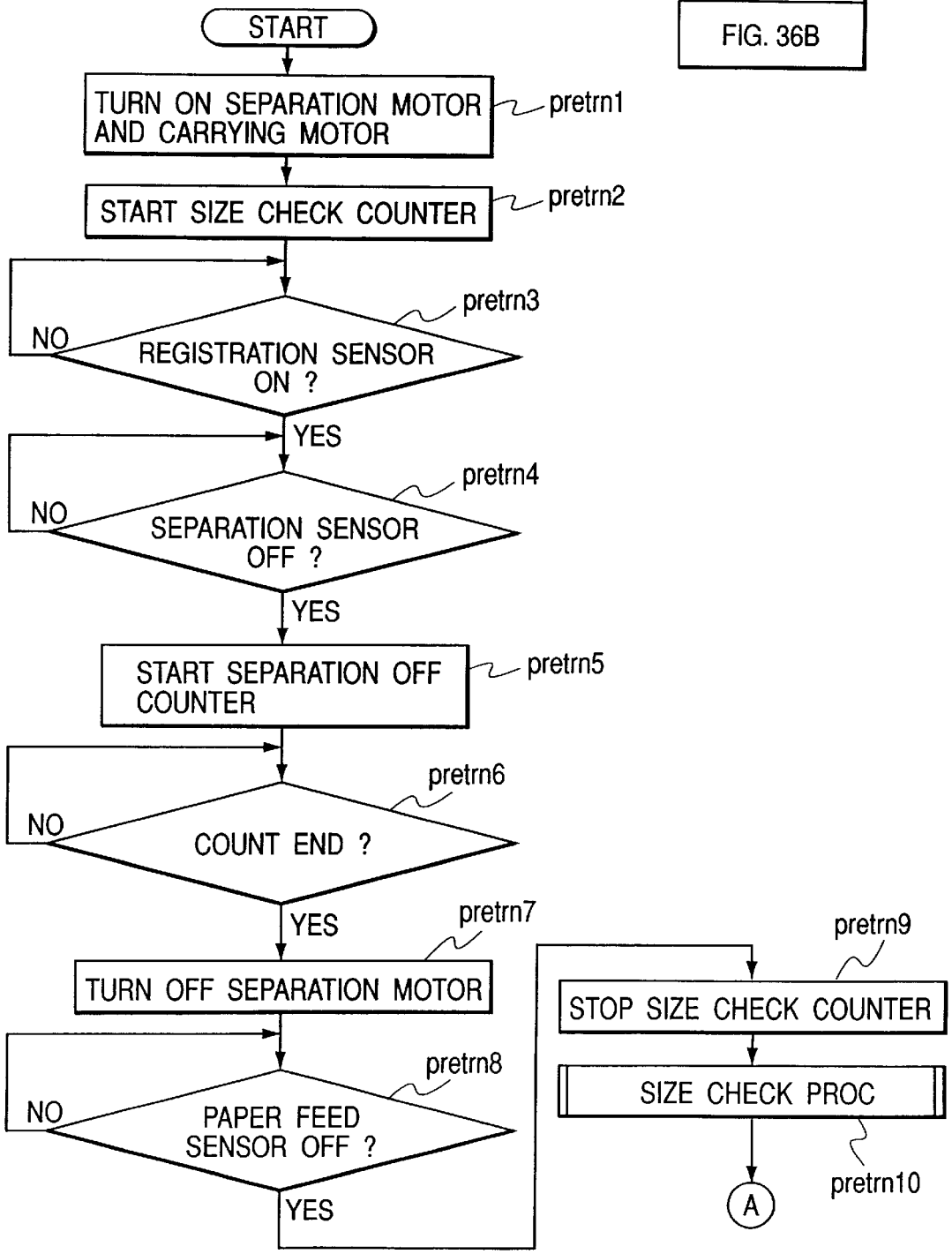

ORIGINAL CARRYING APPARATUS FOR SCANNING ORIGINAL BEING MOVED

BACKGROUND OF THE INVENTION

1. Field of the Invention

The present invention relates to an original carrying apparatus which scans an original being moved.

2. Related Background Art

Conventionally, a method of moving an original in a state that a reader unit (i.e., exposure lamp) is kept still, thereby reading (or exposure scanning) the original has been known. This method is referred to as running reading. In this case a general analog copy machine performs the exposure scanning on the original by moving the exposure lamp from left to right when the original has been put on a platen glass. In a case where the running reading is performed by the analog copy machine, the original is moved from right to left such that a copy image does not become a mirror image (or reflected image). FIG. 46 shows a structure to perform the running reading in the conventional analog copy machine.

When the running reading is performed, the exposure lamp is kept still at a position shown in FIG. 46, and the original is moved by a belt B1 to be exposed. In this case, a distance between an antecedent original Dn−1 and a subsequent original Dn is controlled to be L1 when these originals are being held by the belt B1. In the running reading, driving of the belt B1 is stopped every time original exposure for one paper sheet terminates, and FIG. 46 shows such a state. The distance L1 is the sum of distances L6 and L5. The distance L6 is the distance which is necessary to perform an operation until rotational speed of the belt B1 is reduced to zero after a trailing edge of the original Dn−1 passes through the exposure lamp, and the distance L5 is the distance which is necessary to perform an operation to accelerate the rotational speed of the stopped belt B1 so as to reach a stable running reading speed.

The distance between the originals Dn−1 and Dn both held by the belt B1 must be established before the original Dn is held by the belt B1. In the conventional analog copy machine, before the once-stopped belt B1 again starts, a next original Dn+1 is carried such that the original Dn+1 reaches a position separated from the original Dn by the distance L1. When the running reading of the document Dn starts, rollers R1 and R2 start rotating in synchronism with the belt B1, and the document Dn+1 is carried to the belt B1 as the distance L1 between the documents Dn and Dn+1 is maintained.

At a time when the document Dn+1 is at the position shown in FIG. 46, a pair of separation rollers R4 is arranged to be apart from the document Dn+1 by a distance L2 such that the document Dn+1 does not get in contact with the rollers R4, because of the following reason. That is, since one of the rollers R4 is rotated in a direction opposite to an original carrying direction, carrying speed of the original is unstable while the rollers R4 hold the original. Thus, when the rollers R1 and R2 and the belt B1 synchronously start moving, if the rollers R4 are still holding the document Dn+1, the distance L1 between the documents Dn and Dn+1 can not be maintained.

As described above, in the conventional analog copy machine, the distance (distance L1+length of one sheet of original+distance L2) is necessary as the distance from a trailing edge of the document Dn to the rollers R4, whereby a long original carrying path has been necessary. For this reason, it has been an obstacle to the downsizing of the copy machine.

SUMMARY OF THE INVENTION

An object of the present invention is to provide an original carrying apparatus which has solved the above-described problem.

Another object of the present invention is to downsize an original carrying apparatus which scans an original while the original is being moved.

Other objects of the present invention will become apparent from the following detailed description and the accompanying drawings.

DETAILED DESCRIPTION OF PREFERRED EMBODIMENTS

Hereinafter, the embodiments of the present invention will be explained with reference to the accompanying drawings.

<First Embodiment>

Figure 1:
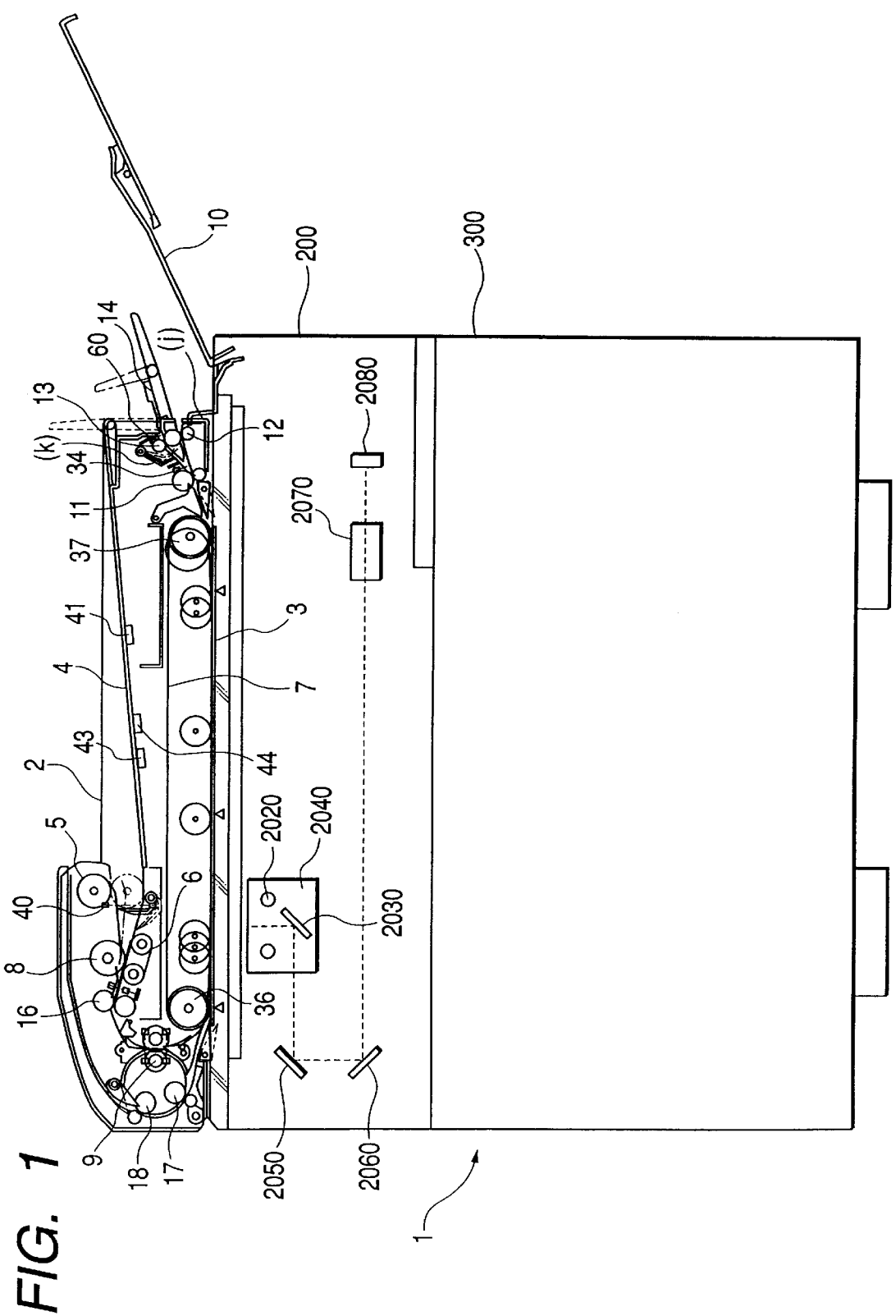
FIG. 1 is a sectional view showing a structure of a copy machine.
Figure 27B:
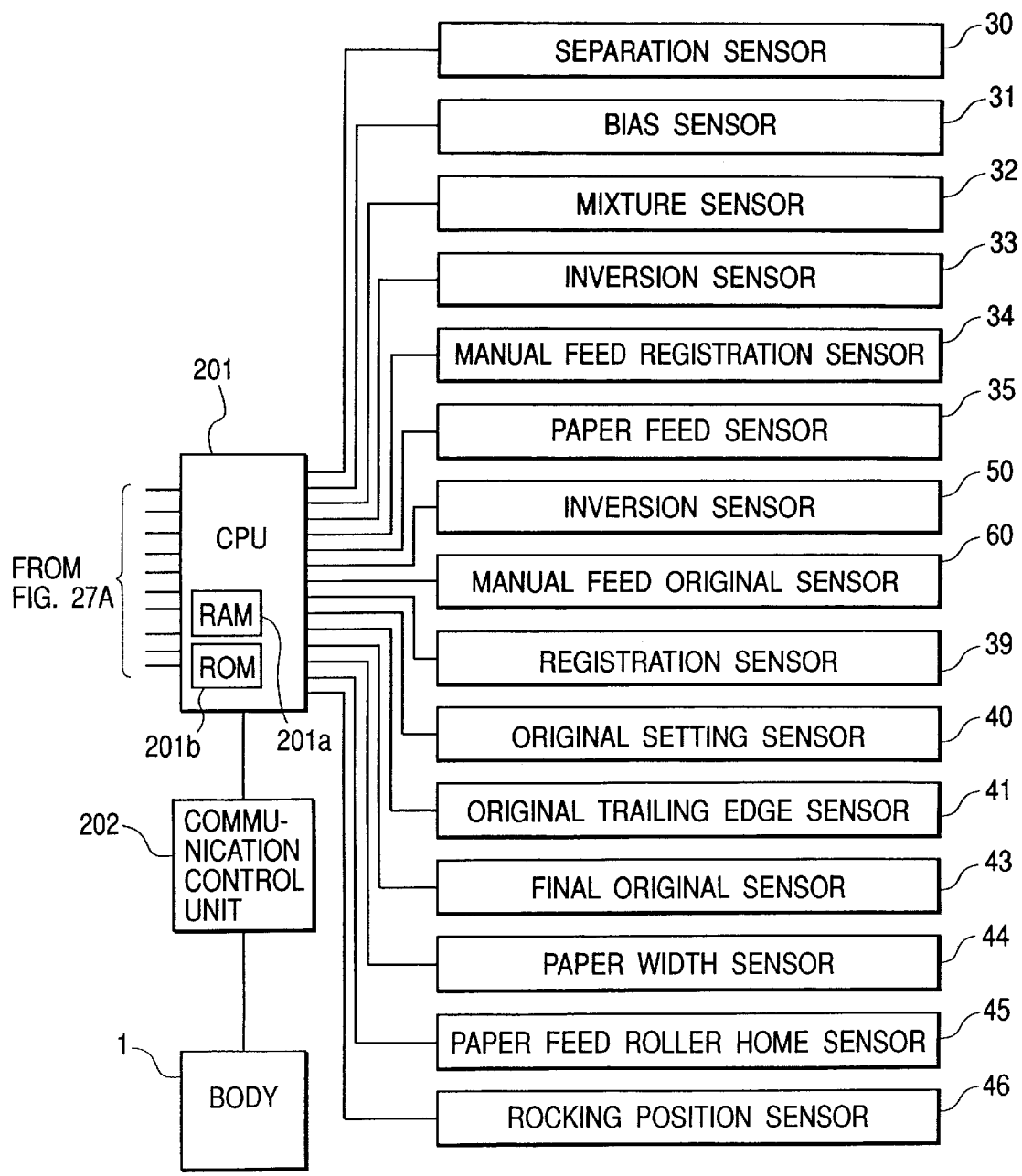
FIG. 27 comprised of FIGS. 27A and 27B is a block diagram showing a structure of a first embodiment of the present invention.

FIGS. 27A and 27B are block diagrams showing an ADF (automatic document feeder) 2 according to the first embodiment of the present invention. The ADF 2 is mounted on a body 1 of a copy machine. FIG. 1 shows a structure of the ADF 2.

In the ADF 2 of FIG. 1, a wide belt 7 wound on a drive roller 36 and a turn roller 37 is arranged under an original tray 4. A sheet original P is put on the tray 4 in the order of first page (second page), third page (fourth page), . . . , from the top. The original P on the tray 4 is sequentially separated from its uppermost sheet, and carried to a platen glass (referred to as platen hereinafter) 3 being a reading position of the body 1. The wide belt 7 is in contact with the platen 3 to stack or set the sheet original P carried from the tray 4 at a predetermined position on the platen 3, and carry the sheet original P to a paper discharge tray 10.

Subsequently, the body 1 of the copy machine will be explained. The body 1 is composed of a reader unit 200 and a printer unit 300. The reader unit 200 reads image information recorded on the original P put on the platen 3, performs optomagnetic conversion on the read information, and inputs therein the converted information as image data. The reader unit 200 contains the platen 3, a scanner unit 2040 (having lamp 2020 and mirror 2030), mirrors 2050 and 2060, a lens 2070 and an image sensor 2080. The printer unit 300 forms an image in a conventional method, and a structure thereof will be described later.

It should be noted that the present invention is applicable to a reading apparatus in which the reader unit 200 and the ADF 2 are integrated with each other, and also applicable to a copy machine which contains the ADF 2 in its body.

Figure 2:
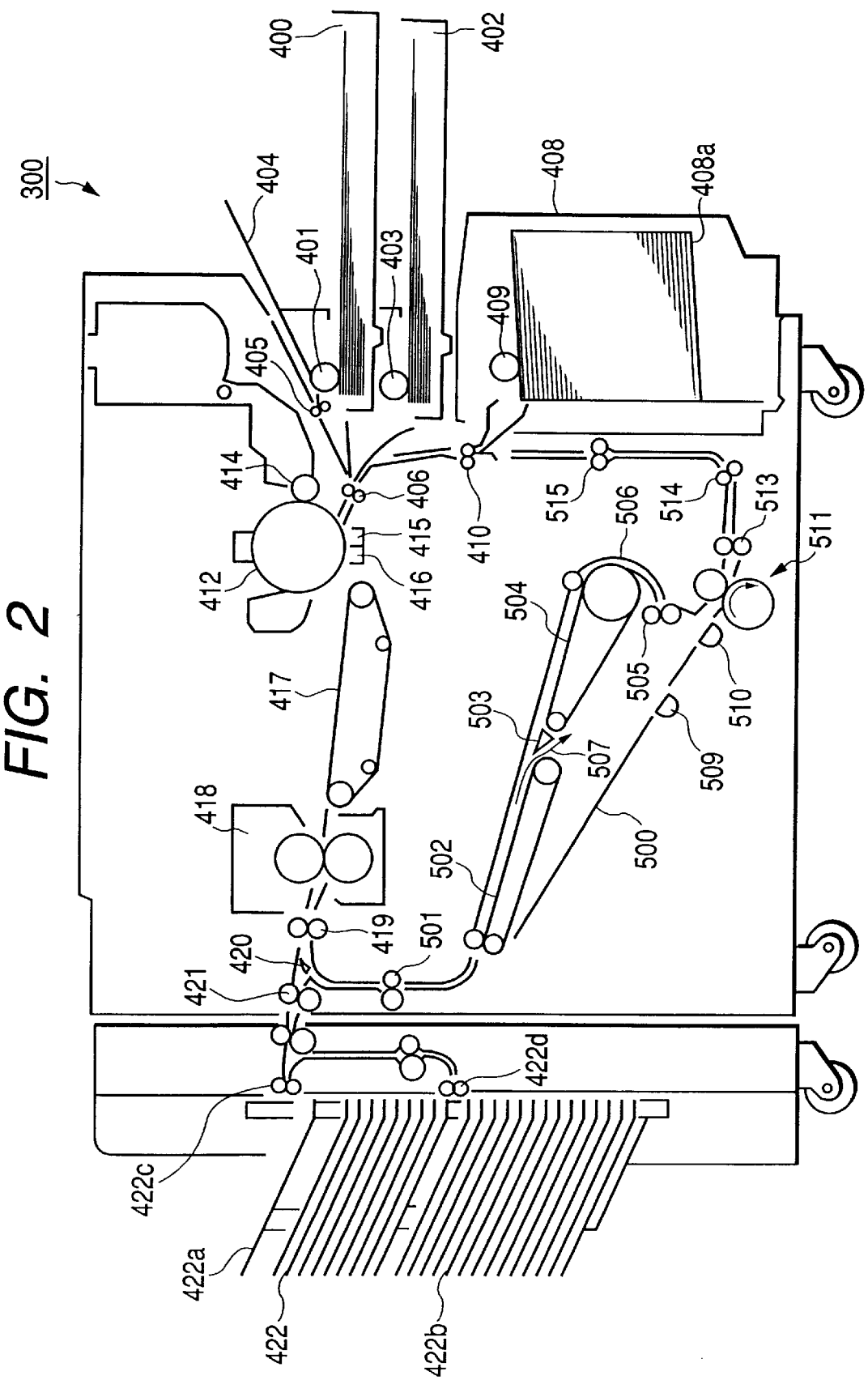
FIG. 2 is a sectional view showing a structure of an image formation unit 300 in FIG. 1.

Hereinafter, the printer unit 300 will be explained with reference to FIG. 2. In FIG. 2, numeral 400 denotes an upper cassette which holds therein recording paper sheet material (referred to as sheet hereinafter). Numeral 401 denotes a feed (pickup) roller which feeds the sheet separated from the upper cassette 400 to a pair of registration rollers (referred to as registration roller hereinafter) 406. Numeral 402 denotes a lower cassette which holds therein the sheet. Numeral 403 denotes a feed (pickup) roller which feeds the sheet separated from the lower cassette 402 by a separation pawl to the registration roller 406. Numeral 404 denotes a manual feed guide which guides the sheet set on a manual-feed original tray to the registration roller 406 one by one through a pair of rollers (referred to as roller hereinafter) 405. Numeral 408 denotes a deck-type sheet stack device. In the device 408, the sheets are stacked on an intermediate board 408a which can be moved up and down by a motor or the like. Numeral 409 denotes a feed (pickup) roller which picks up the uppermost one of the plural sheets stacked on the board 408a and separated by a separation pawl, and feeds the sheet to the registration roller 406 through a pair of carrying rollers (referred to as roller hereinafter) 410.

Numeral 412 denotes a photosensitive drum 412 which forms thereon a latent image on the basis of the image data. Numeral 414 denotes a development unit which develops the latent image on the drum 412 to generate a toner image. Numeral 415 denotes a transfer charger which transfers the toner image on the drum 412 to the sheet fed by the registration roller 406 at appropriate timing. Numeral 416 denotes a separation charger which separates from the drum 412 the sheet to which the toner image has been transferred.

Numeral 417 denotes a carrying belt which carries the sheet to which the toner image has been transferred. Numeral 418 denotes a fixing unit which fixes the toner image to the sheet carried by the belt 417. Numeral 419 denotes a pair of carrying rollers (referred to as roller hereinafter) which carries the sheet after fixation. Numeral 420 denotes a flapper which restricts or controls a carrying path for the sheet carried by the roller 419. Numeral 421 denotes a pair of discharge rollers (referred to as discharge roller hereinafter) which carries the sheet restricted by the flapper 420 to the carrying path toward the roller 421, to a sorter 422 through either a pair of non-sort tray discharge rollers (referred to as roller hereinafter) 422c or a pair of sort bin tray discharge rollers (referred to as roller hereinafter) 422d. The sorter 422 has a non-sort tray 422a and sort bin trays 422b to receive the discharged sheet. Thus, the sheet is discharged onto the trays 422a and 422b by the rollers 422c and 422d, respectively. The trays 422a and 422b can be moved up and down to sort the sheets. Of course, instead of the sorter 422, a discharge tray can be installed in the printer unit 300.

Numeral 500 denotes an intermediate tray. In a case where the images are formed on the front and back faces of the sheet (double-face copy) or in a case where the images are overlapped on one face of the sheet (multicopy), the sheet on which the images have been formed is once stacked on the tray 500. Numeral 501 denotes a pair of carrying rollers (referred to as carrying roller hereinafter) which carries the sheet restricted by the flapper 420 to the carrying path toward the roller 501. Numeral 502 denotes a carrying belt which carries the sheet carried by the roller 501 in a state that the face on which the image has been formed (referred to as image face hereinafter) is being turned downward. Numeral 503 denotes a flapper which is provided on a downstream side of the belt 502. In the multicopy, the flapper 503 restricts the sheet carried by the belt 502 to a path 507 toward the intermediate tray 500. In the double-face copy, the flapper 503 restricts the sheet to a path on a carrying belt 504 and an inversion path 506 on the downstream side of the belt 504. The sheet carried through the path 507 is stacked on the tray 500, as the image face thereof is being turned downward. Numeral 505 denotes a pair of carrying rollers (referred to as roller hereinafter) which carries the sheet carried through the inversion path 506 onto the intermediate tray 500. Thus, the sheet carried by the roller 505 is stacked on the tray 500, as the image face thereof is being turned upward.

Numerals 509 and 510 denote assistance rollers, and numeral 511 denotes a pair of rotation and inversion separation rollers. These rollers cooperate to separate the sheet stacked on the intermediate tray 500 one by one from the bottom and then refeed the separated sheet. Each of numerals 513, 514 and 515 denotes a pair of carrying rollers (referred to as roller hereinafter) which refeeds the sheet separated from the tray 500 to the roller 410.

Even in a case of forming the plural copies, if a method is used to form one set of copies every time the original is rounded by the ADF, a copy group in which pages have been completed can be obtained in due order. Therefore, even if there is no sorter, the necessary number of copies can be sorted and obtained.

In a case of performing the double-face copy as in the previous method, the two faces of one original are sequentially read, the read images are sequentially copied on the front and back faces of the sheet, and the obtained sheet is then discharged. By repeating such an operation, the double-face copy groups which have been satisfactorily sorted can be obtained.

Explanation of structure of original tray 4.

A pair of width-direction restriction boards provided on the original tray 4 is slidable in a width direction of the sheet original P. Thus, the boards restrict the width direction of the original P put on the tray 4 to stabilize original feeding. A stopper 21 (FIG. 4) is rotatively arranged at an end of the tray 4. Thus, when the stopper 21 is projected over, the original P set on the tray 4 is restricted such that it does not move downward.

Explanation of sensors on tray.

Original setting sensors 40a and 40b (FIG. 4) being transparent-type optical sensors are provided in the vicinity of an upstream side of the stopper 21 to detect that a sheaf of sheet originals P has been set. An original trailing edge sensor 41 being a reflection-type optical sensor is provided in the middle of the original tray 4 to judge whether or not the set original is a half-size original. The sensor 41 is apart from the stopper 21 by 225 mm and is turned on when a longitudinal original is set. A final original sensor 43 being a reflection-type optical sensor is provided at an intermediate portion between an original setting sensor 40 and the trailing edge sensor 41 to be able to judge whether or not the original being carried is the final original. A paper width sensor 44 is provided under the original tray 4 to detect a length of the sheaf of originals P set on the tray 4 in its width direction by detecting positions of the width-direction restriction boards.

Explanation of separation unit.

A rocking arm 53 (FIG. 5) is provided over the original tray 4 such that an up-and-down arm 51 is rocked on a rotational shaft center C1 of a separation carrying roller 8. An arm shaft 51c is supported through front and rear support boards 51a and 51b of the arm 51, whereby rocking of the arm 53 is restricted by the shaft 51c. A feed roller 5 is provided at an end of the arm 53. Ordinarily, a home position of the roller 5 is that shown in FIG. 5. That is, by the arm shaft 51c, the roller 5 is escaped upward as compared with a separation upper guide board 52 (stopped by pin 51g) such that the roller 5 does not obstruct an original setting operation. The arm 51 is driven and controlled by a later-described motor 103 (FIG. 4) and thus at a position shown in FIG. 5.

Figure 8:
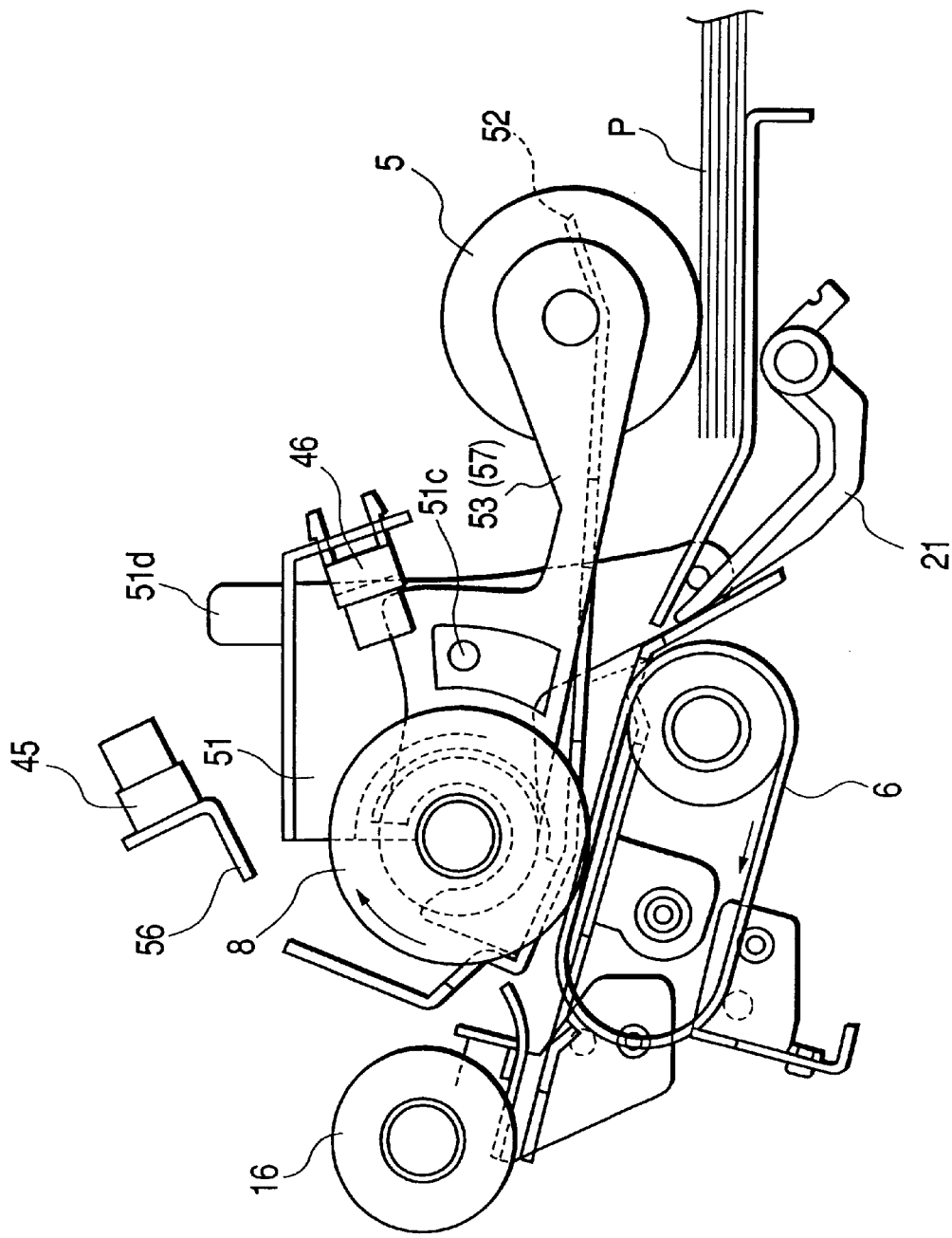
FIG. 8 is an arrow diagram of the line 8—8 in FIG. 9 for explaining the operation of the separation unit of the ADF 2 (part 4)
Figure 9:
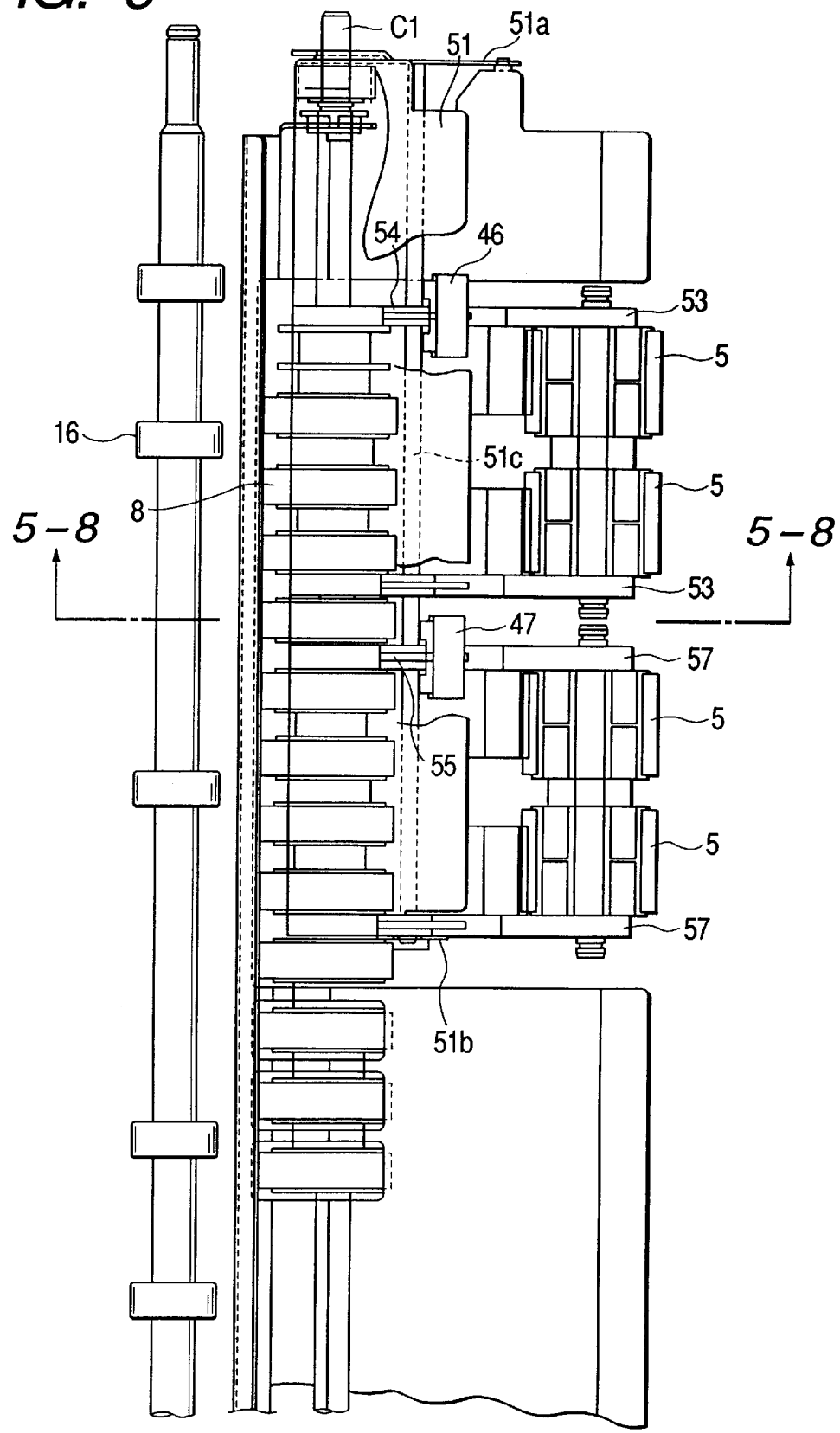
FIG. 9 is a plan view showing a structure of the ADF 2.

FIG. 9 is a plan view showing the separation unit. The up-and-down arm 51 rotates on the rotational shaft center C1, and is movable from the position shown in FIG. 5 to that shown in FIG. 6. As described above, the feed roller 5 is provided at the ends of the rocking arms 57 and 53 rotatively moving on the rotational shaft center C1. As the arm 51 moves, each of the arms 57 and 53 moves downward by its own weight. Then, the roller 5 stops when it comes into contact with the uppermost sheet of the original P. FIG. 8 shows such a state. If the roller 5 is rotated in this state, it is possible to sequentially carry the original from its uppermost sheet. An upper guide board 52 is stopped at a position shown in FIG. 6 by a not-shown stopper.

At a position where the feed roller 5 comes into contact with the uppermost sheet of the original sheaf, i.e., in a state shown in FIG. 8, engagement of the rocking arms 57 and 53 and the arm shaft 51c supporting these arms is released. At this time, relative positional relation between the rocking arms 57 and 53 and the up-and-down arm 51 begins to become aberrant. Such aberration quantity is changed from a previous non-detection state to a detection state shown in FIG. 8 by first and second rocking arm flags 54 and 55 being parts of the rocking arms 57 and 53, and first and second rocking position sensors 46 and 47 mounted on the arm 51. Thus, the rocking arms 57 and 53 are controlled to stop.

In this state, the rocking arms 57 and 53 and the feed roller 5 are put on the sheaf of sheet original P by their own weight, whereby it is possible to apply stable feed force to the sheet original P.

Figure 5:
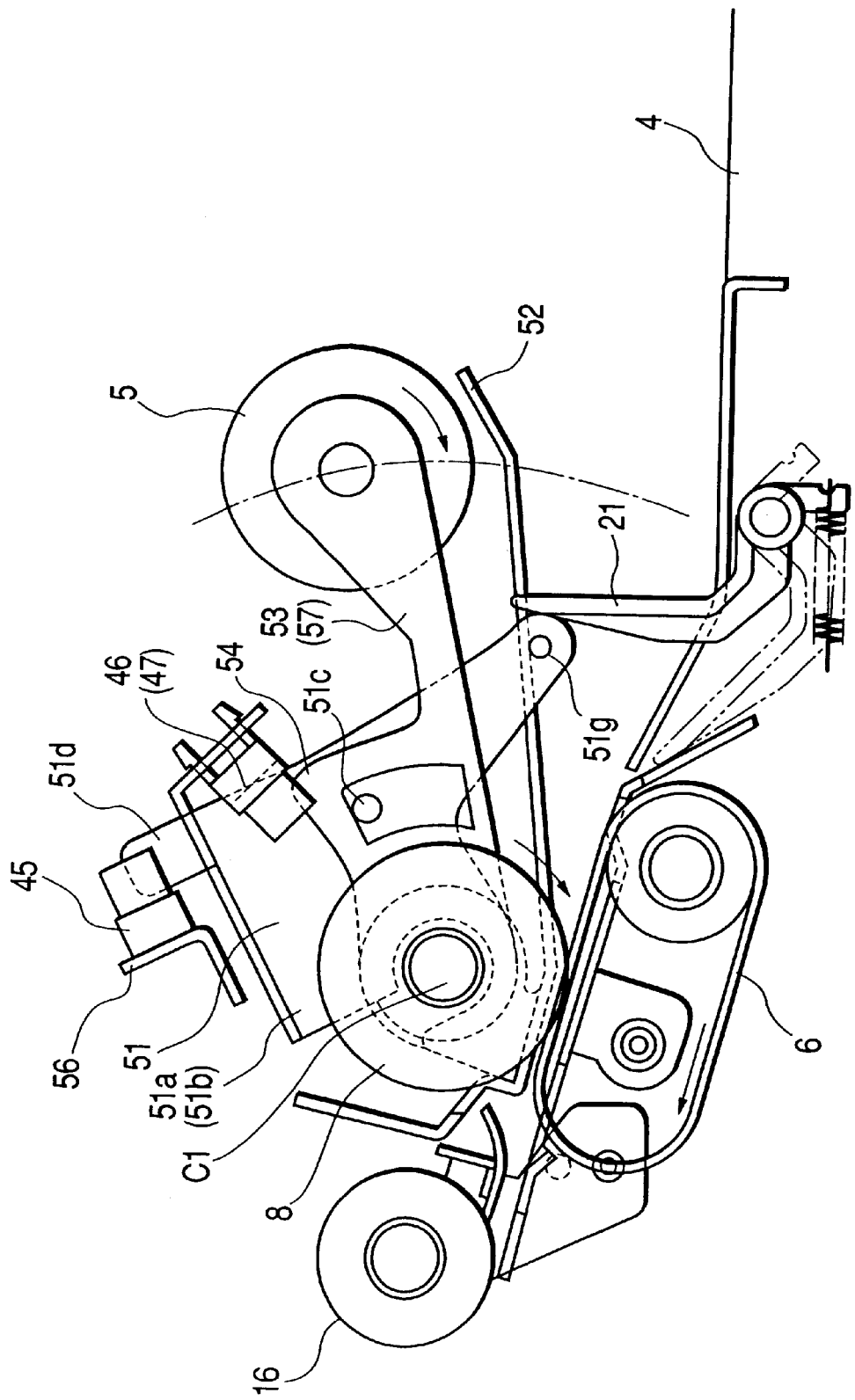
FIG. 5 is an arrow diagram of a line 5—5 in FIG. 9 for explaining an operation of a separation unit of the ADF 2 (part 1)
Figure 6:
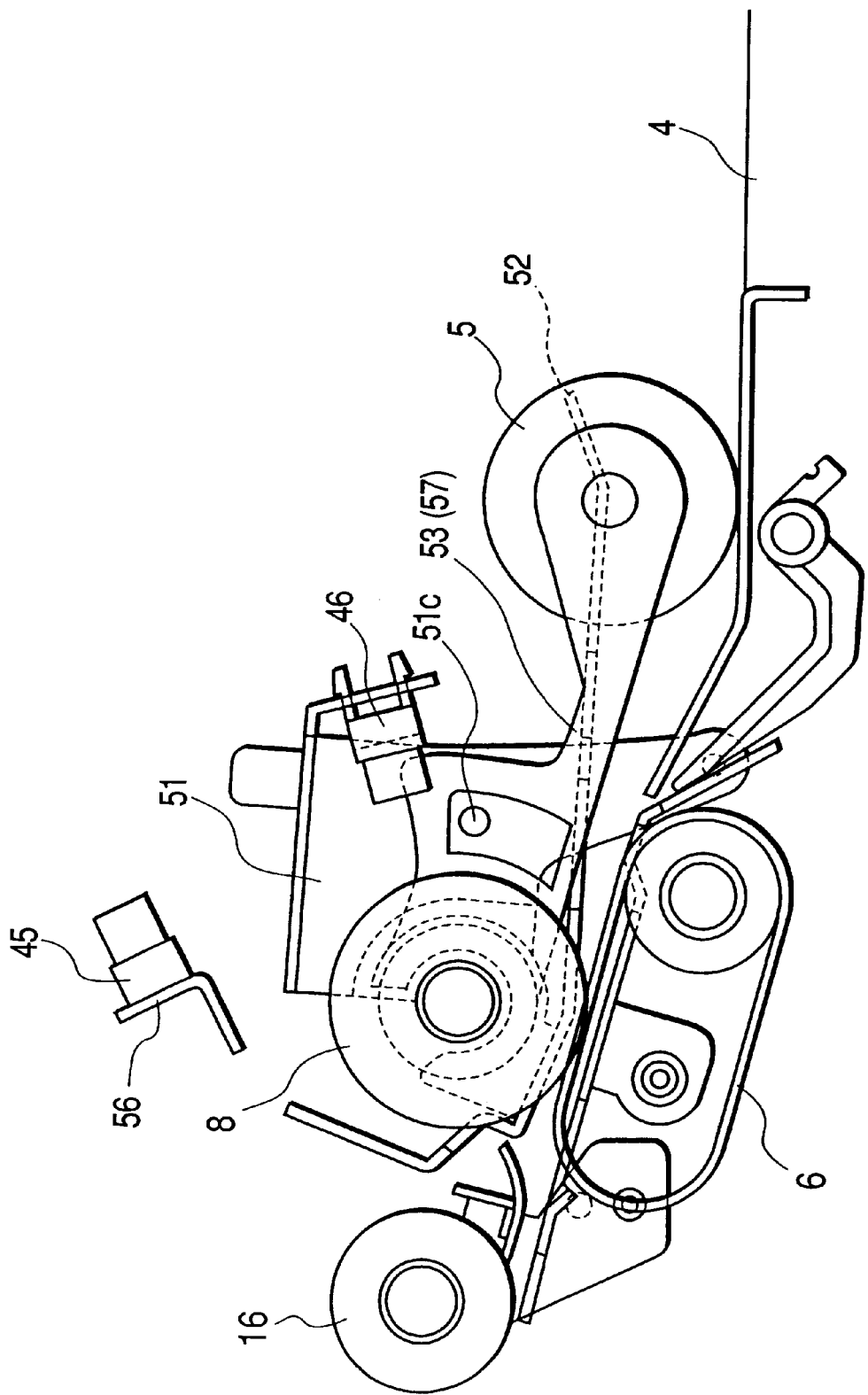
FIG. 6 is an arrow diagram of the line 6—6 in FIG. 9 for explaining the operation of the separation unit of the ADF 2 (part 2)

The up-and-down arm 51 is driven by the rocking motor 103 (i.e., stepping motor), and can be at an arbitrary intermediate position (e.g., position shown in FIG. 7) between the positions shown in FIGS. 5 and 6.

A paper feed roller home sensor 45 being a transparent-type optical sensor is mounted on a fixed support board 56 arranged over the separation unit. When the up-and-down arm 51 is at a standby position being a home position, a sensing optical path of the sensor 45 is shielded by an up-and-down arm flag 51d provided on the rocking arms 57 and 53.

As described above, since the first and second rocking position sensors 46 and 47 integrally moved with the up-and-down arm 51 are provided on the arm 51, the first and second rocking arm flags 54 and 55 expanding in downward directions of the arms 53 and 57 can be detected by the sensors 46 and 47 respectively.

Figure 7:
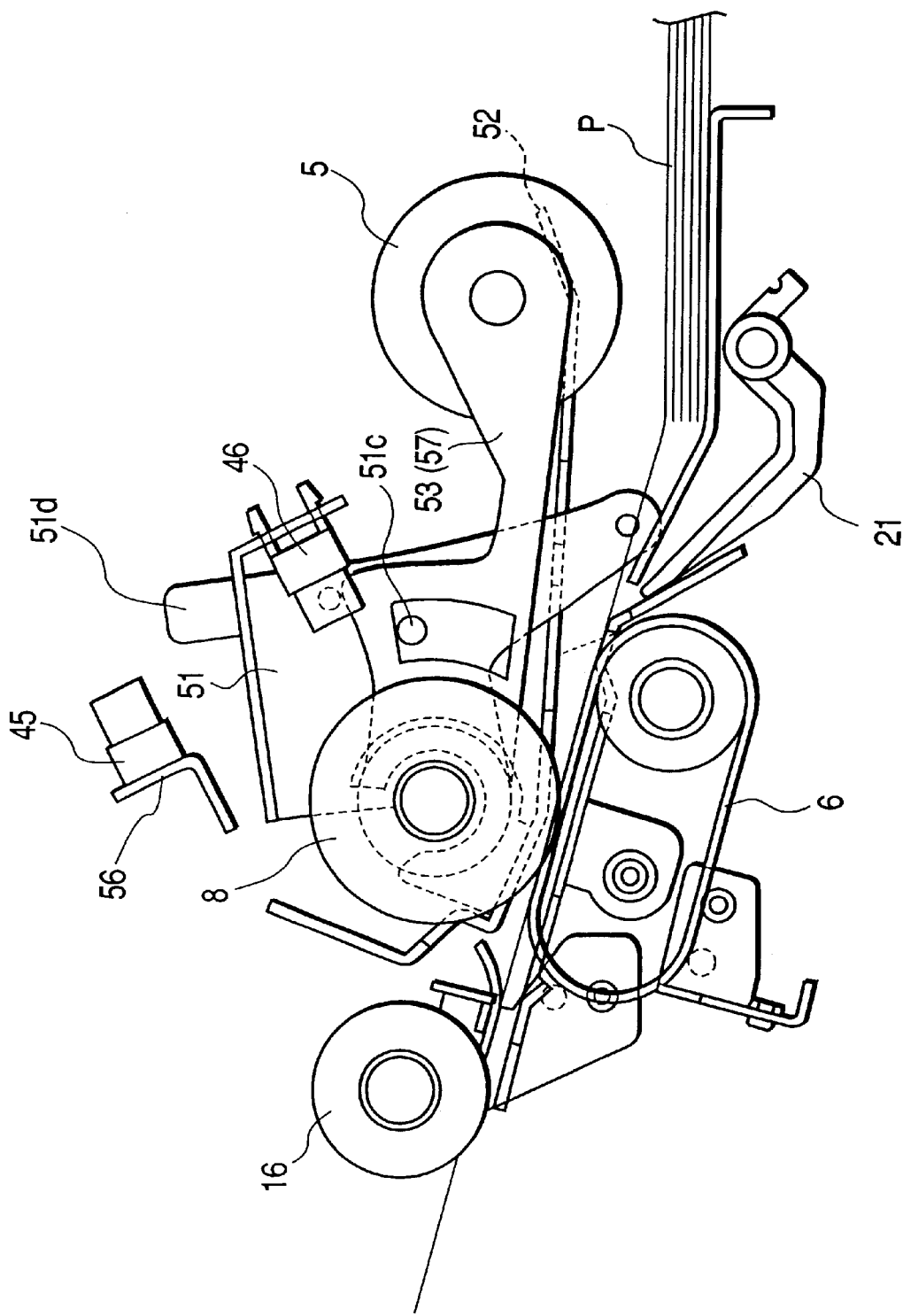
FIG. 7 is an arrow diagram of the line 7—7 in FIG. 9 for explaining the operation of the separation unit of the ADF 2 (part 3)

In the state of FIG. 7, as described above, since the paper feed roller 5 is at the escaped position in continuous paper (sheet) feeding, there is no need for the rocking arms 57 and 53 to return to the home position (i.e., state of FIG. 5). For this reason, the roller 5 is controlled to intermediately stop at a position apart from the sheaf of originals by a minimum quantity (about 3 mm to 5 mm).

Through such a structure, it becomes possible to minimize movement quantity of the paper feed roller 5. Thus, mechanical vibration or oscillation occurring when the roller 5 comes into contact with the sheet original P is reduced, thereby contributing to improvement of paper feed performance. Also, it becomes possible to shorten a time elapsing until subsequent paper feeding starts, thereby allowing paper feed control with a paper feed interval shortened.

In a case where a paper feed operation starts when the paper feed roller 5 provided respectively on the rocking arms 57 and 53 comes into contact with the sheet original P and bounds due to impact of contact, pressure of the roller 5 to the sheet original P becomes imbalanced. Thus, a possibility that bias (i.e., oblique sheet running) occurs when the paper sheet is fed becomes high.

As shown in FIG. 9, since each of the plural paper feed rollers 5 arranged in a width direction applies an independent suspension structure, it is easy to equalize the rollers 5 with the sheaf of the sheet originals P. Thus, it is possible to realize the improvement of paper feed performance.

A separation unit composed of the known separation belt 6 and the separation carrying roller 8 is provided at a downstream side along a carrying direction of a shutter 21. The separation unit rotates in a direction indicated by an arrow (FIG. 8) to perform a separation operation.

Figure 10A:
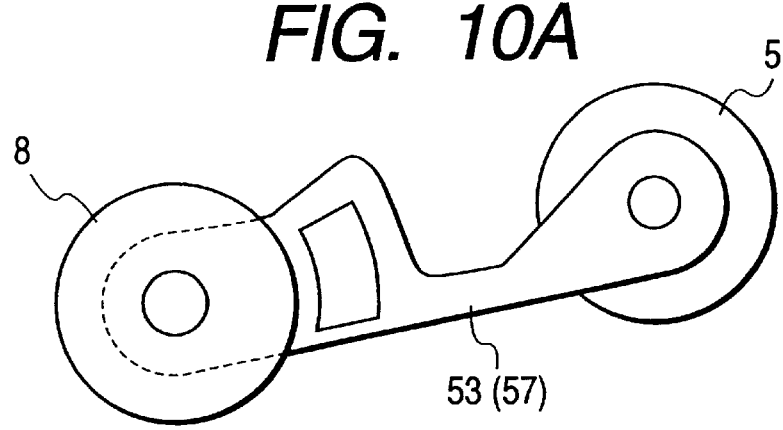
FIGS. 10A, 10B and 10C are views showing arrangements of a paper feed roller 5 and a separation carrying roller 8.
Figure 10B:
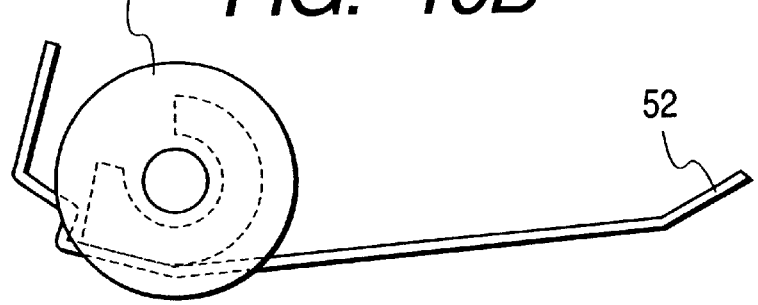
Figure 10C:
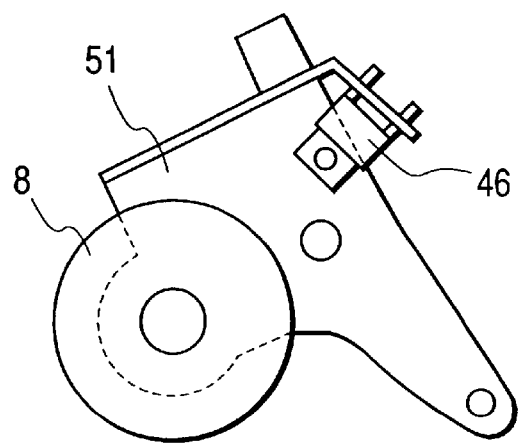

FIGS. 10A to 10C show arrangements of the paper feed roller 5 and the separation carrying roller 8.

Explanation of carrying paths.

Hereinafter, the carrying path will be explained with reference to FIG. 3. Original feed paths (a), (b) and (c) are provided in that order along a curve from the original tray 4 to the platen 3. To guide the sheet original P onto the platen 3, the downward curve composed of the paths (a), (b) and (c) is connected to a carrying path (d) on the platen 3. Inversion feed paths (h), (f) and (i) expand from the original feed path (b) such that front and back faces of the original can be inverted before the original is carried to the platen 3. The original inverted by the paths (h), (f) and (i) is switched back, carried to the platen 3 through an original feed and discharge path (e), and then put on the platen 3. Further, an original inversion path (g) is branched off the inversion feed path (f) such that the original from the path (g) can be joined with the original fed from the path (b). Thus, the original on the platen 3 is switched back to invert the front and back faces thereof by utilizing the paths (e), (f), (g) and (c), and then the inverted original can be again returned to the platen 3.

After image reading on the original terminates, the original on the platen 3 is discharged onto the tray 10 through the original carrying path (d) expanding on the platen 3 and an original discharge path (j) shown in FIG. 1.

As shown in FIG. 1, a manual feed original tray 14 of an open/close type is provided at the right of the ADF 2 such that the set original P (one sheet original) can be fed onto the platen 3 through a manual carrying path (k).

Explanation of roller arrangement.

Hereinafter, the arrangements of the rollers will be explained with reference to FIG. 3. The original feed path (a) is the carrying path through which the original separated by the paper feed roller 5 is carried in a downstream direction by the separation carrying roller 8 and a separation belt 6. A pair of first feed rollers (referred to as roller hereinafter) 16 is provided between the original feed paths (a) and (b) to feed the original separated by the separation unit, thereby preventing or correcting the bias of the original at the separation unit. In order to reduce a carrying load at a time when the original is picked from the separation unit by the roller 16, the roller 8 has a so-called one way mechanism.

A pair of second feed rollers (referred to as roller hereinafter) 9 is provided at a junction portion of the paths (b) and (g), or a branch portion of the paths (c) and (g), to form a loop of the reached sheet original P to prevent or correct the bias of the original. Further, a pair of first inversion rollers (referred to as roller hereinafter) 17 is provided between the inversion feed paths (h) and (f) to carry the original P along the looped inversion path, and a pair of second inversion rollers (referred to as roller hereinafter) 18 is provided between the inversion feed paths (f) and (i) to carry the original P along the looped inversion path.

As shown in FIG. 1, a manual paper feed roller 13 is provided at the right of the ADF 2 to feed from right to left the original set on the manual feed original tray 14.

A pair of manual feed registration rollers (referred to as roller hereinafter) 11 is provided between the manual paper feed roller 13 and the platen 3 to form a loop of the manually fed sheet original to prevent or correct the bias of the original. Also, the roller 11 feeds the original from the platen 3 to discharge it.

A pair of paper discharge rollers (referred to as roller hereinafter) 12 is provided on the original discharge path (j) shown in FIG. 1 to discharge the carried original P onto the paper discharge tray 10.

Explanation of flappers on paths.

Hereinafter, the flappers on the original feed paths will be explained with reference to FIGS. 3 and 4. An inversion paper feed flapper 22 is provided on the downstream side of the feed direction of the second feed roller 9 to change or switch the original feed path between the paths (c) and (h). In a case where the flapper 22 is set at a position shown by a solid line in FIG. 4, the original P is fed to the paths (h), (f) and (i). On the other hand, in a case where the flapper 22 is set at a position shown by an alternate long and short dashed line in FIG. 4, the original P is fed to the paths (c) and (d).

An inversion flapper 23 is provided on the downstream side of the feed direction of the second inversion roller 18 arranged between the inversion feed paths (f) and (i) to change the path between the paths (i) and (g). By setting the flapper 22 at a position shown by a solid line in FIG. 4, it is possible to invert the front and back faces of the original P carried from the paths (b) and (h). On the other hand, by setting the flapper 22 at a position shown by an alternate long and short dashed line in FIG. 4, it is possible to inversely carry the original from the platen 3 through the paths (e), (f) and (g).

A one-way flapper 24 to which a (Mylar) or the like is affixed is provided in the vicinity of the upstream side of the first inversion roller 17 between the junction portion of the paths (h) and (e) and the path (f). When the original P is fed from the path (h) to the path (f), the flapper 24 acts as a guide. On the other hand, when the original P is fed from the paths (g) and (f) onto the platen 3 through the path (e), the flapper 24 acts to prevent the original P from being inversely fed into the path (h).

A feed and discharge flapper 25 is provided on the platen 3 side of the path (e). The flapper 25 cooperates with the inversion paper feed flapper 22 provided on the downstream side of the feed direction of the second feed roller 9. When the original P is fed from the path (e) to the platen 3, the flapper 25 is set at a position indicated by a solid line in FIG. 4 to prevent that the leading edge of the original P collides with the end of the platen 3. On the other hand, when the original P is fed from the platen 3 to the path (e), the flapper 25 is set at a position indicated by an alternate long and short dashed line in FIG. 4 to be able to pick the original from the platen 3.

A paper discharge flapper 26 is provided between the right end of the platen 3 and the manual feed registration roller 11. When the original P is carried from the path (k) to the platen 3, the flapper 26 is set at a position indicated by a solid line in FIG. 4 to prevent that the leading edge of the original P collides with the end of the platen 3. On the other hand, when the original P is discharged from the platen 3 to the path (j), the flapper 26 is set at a position indicated by an alternate long and short dashed line in FIG. 4 to be able to pick the original from the platen 3.

A one-way manual feed flapper 27 is provided at a junction portion of the paths (j) and (k) shown in FIG. 1 to prevent that the original P discharged from the platen 3 from entering the path (k).

A manual feed shutter 28 is provided in the vicinity of the downstream side of the paper feed direction of the manual paper feed roller 13 (FIG. 1). The shutter 28 prevents that the manually fed original set on the original tray 14 from entering the manual feed registration roller while the original P which has been copied is being discharged. Since carrying force of the manual feed roller 13 is set to be low when, the original contacts the shutter 28, which is down, slips on the roller 13.

Explanation of arrangements of sensors on paths.

The sensors on the paths will be explained with reference to FIG. 4. A separation sensor 30 being a transparent-type optical sensor is provided between the separation carrying roller 8 and the first feed roller 16 to detect the original P carried by the roller 8. Further, a bias sensor 31 being a transparent-type sensor is provided at a position identical with that of the sensor 30 in the carrying direction and apart from the sensor 30 by a predetermined distance in a thrust direction. The sensor 31 cooperates with the sensor 30 to detect bias quantity of the original P.

A mixture sensor 32 is provided in the vicinity of the downstream side of the first feed roller 16 to detect the original P by moving a flag. When the original P is being carried, the sensor 32 cooperates with the sensor on the original tray 4 to detect whether or not the different-size original has been set on the tray 4.

A paper feed sensor 35 being a transparent-type optical sensor is provided in the vicinity of-the upstream side of the second feed roller 9 to detect the leading and trailing edges of the original P passed through the path (b), (c) or (g). Further, a registration sensor 39 being a transparent-type optical sensor is provided on the downstream side of the roller 9 to detect the trailing edge of the original P. The trailing edge of the original P is detected by the sensor 39 to control a stop position of the original P.

An inversion sensor 50 being a transparent-type optical sensor is provided on the path (e) to detect the original P discharged from or fed onto the platen 3.

An inversion sensor 33 is provided on the path (i) to detect the original by moving a flag. That is, the sensor 53 detects whether or not the original P is guided to the path (i) by shifting the inversion flapper.

A manual registration sensor 34 being a transparent-type optical sensor is provided in the vicinity of the downstream side of the paper discharge direction of the manual registration roller 11 to detect the original carried from the path (k) and also detect the original discharged from the platen 3 to the path (j).

A manual-feed original sensor 60 is provided on the manual original tray 14 side of the manual paper feed roller 13 to detect the originals by moving a flag. That is, the sensor 60 detects whether or not the original has been set on the tray 14.

Explanation of drive system.

The drive system of the ADF 2 will be explained with reference to FIG. 4. In FIG. 4, numeral 100 denotes a separation motor which uses a PLL-controlled DC brush motor. A clock board 100a having plural slits is provided on a shaft of the motor 100. Thus, while the motor 100 rotates, a clock pulse proportional to the number of motor rotations is generated by the slits and a separation clock sensor 100b being a transparent-type optical sensor. The motor 100 drives the separation feed roller 8 and the separation belt 6 in the separation unit, in a direction indicated by an arrow in FIG. 4. Also, the motor 100 transmits drive force to the paper feed roller 5 through a separation clutch 106.

Numeral 101 denotes a reversible carrying motor which uses a stepping motor. The motor 101 drives the second feed roller 9, and the first and second inversion rollers 17 and 18. A clock board 101a having plural slits is provided on a shaft of the roller (subroller) 9. Thus, while the motor 101 rotates, a clock pulse is generated by the slits and an inversion clock sensor 101b being a transparent-type optical sensor. When a slip occurs while the original P is carried by the roller 9, quantity of the slip can be calculated based on the number of generated clock pulses and the number of drive clocks of the motor 101.

Numeral 102 denotes a reversible belt motor which uses a stepping motor. The motor 102 drives a drive roller 36 to drive the wide belt 7, and rotation of the roller 36 is transmitted to the turn roller 37 by the wide belt 7. Further, rotation of the turn roller 37 is transmitted to the manual feed registration roller 11, whereby a carrying speed of the original on the platen 3 is equalized to a carrying speed of the roller 11.

Numeral 103 denotes the reversible rocking motor which uses a stepping motor to drive the up-and-down arm 53 of the paper feed roller.

Numeral 104 denotes a paper discharge motor which uses a DC motor of a FG servomotor control system. A clock board 104a having plural slits is provided on a shaft of the motor 104. Thus, while the motor 104 rotates, a clock pulse proportional to the number of motor rotations is generated by the slits and a paper discharge clock sensor 104b being a transparent-type optical sensor. Drive force of the motor 104 is transmitted to the paper discharge roller 12 and the manual paper feed roller 13.

Numeral 105 denotes a stopper solenoid which drives the stopper 21 at the paper feed end of the original tray 4. The stopper 21 is set at a position indicated by a solid line in FIG. 4 when it is OFF, while the stopper is set at a position indicated by an alternate long and short dashed line in FIG. 4 when it is ON. Numeral 106 denotes the separation clutch which transmits the drive force of the motor 100 to the paper feed roller 5, the separation belt 6 and the separation feed roller 8. Numeral 107 denotes a path change solenoid which drives the flappers 22 and 25. The flapper 22 and 25 are set respectively at positions indicated by solid lines in FIG. 4 when the solenoid 107 is OFF, while the flappers 22 and 25 are set respectively at positions indicated by alternate long and short dashed lines in FIG. 4 when the solenoid 107 is ON. Numeral 108 denotes an inversion flapper solenoid which drives the inversion flapper 23. The flapper 23 is set at a position indicated by a solid line in FIG. 4 when the solenoid 108 is OFF, while the flapper 23 is set at a position indicated by an alternate long and short dashed line in FIG. 4 when the solenoid 108 is ON.

Numeral 109 denotes a paper discharge flapper solenoid which drives the paper discharge flapper 26 and the manual feed shutter 28. The flapper 26 and the shutter 28 are set respectively at positions indicated by alternate long and short dashed lines in FIG. 4 when the solenoid 109 is OFF, while the flapper 26 and the shutter 28 are set respectively at positions indicated by solid lines in FIG. 4 when the solenoid 109 is ON.

Explanation of reading position.

Figure 11:
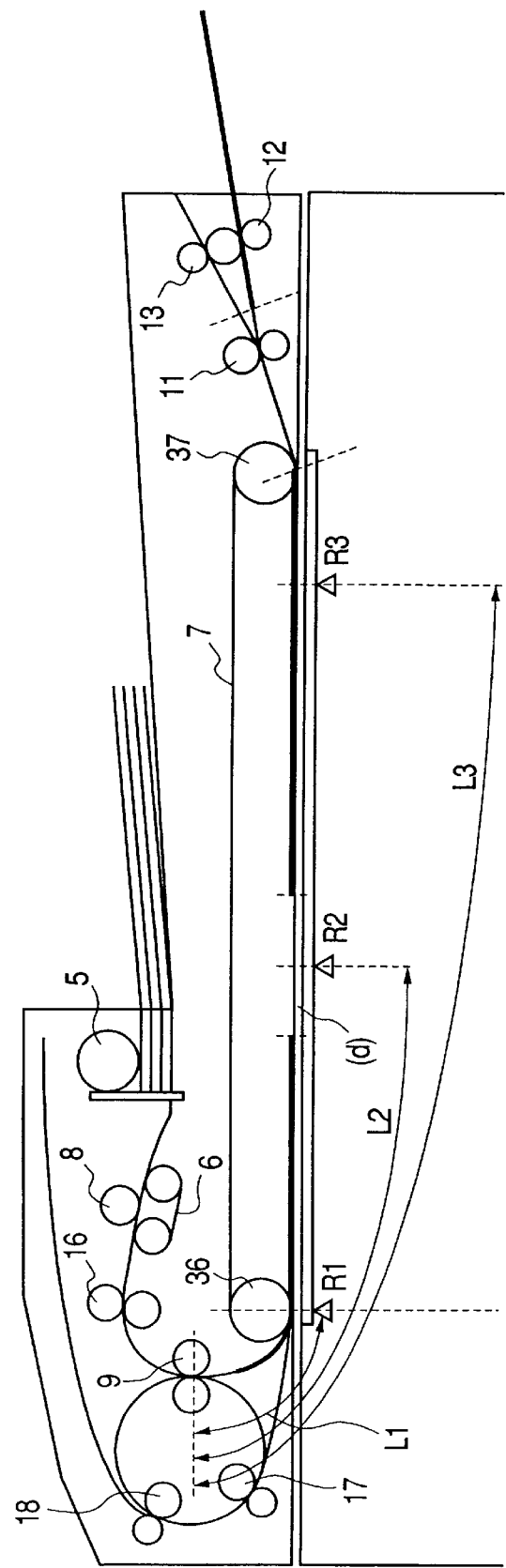
FIG. 11 is a view for explaining original reading positions.

FIG. 11 shows original reading positions on the platen 3. The reading position is changed among positions R1, R2 and R3 in FIG. 11 according to an original carrying mode and a size of the original to be carried.

The reading position R1 is the position used when the original is read in a double-face original mode. In the double-face original mode, the original is put on such that its end is aligned with the position R1, and the scanner unit 204 of the body 1 of the copy machine is moved leftward to perform original reading (fixed reading mode).

The reading position R2 is the position used when a half-size original is read in a single-face original mode. When the position R2 is used, the image reading is performed as the half-size original is carried in a state that the scanner unit 204 of the body 1 stands still at the position R2 (running (or flowing) reading mode).

The reading position R3 is the position used when a large-size original or the longitudinally fed half-size original is read in the single-face original mode. When the position R3 is used, the image reading is performed as the original is carried in a state that the scanner unit 204 stands still at the position R3 (running reading mode).

In FIG. 11, symbol L1 denotes a distance from a nipping point of the second feed roller 9 to the reading position R1, symbol L2 denotes a distance from the nipping point of the roller 9 to the reading position R2, and symbol L3 denotes a distance from the nipping point of the roller 9 to the reading position R3.

Figure 12:
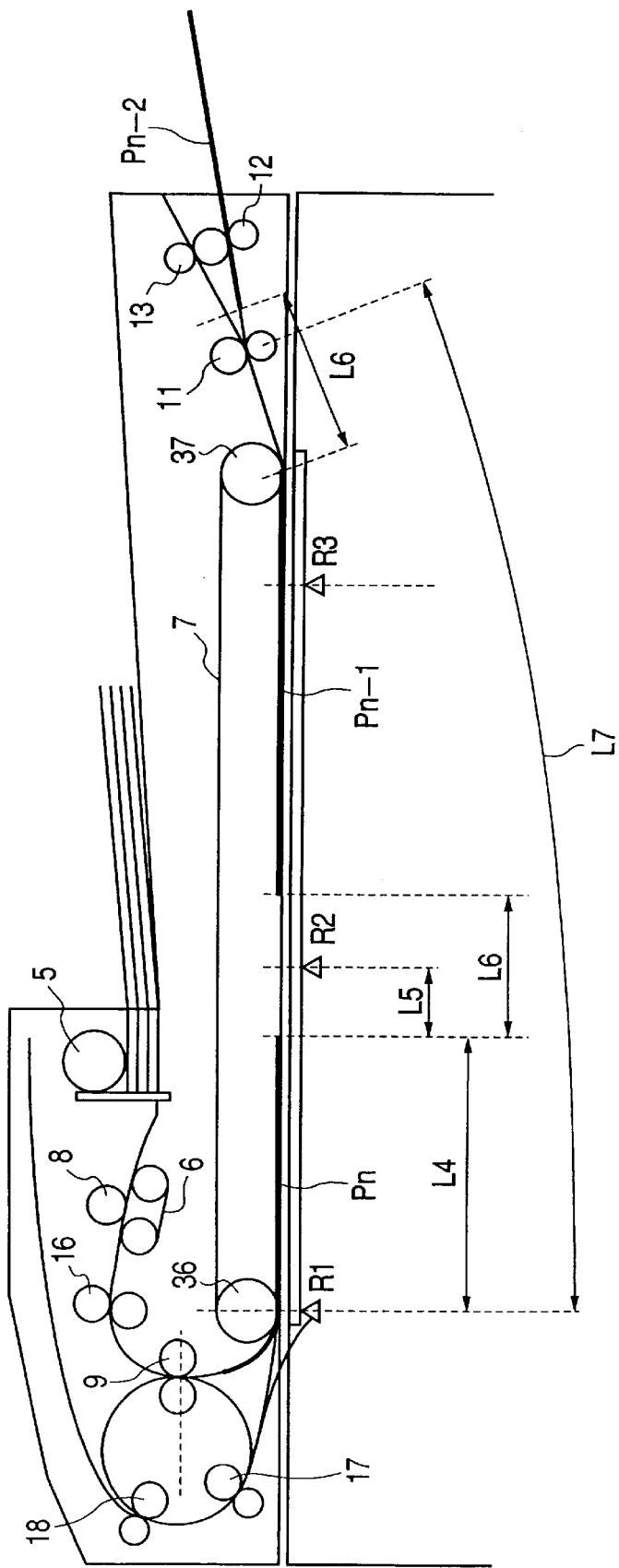
FIG. 12 is a view for explaining the original reading positions.

In FIG. 12, symbol L4 denotes a distance from the leading edge of the subsequent half-size original being on standby and thus stopped at the standby position on the platen 3 to the reading position R1, symbol L5 denotes a distance from the leading edge of the original stopped at the standby position to the reading position R2, symbol L6 denotes a distance (sheet-to-sheet distance) from the trailing edge of the preceding original to the trailing edge of the subsequent original, and symbol L7 denotes a distance from the reading position R1 to the manual feed registration roller 11.

In a case where a length of the half-size original in the carrying direction is set to be Lph, the stop position of the half-size original is controlled as follows:

$L7 < (L4 + 2 \times L6 + Lph)$ $L2 > (L5 + Lph)$

Therefore, even if an original Pn stops to be on standby and also an original Pn−1 stops after image formation such that the originals Pn and Pn−1 satisfy positional relation shown in FIG. 12, the trailing edge of a preceding original Pn−2 passes the nipping point of the roller 11 as shown in FIG. 12. Also, the trailing edge of the original Pn passes the nipping point of the second feed roller 9. An operation of the ADF will be explained later.

[explanation of original separation operation]

If the sheaf of originals on the original tray 4 is detected by the original setting sensor 40 shown in FIG. 1, a pre-separation operation starts to move the paper feed roller 5 downward such that the roller 5 comes into contact with the sheaf of originals. Then, if a copy condition is input from an operation unit of the copy machine and a start key is depressed, the original size is detected by the sensor on the platen 3. Further, if the stopper 21 is attracted by a stopper solenoid (SL), a route for the sheaf of sheet originals is released, and an uppermost sheet original P1 of the sheaf is carried toward the downstream side by the paper feed roller 5. In the following explanation, the respective sheet originals stacked on the tray 4 are called the originals P1, P2, P3, . . . (from uppermost sheet). However, if the order of originals is not specifically indicated, the original is merely called the original P.

The separation feed roller 8 and the separation belt 6 provided on the downstream side of the stopper 21 are rotated respectively in directions indicated by arrows (FIG. 8) to separate one by one the original P carried from the original tray 4, and the separated original is further carried toward the downstream side. The original P passed through the separation unit is subjected to the bias detection by the separation sensor 30 and the bias sensor 31. Then, the original is cramped and carried by the first feed roller 16. Subsequently, the paper feed roller 5 is raised, and then the separation clutch 106 is turned off. As a result, the drive of the belt 6 is released or separated from that of the roller 8, whereby the belt 6 stops moving. However, since a one-way roller structure is applied to the roller 8, it rotates according to the movement of the original P being carried (accordant rotation).

After then, the original P is carried only by the first feed roller 16, and the original P is butted against the stopping second feed roller 9 to perform known bias correction. After the bias correction terminates, the first and second feed rollers 16 and 9 simultaneously start to rotate, and sync speed control is performed such that carrying speed of the roller 16 becomes coincident with that of the roller 9. Since subsequent operations are different according to the original carrying modes, each operation will be explained for each mode.

Operation in half-size single-face original carrying mode.

FIGS. 13A to 13C and FIGS. 14A and 14B show the flow of the originals in the single-face original carrying mode. In the case where the single-face original carrying mode is being set, since the path change solenoid 107 is OFF, the original feed path (c) is used as the carrying path (FIG. 3). Therefore, the original carried by the first and second feed rollers 16 and 9 is further carried onto the platen 3 through the path (c).

Figure 13A:
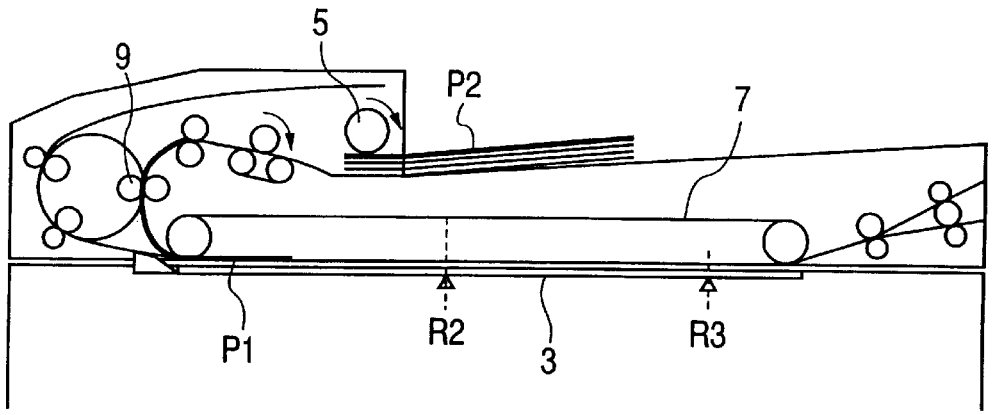
FIGS. 13A, 13B and 13C are views showing a flow of an original when a half-size single-face original is carried (part 1)

The carrying speed of the wide belt 7 immediately before the original P1 is carried onto the platen 3 is controlled to become coincident with the speed of the second feed roller 9. When the trailing edge of the original P1 passed through the nipping point of the paper feed roller 5, the roller 5 is again moved downward to be on standby for the feeding of the subsequent original P2. Then, when the trailing edge of the original P1 passed through the nipping point of the roller 5, the separation clutch 106 is turned on, the feeding of the original P2 by the roller 5 starts, and the roller 9 stops its operation. FIG. 13A shows such a state.

It is controlled that the subsequent original P2 is quickly accelerated after the feeding by the roller 5 starts, and thus the original P2 reaches the paper feed sensor 35 when the rotation of the second feed roller 9 stops. When the original P2 is detected by the sensor 35, the bias correction by the first and second feed rollers 16 and 9 is performed in the same manner as in case of the preceding original P1. At this time, the preceding original P1 is being solely carried by the wide belt 7 in the path (d) on the platen 3. Then, when the original P1 advances by a predetermined distance after the trailing edge thereof passed through the sensor 35, the carrying of the original P1 by the wide belt 7 once stops. Simultaneously, a carrying completion signal 120 is output to the body 1 of the copy machine, and the ADF 2 waits for input of a carrying start signal 121. The distance from the leading edge of the stopped original P1 to the reading position R2 is given by L5, and a distance from the trailing edge of the stopped original P1 to the nipping point of the roller 9 is given by L8. Since the distance from the nipping point of the roller 9 to the reading position R2 is given by L2, the distance L8 is obtained by a following equation.

$$L8=L2-(L5+\text{carried original size})$$

Figure 13B:
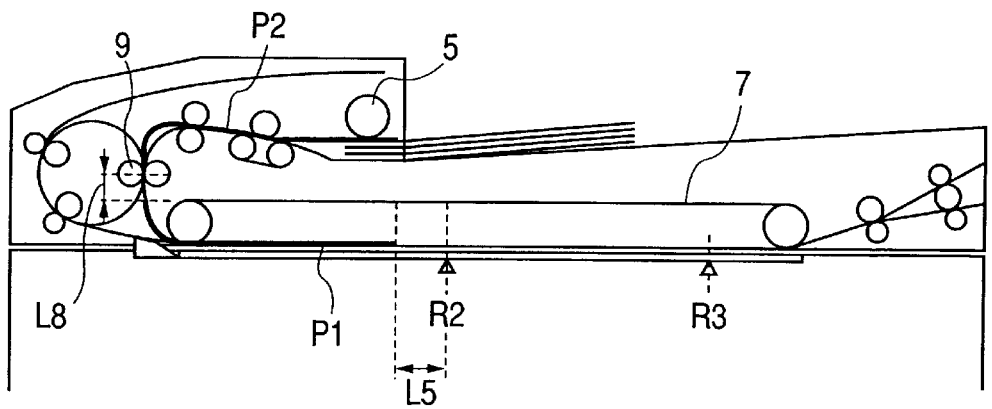

In this case, the fact that the distance L8 is given by a positive (+) value represents that the trailing edge of the stopped original P1 has passed through the nipping point of the second feed roller 9. FIG. 13B shows such a state.

Subsequently, if the carrying start signal 121 is received from the body 1 of the copy machine and the bias correction control of the subsequent original P2 by the first and second feed rollers 16 and 9 completes, the wide belt 7 starts to carry the preceding original P1 at image formation speed. Then, when the distance from the trailing edge of the preceding original P1 to the leading edge of the subsequent original P2 (referred to as sheet-to-sheet distance hereinafter) becomes a predetermined distance, the roller 9 starts. Thus, the carrying of the subsequent original P2 by the roller 9 starts. In this case, the speed of the roller 9 is controlled such that the sheet-to-sheet distance becomes the distance L6 when the carrying speed (image formation speed) of the preceding original P1 by the wide belt 7 comes to coincide with the carrying speed of the roller 9. Then, when the preceding original PI reaches the reading position R2, an image edge arrival signal 122 is output. Thus, the body 1 of the copy machine which received the signal 122 starts to perform the image reading on the preceding original P1.

Figure 13C:
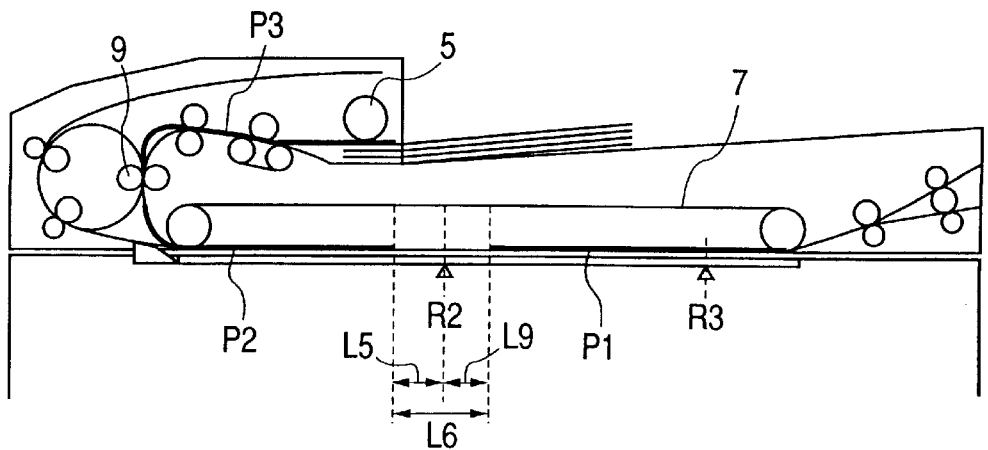

FIG. 13C shows a state after the image reading on the preceding original P1 terminates. Like the preceding original P1, when the subsequent original P2 advances by a predetermined distance after the trailing edge thereof passed through the sensor 35, the carrying of the original P2 by the wide belt 7 once stops. Thus, even if the image reading on the preceding original P1 terminates, the original P1 stops after it is carried by the predetermined distance. The distance by which the original P1 advances after the image reading terminates is given by L9 as shown in FIG. 13C, and the subsequent original P2 stops at the position apart from the reading position R2 by the distance L5. In the state that the original carrying by the belt 7 stopped, the original P3 to be carried subsequent to the original P2 is on standby as the loop for bias correction is maintained by the roller 9. In this state, when the carrying start signal 120 is input from the body 1 of the copy machine, the image formation on the original P2 starts.

Figure 14A:
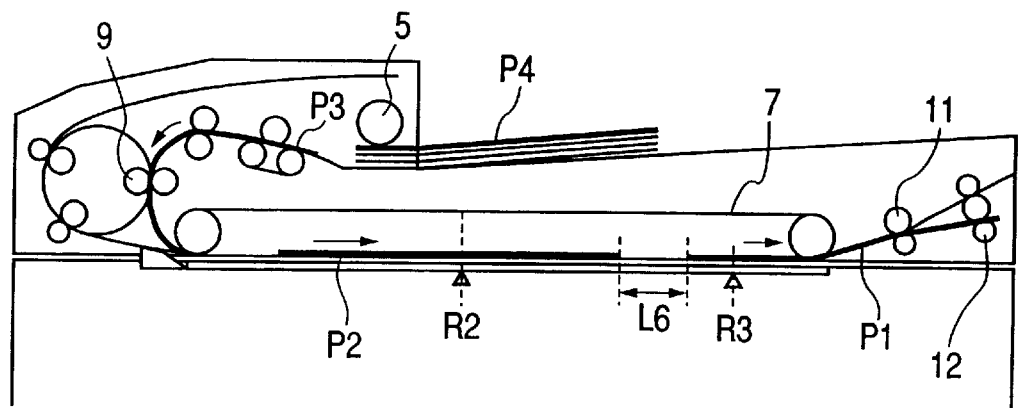
FIGS. 14A and 14B are views showing the flow of an original when the half-size single-face original is carried (part 2)

FIG. 14A shows the positions of the originals P1, P2 and P3 in the paths while the image reading on the original P2 is being performed. As shown in FIG. 14A, while the image reading on the original P2 is being performed, the preceding original P1 is carried by the wide belt 7, the manual feed registration roller 11 and the paper discharge roller 12. The carrying speed of the belt 7 is set to be equal to that of the roller 11. However, the carrying speed of the roller 12 is controlled to be equal to or slightly slower than that of the belt 7 and the roller 11.

Figure 14B:
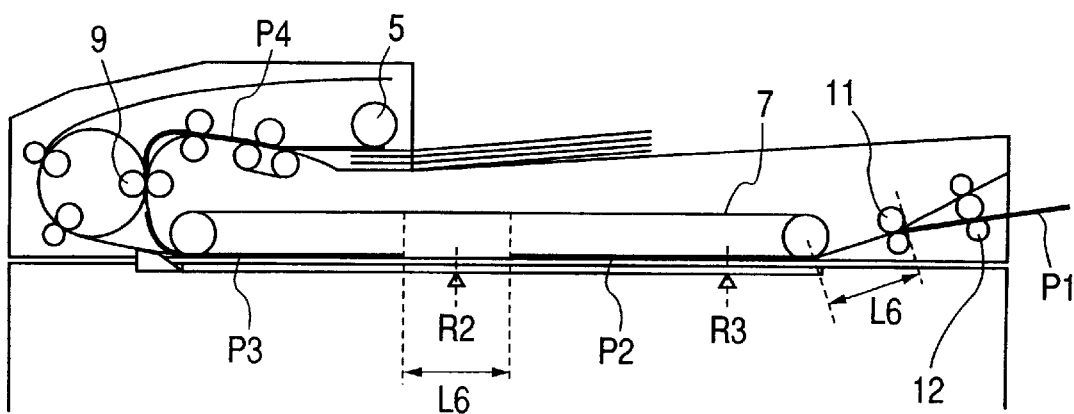

FIG. 14B shows a state when the image reading on the subsequent original P2 terminates. When the image reading on the original P2 terminates, the carrying of the originals P2 and P3 by the belt 7 once stops essentially same as in the case of the originals P1 and P2. Thus, the originals P2 and P3 once stop on the platen 3. However, at this time, the trailing edge of the preceding original P1 has passed through the nipping point of the roller 11, and the original P1 is being solely carried by the paper discharge roller 12. The original P1 is then discharged onto the paper discharge tray 10.

Subsequently, carrying speed control of the wide belt 7 and feed speed control of the second feed roller 9 will be explained with reference to FIGS. 43A to 43D. Numeral 601 in FIG. 43A denotes a speed profile representing transition of the carrying speed of the belt 7. That is, the carrying speed is once accelerated up to a speed V2 faster than an image formation speed V1 and then returned to the speed V1 during a period from a time t1 to a time t3. Then, the speed V1 is maintained.

Figure 43A:
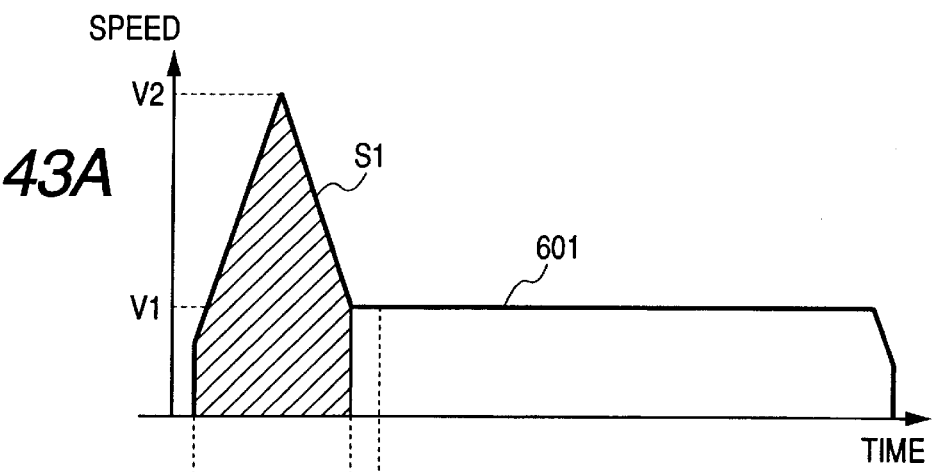
FIGS. 43A, 43B, 43C and 43D are views for explaining carrying speed control of a wide belt 7 and feed speed control of a second feed roller 9.
Figure 43B:
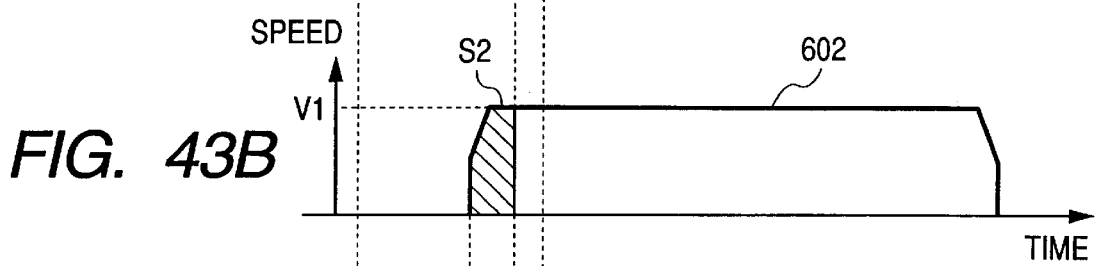

Numeral 602 in FIG. 43B denotes a speed profile representing transition of the feed speed of the second feed roller 9. That is, the feed speed is accelerated up to the image formation speed V1 during a period from a time t2 to the time t3, and then the speed V1 is maintained.

Figure 43C:
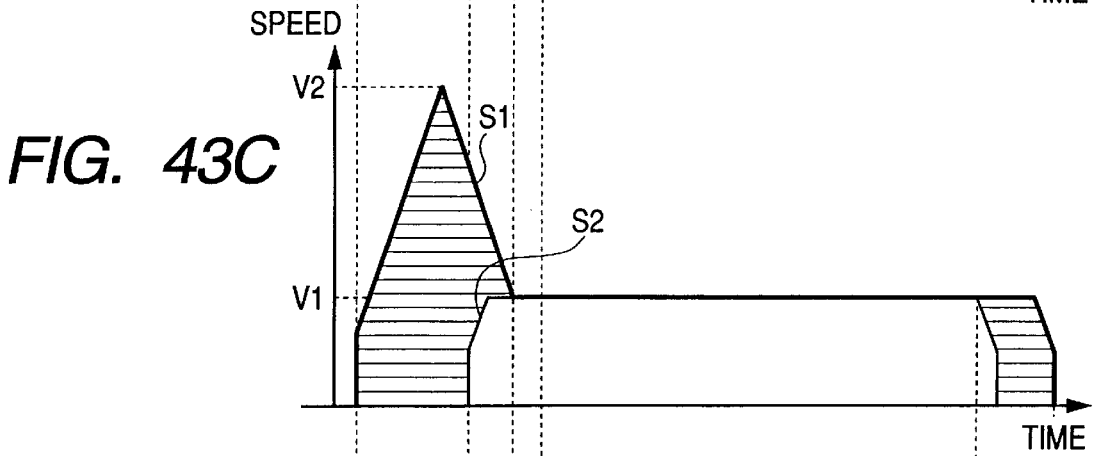

FIG. 43C shows a speed profile which is obtained by composing the speed profile 601 shown in FIG. 43A and the speed profile 602 shown in FIG. 43B.

Figure 43D:
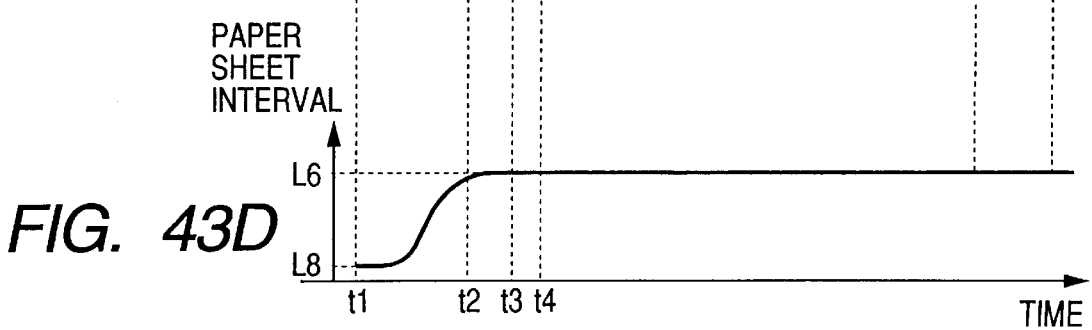

Transition of an interval between the originals P1 and P2 shown in FIG. 43D will be simply explained hereinafter. In a state that both the originals P1 and P2 stop, a sheet-to-sheet interval (or distance) L8 is given. In this state, the carrying by the wide belt 7 starts at the time t1, and the interval becomes gradually longer. As explained above, also the carrying of the second feed roller 9 then starts at the time t2, and the carrying speeds of the belt 7 and the roller 9 are raised up to the speed V1 and coincide with each other at the time t3. Then, the image reading starts at a time t4. In a case where a distance by which the preceding original P1 is carried during the period from the time t1 to the time t3 is given as a distance S1 and a distance by which the subsequent original P2 is carried during the period from the time t2 to the time t3 is given as a distance S2, a following equation is given.

$$S1-S2=L6-L8$$

The time t2 is determined based on this equation. Practically, when the preceding original is carried by the distance (L6−L8) by the wide belt 7, the second feed roller 9 is driven based on the predetermined speed profile.

It should be noted that the speed V2 is not relative to such relation. That is, the speed V2 is determined based on the image formation speed V1 and the distance L5 (i.e., distance between reading position and standby position).

At the time when the image formation on the preceding original P1 terminates, the trailing edge of the subsequent original P2 is still nipped by the second feed roller 9. When the trailing edge of the subsequent original P2 passed through the nipping point of the roller 9, the roller 9 stops to enable registration loop control of the further-subsequent original P3. Even after the roller 9 stops, the originals P1 and P2 are carried by the belt 7. The belt 7 stops when the leading edge of the original P2 reaches the position in front of the reading position R2 (distance L5). At this time, the trailing edge of the original P2 is at the position apart from the nipping point of the roller 9 by the distance L8.

Operation in large-size single-face original carrying mode.

The operation in the large-size single-face original carrying mode is not essentially different from that in the half-size single-face original carrying mode. However, since the size of the large-size single-face original is different from that of the half-size single-face original, the following differences can be seen.

That is, the image reading in the half-size single-face original carrying mode is performed at the position apart from the nipping point of the second feed roller 9 by the distance L2, where L2=L8+carried original size+L5. On the other hand, the image reading in the large-size single-face original carrying mode is performed at the position apart from the nipping point of the roller 9 by the distance L3 where L3=L10+carried original size+L5. In this case, the distance L10 represents the distance between the trailing edge of the original and the nipping point of the roller 9 at the time when the carrying by the belt 7 once stops.

Figure 15A:
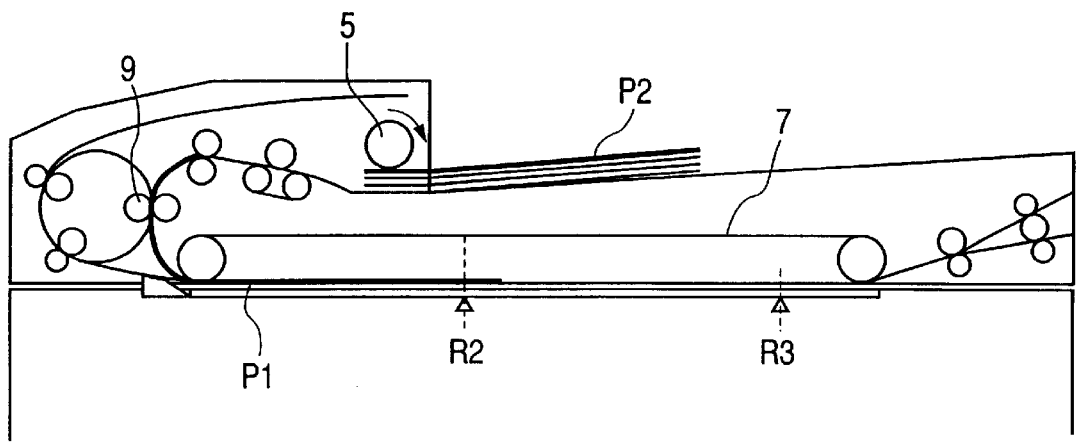
FIGS. 15A and 15B are views showing a flow of an original when a large-size single-face original is carried (part 1)

When the trailing edge of the original P1 has passed through the nipping point of the roller 5, the separation clutch 106 is turned on. Thus, the feeding of the original P2 by the roller 5 starts. FIG. 15A shows such a state.

Figure 15B:
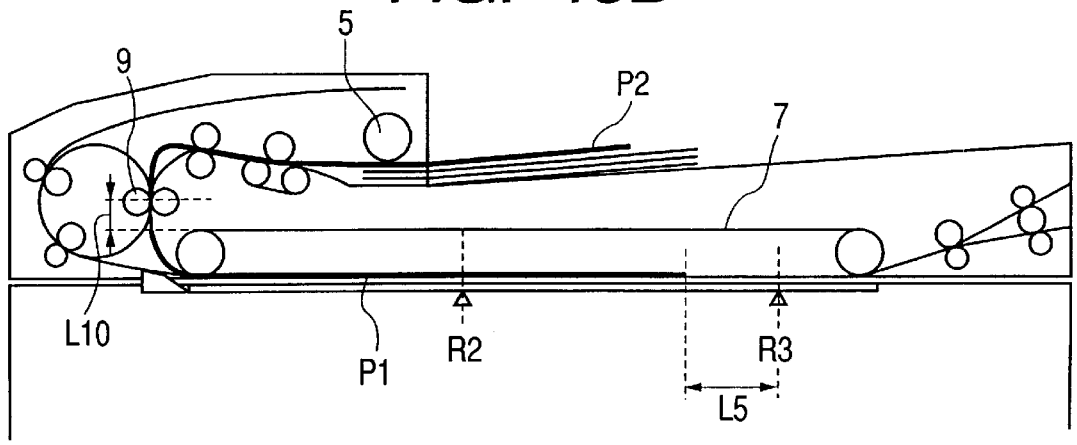

Since the distance L10>0, the original is solely carried by the belt 7. Then, in a state that the trailing edge of the original once stops after passing through the paper feed sensor 35 and advancing by a predetermined distance, the trailing edge of this original has passed through the nipping point of the roller 9. FIG. 15B shows this state.

Figure 16A:
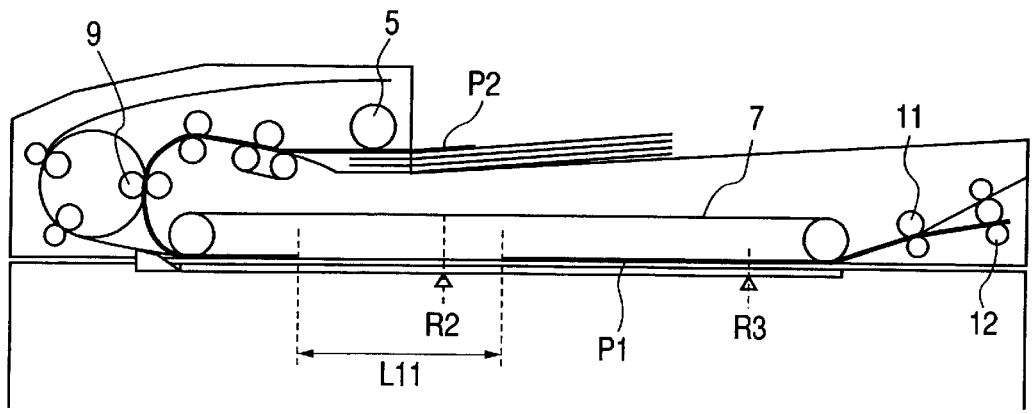
FIGS. 16A and 16B are views showing a flow of an original when the large-size single-face original is carried (part 2)

In addition, the operation in the large-size single-face original carrying mode is different from that in the half-size single-face original carrying mode in the following manner. That is, in the half-size single-face original carrying mode, when the carrying speed (image formation speed) of the preceding original P1 by the wide belt 7 and the carrying speed of the second feed roller 9 carrying the subsequent original P2 coincide with each other, the speed of the roller 9 is controlled such that the sheet-to-sheet distance is given as the distance L6. On the other hand, in the large-size single-face original carrying mode, the speed of the roller 9 is controlled such that the sheet-to-sheet distance is given as a distance L11. FIG. 16A shows a state after such the speed control has been performed.

Figure 16B:
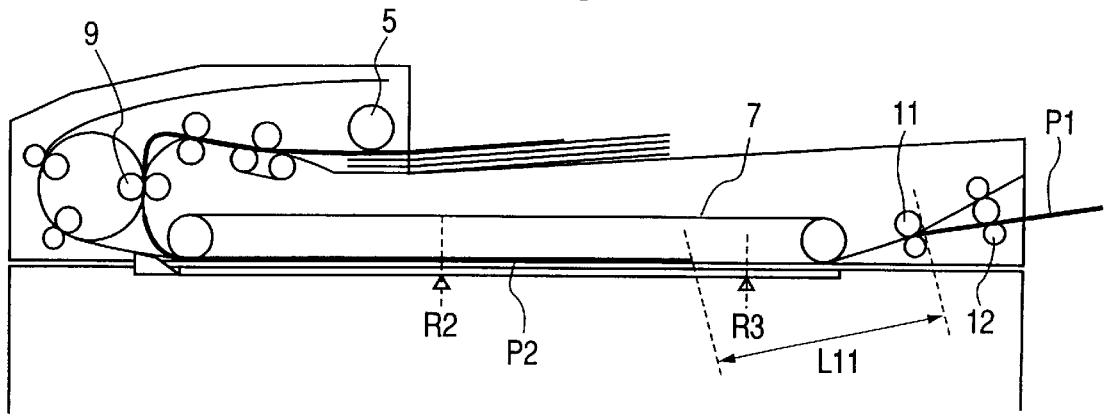

Both the sheet-to-sheet distances L6 and L11 are set to be longer than the distance between the nipping point of the roller 11 and the leading edge of the original to be discharged next to the currently discharged original in the state that the original is once stopped after the image reading is performed. Concretely, the distance L6 is made longer than the distance between the nipping point of the roller 11 and the leading edge of the subsequent original P2 once stopped after the image reading on the original P2 is performed. On the other hand, the distance L11 is made longer than the distance between the nipping point of the roller 11 and the leading edge of the subsequent original P2 once stopped after the image reading on the original P1 is performed. FIG. 16B shows a state after the original image reading is performed.

Explanation of half-size double-face original carrying.

Figure 17A:
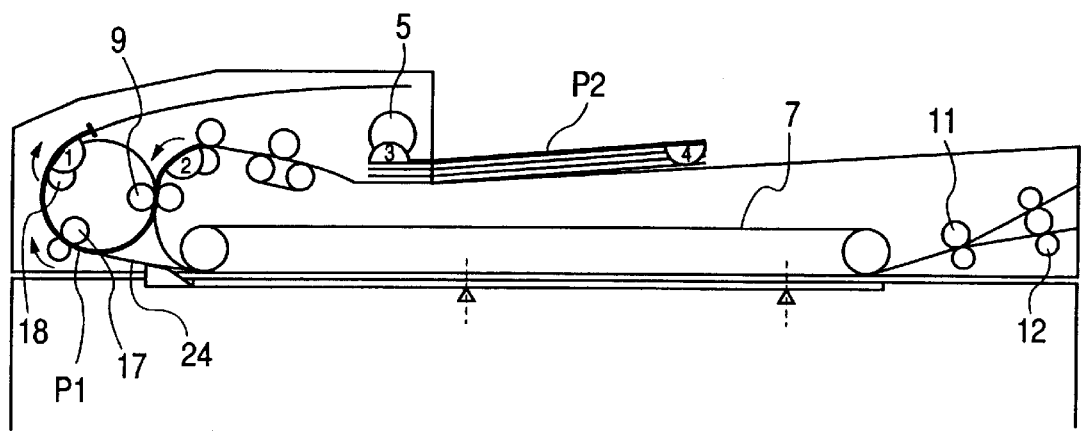
FIGS. 17A and 17B are views showing a flow of an original when a half-size double-face original is carried (part 1)

FIGS. 17A, 17B, 18A, 18B, 19A, 19B, 20A and 20B show the flow of the originals in the double-face original carrying mode. In the case where the double-face original carrying mode is being set, the inversion paper feed flapper 22 and the inversion flapper 23 are set at the positions respectively indicated by the solid lines in FIG. 3, whereby the inversion feed paths (h), (f) and (i) are used as the carrying path. Therefore, the original carried by the first and second feed rollers 16 and 9 is guided to the path (i) through the paths (h) and (f). FIG. 17A shows such a state.

Figure 17B:
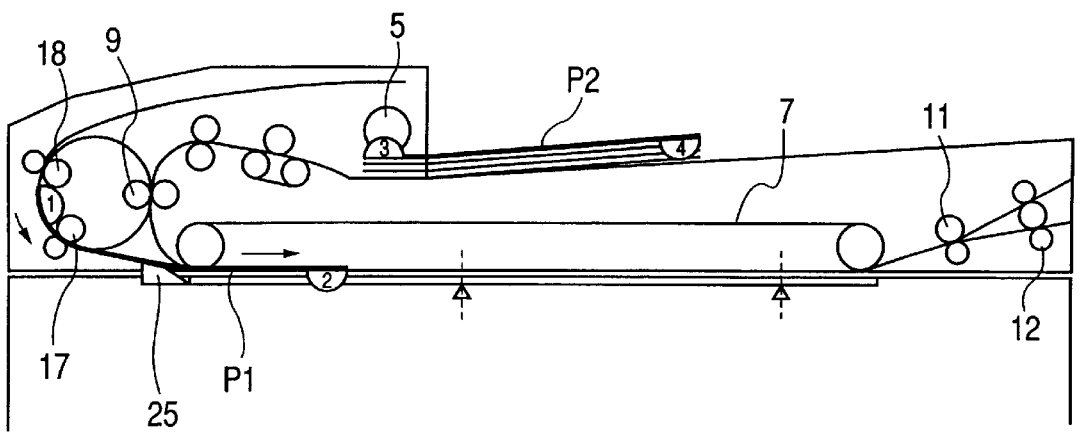

When the trailing edge of the original P1 passes through the one-way flapper 24, the rollers 17 and 18 are inversely rotated to oppositely carry the original P1 in the paths (h), (f) and (i). Then, the original P1 is guided to the carrying path (d) on the platen 3 through the feed and discharge flapper 25 at the position indicated by the solid line in FIG. 4. FIG. 17B shows such a state.

Figure 18A:
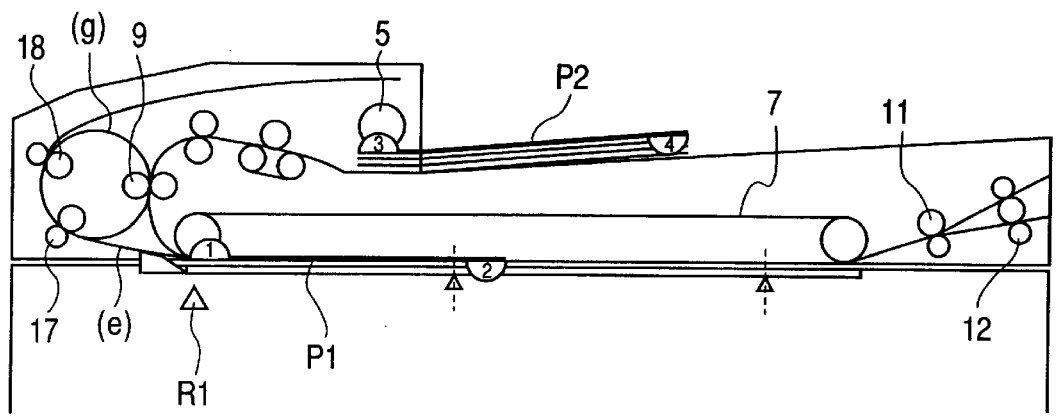
FIGS. 18A and 18B are views showing the flow of an original when the half-size double-face original is carried (part 2)

When the trailing edge of the original P1 carried to the path (d) is detected by the inversion sensor 50 and then this edge is carried from the edge-detected position by a predetermined distance, the carrying of the original P1 by the belt 7 stops. Thus, the original P1 is placed at the reading position R1 used in the fixed reading mode, with its second face turned downward. FIG. 18A shows such a state. When the placing (or stacking) of the original P1 is completed, the path change solenoid 107 is turned on, whereby the flappers 22 and 25 are set at the positions respectively indicated by the alternate long-and-short dashed lines in FIG. 4.

Figure 18B:
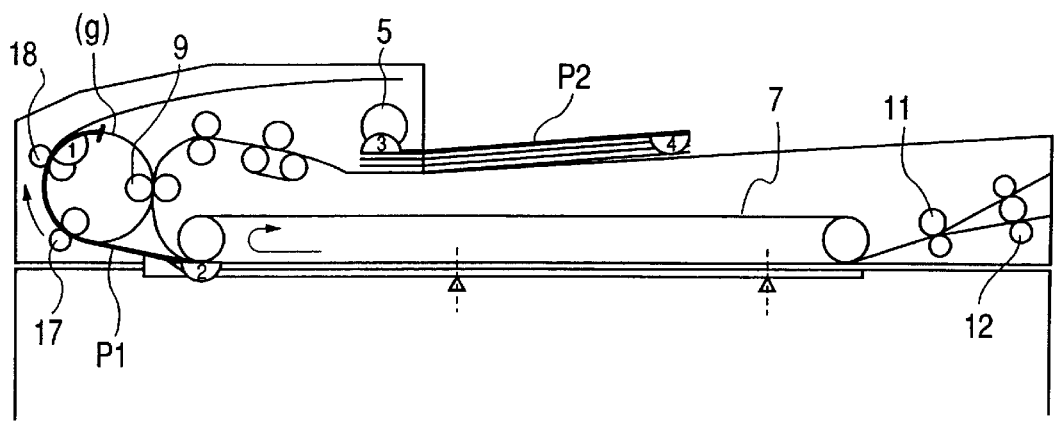

Further, when the placing of the original P1 is completed, the second face of the original P1 is scanned by the scanner unit 204. Then, when the image reading on the original P1 is completed, the wide belt 7 is inversely rotated. At the same time, the flapper 23 is moved to the position indicated by the alternate long-and-short dashed line in FIG. 3. Thus, the original P1 is carried by the belt 7 to the path (e) through the flapper 25, and is further guided to the path (g) by the first and second inversion rollers 17 and 18. FIG. 18B shows such a state. At the time when the leading edge of the original P1 is detected by the inversion sensor 50 and the original P1 is then carried to the position apart from the edge-detected position by a predetermined distance, the belt 7 once stops and is then regularly rotated. Then, when the leading edge of the regularly carried original P1 reaches the path (d) on the platen 3, the roller 9 and the belt 7 are controlled such that the carrying speeds thereof are coincident with each other.

When the trailing edge of the original P1 guided to the path (g) has passed through the nipping point of the roller 9, the roller 9 stops to wait for the subsequent original P2 to reach the roller 9. The original P1 passed through the roller 9 is solely carried by the belt 7. The trailing edge of the original P1 being carried by the belt 7 is detected by the paper feed sensor 35, and the original P1 is then carried by a predetermined distance. At this time, the carrying of the original P1 stops, and the original P1 is again placed at the reading position R1 with its first face turned downward.

Further, when the trailing edge of the original P1 is detected by the sensor 35, the original P2 is separated from the sheaf of originals, and the known bias correction is performed by the roller 9.

Figure 19A:
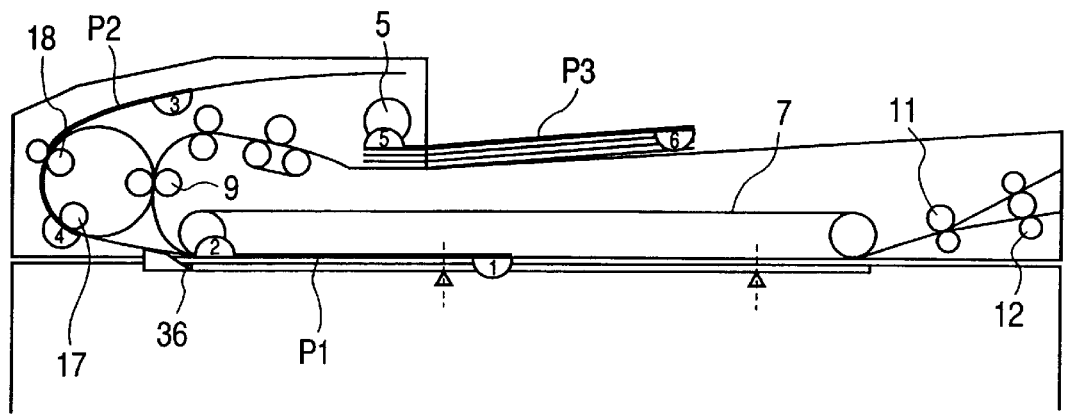
FIGS. 19A and 19B are views showing the flow of an original when the half-size double-face original is carried (part 3)

When the placing of the original P1 completes, its first face is scanned by the scanner unit 204. While the first face is being scanned, the original P2 is inversely carried in the same manner as for the original P1 and on standby in a state that the portion nearby the leading edge on the original P2 is being nipped by the roller 17. FIG. 19A shows such a state.

Figure 19B:
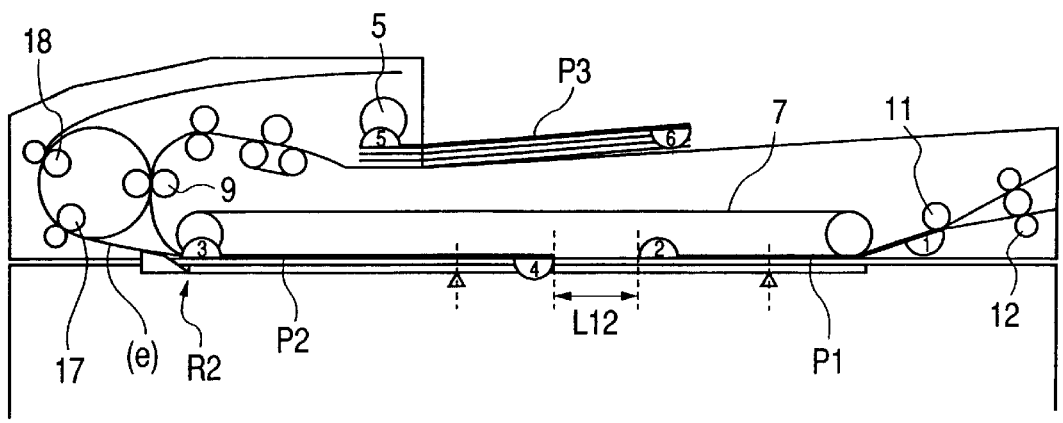

Subsequently, when the scanning of the first face of the original P1 terminates, the first and second inversion rollers 17 and 18 are inversely rotated, and the belt 7 is regularly rotated. Thus, the subsequent original P2 is carried together with the preceding original P1 on the platen 3. Then, when the original P2 reaches the reading position R1, the belt 7 stops. Thus, the original P2 is located at the reading position R1, and the original P1 is located at a position apart from the original P2 by a predetermined sheet-to-sheet distance (L12) on the platen 3. FIG. 19B shows such a state. When the placing of the original P2 at the position R1 is completed, the second face of the original P2 is scanned by the scanner unit 204.

When the scanning on the second face of the original P2 terminates, the belt 7 is inversely rotated to carry the originals P2 and P1 toward the inversion feed path (e). At a time when the leading edge of the original P2 is detected by the inversion sensor 50 and the original P2 is further carried from the edge-detected position by a predetermined distance, the belt 7 once stops and is then regularly rotated. At this time, since the trailing edge of the original P2 has passed the belt 7, only the original P1 is carried by the belt 7 on the platen 3.

Figure 20A:
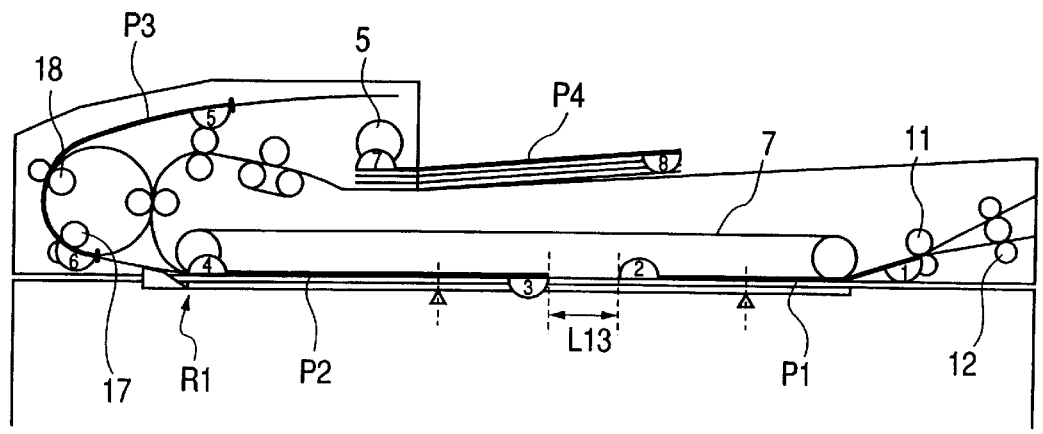
FIGS. 20A and 20B are views showing the flow of an original when the half-size double-face original is carried (part 4)

On the other hand, the inversely carried original P2 is carried by the roller 9. When the leading edge of the original P2 reaches the path (d) on the platen 3, the roller 9 and the belt 7 are controlled such that the carrying speeds thereof are coincident with each other. When the trailing edge of the original P2 has passed through the nipping point of the roller 9, the roller 9 stops to wait for the next original P3 to reach the roller 9. The original P2 passed through the roller 9 is solely carried by the belt 7. After the trailing edge of the original P2 being carried by the belt 7 is detected by the sensor 35, the original P2 is further carried by a predetermined distance and stopped. Then, the original P2 is located again at the reading position R1 with its first face turned downward. FIG. 20A shows the positions of the originals P1 and P3 when the original P2 is placed at the reading position R1. In the state that the original P2 is being placed at the position R1, the original P3 is on standby in the state that it is being nipped by the roller 17, as in case of the original P2 shown in FIG. 19A. A distance between the original P2 placed at the position R1 and the original P1 is given as a sheet-to-sheet distance L13. It is possible to drive and control the belt 7 such that the sheet-to-sheet distance is given as the distance L12.

When the placing of the original P2 at the reading position R1 is completed, the first face of the original P2 is scanned by the scanner unit 204. Then, when the scanning of the first face of the original P2 terminates, the rollers 17 and 18 are inversely rotated, and the belt 7 is regularly rotated. Further, the roller 12 starts rotating. Thus, the original P3 is carried toward the path (d) on the platen 3 by the rollers 17 and 18, and also the originals P2 and P1 are carried toward the roller 12 through the path (d). Then, when the original P3 reaches the reading position R1, the belt 7 stops, and the original P3 is placed at the position R1 with its second face turned downward.

Figure 20B:
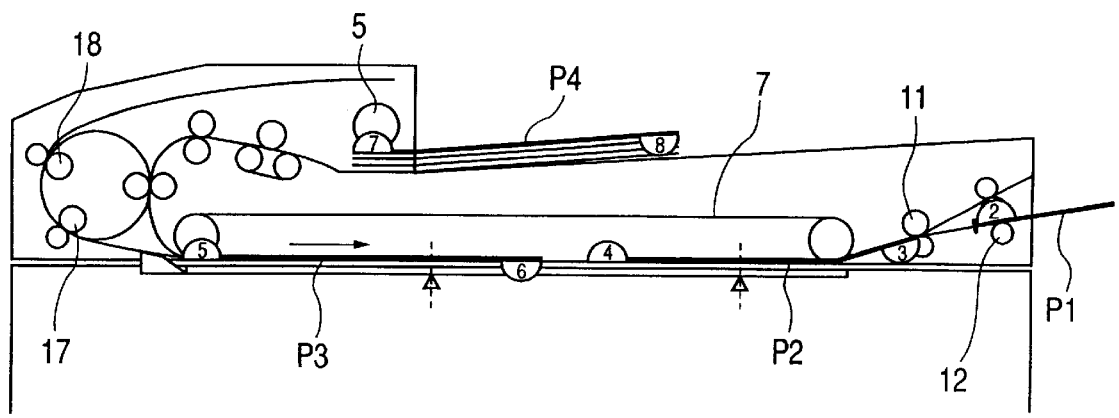
Figure 21A:
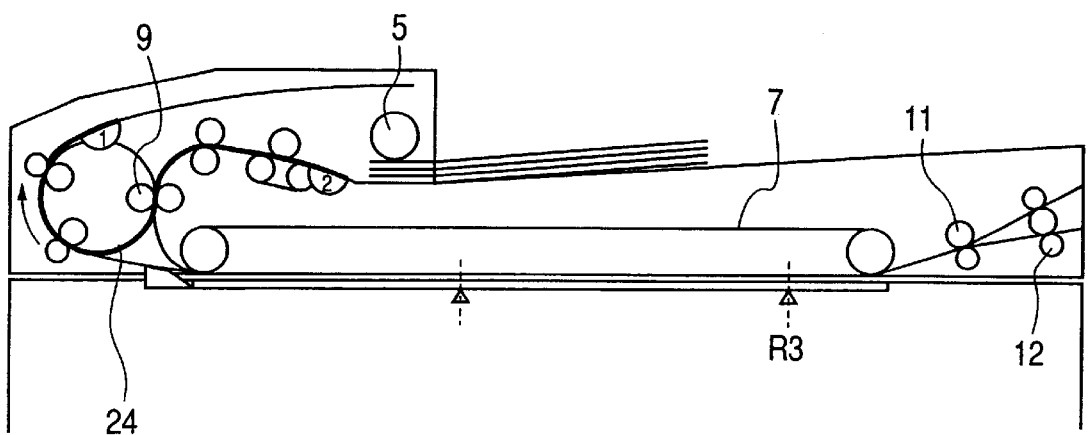
FIGS. 21A and 21B are views showing a flow of an original when a full-size double-face original is carried (part 1)
Figure 21B:
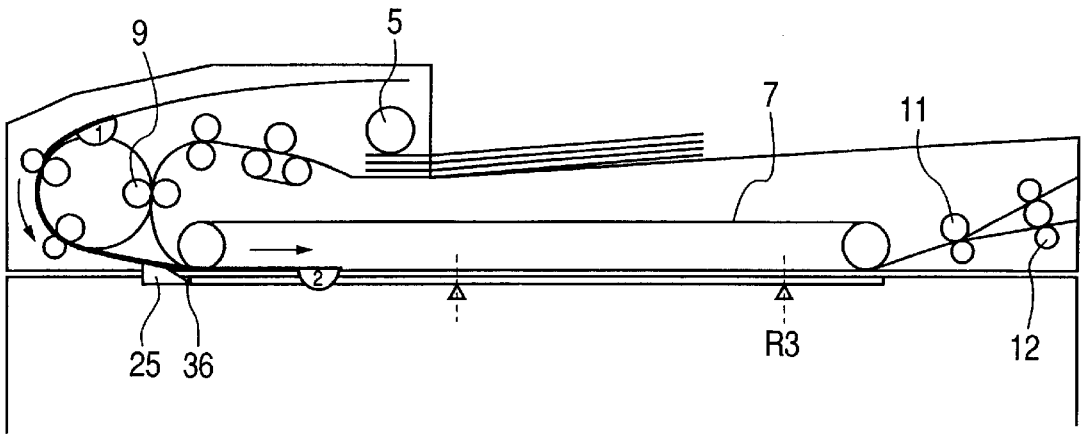

In the state that the original P3 is being placed at the reading position R1, as shown in FIG. 20B, since the trailing edge of the original P2 is at the position immediately before the nipping point of the manual feed registration roller 11, the trailing edge of the original P1 of which sheet-to-sheet distance to the original P2 is given by the distance L12 has passed through the nipping point of the roller 11. The original P1 passed through the nipping point of the roller 11 is solely carried by the roller 12 and discharged onto the tray 10.

Hereafter, such a circulation as described above is repeated. Then, the scanning of the first face of a final original Pn terminates, and the final original Pn and a prefinal original Pn−1 in the same state as that shown in FIG. 19B are continuously carried toward the paper discharge roller 12 by the belt 7 through the path (d) on the platen 3. Thus, these originals are discharged by the roller 12 at once. Explanation of full-size double-face original carrying.

The operation in the full-size double-face original carrying is different from that in the half-size double-face original carrying in the following manner. That is, in the full-size double-face original carrying, when the subsequent original reaches the reading position R1 with its second face turned downward, the preceding original has passed through the nipping point of the paper discharge roller 12.

Figure 22A:
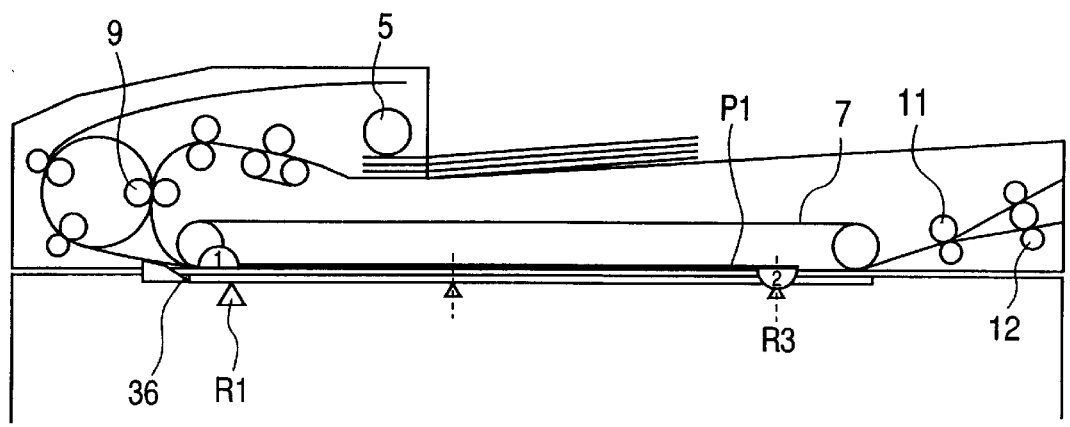
FIGS. 22A and 22B are views showing the flow of an original when the full-size double-face original is carried (part 2)
Figure 22B:
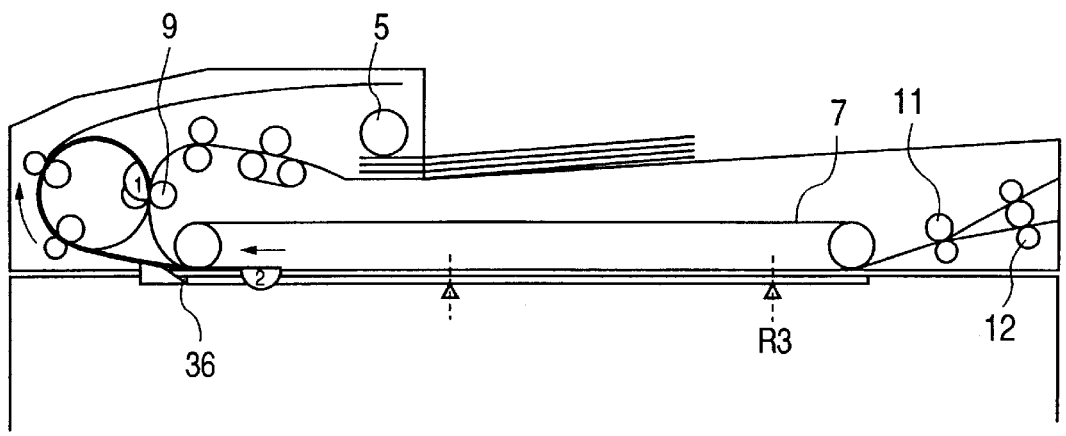

FIGS. 21A, 21B, 22A, 22B, 23A, 23B and 24 show the flow of the originals in the full-size double-face original carrying. The preceding original P1 is inverted (FIG. 21A), guided to the carrying path (d) on the platen 3 with its second face turned downward (FIG. 21B), and placed at the reading position R1 used in the fixed reading mode (FIG. 22A). Thus, the second face of the original P1 is scanned by the scanner unit 204. Then, the original of which second face has been scanned is inverted (FIG. 22B), guided to the path (d) with its first face turned downward, and placed at the reading position R1. When the placing of the original P1 completes, the first face of the original P1 is scanned by the scanner unit 204.

Figure 23A:
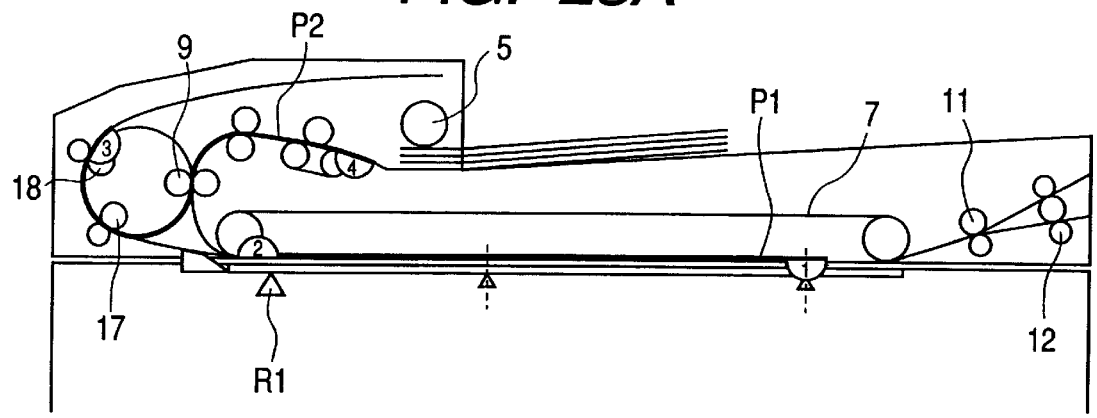
FIGS. 23A and 23B are views showing the flow of an original when the full-size double-face original is carried (part 3)

At substantially the same time when the trailing edge of the preceding original is detected by the paper feed sensor 35, the separation of the subsequent original P2 starts. Thus, the known bias correction is performed by the stopped second feed roller 9, and then the original P2 is carried to the inversion feed paths (h), (f) and (i) as shown in FIG. 23A.

Figure 23B:
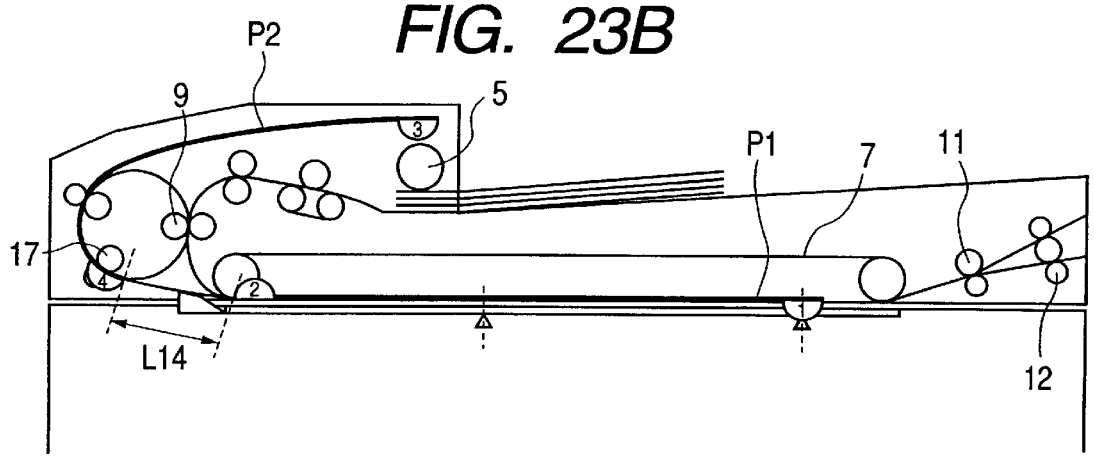

While the first face of the original P1 is scanned by the scanner unit 204, the original P2 is inverted in the same manner as for the original P1. Thus, as shown in FIG. 23B, the portion nearby the leading edge of the original P2 at the time when the inversion operation is completed is nipped by the roller 17 and on standby. At this time, a sheet-to-sheet distance between the original P1 and the standby original P2 is controlled to be a distance L14.

Figure 24:
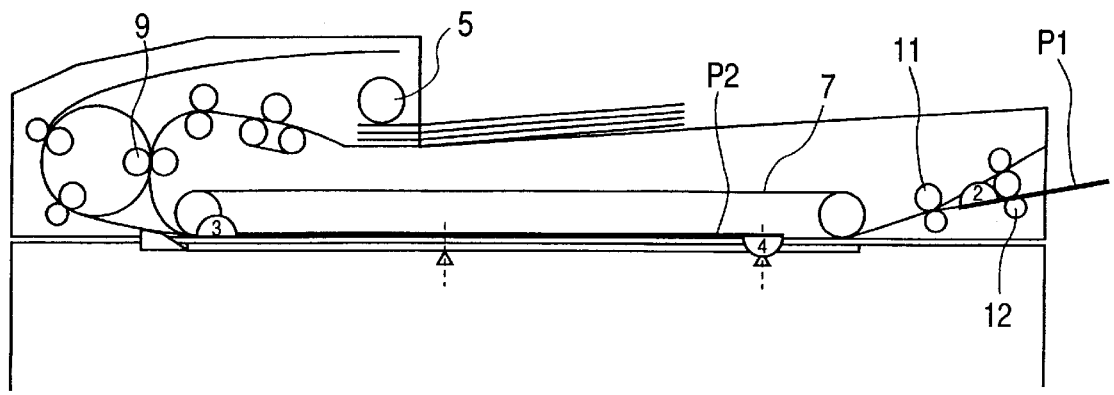
FIG. 24 is a view showing the flow of an original when the full-size double-face original is carried (part 4)

When the scanning on the first face of the original P1 terminates, the rollers 17 and 18 start to reversely rotate, and simultaneously the belt 7 starts to regularly rotate. As shown in FIG. 24, the value of the distance L14 is determined such that the trailing edge of the original P1 has passed through the nipping point of the manual feed registration roller 11 when the original P2 is placed on the platen 3. Hereafter, the similar operation is repeated until the carrying of the final original Pn terminates.

Original carrying in manual feed original copy.

Figure 25A:
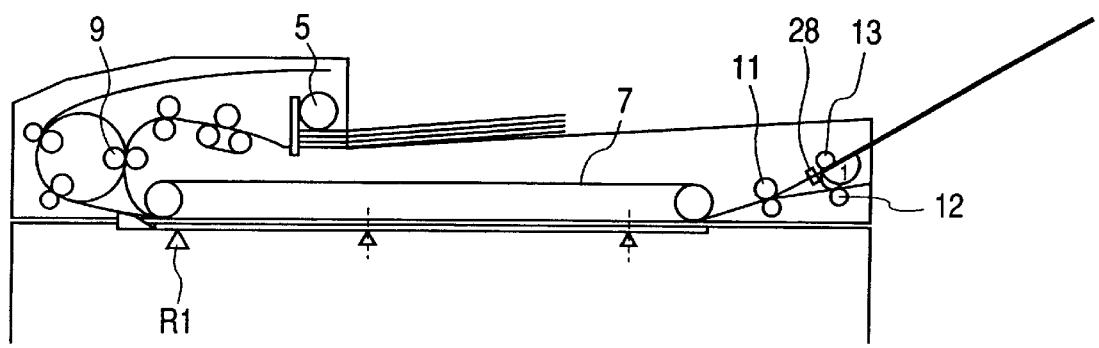
FIGS. 25A and 25B are views showing a flow of an original when a manually fed original is carried (part 1)
Figure 25B:
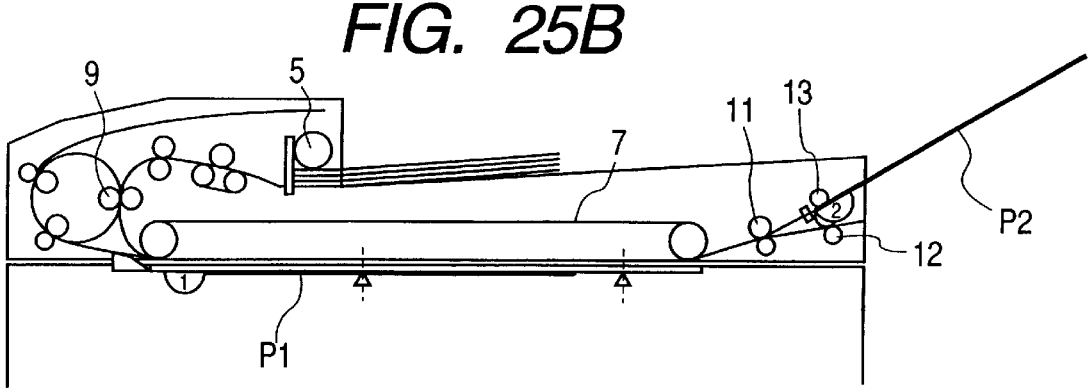

FIGS. 25A, 25B, 26A and 26B show the flow of the originals in the manual feed original carrying. As shown in FIG. 25A, when the original is set and the set original is detected by the manual feed original sensor 60, the manual feed flapper 27 and the manual feed shutter 28 are moved to the positions respectively indicated by the solid lines in FIG. 4, so that the manually fed original is carried by the manual feed roller 13. The bias correction of the carried original is performed by the stopped roller 11, and the original is then guided to the path (d) on the platen 3 by the belt 7. When the leading edge of the manually fed original reaches the reading position R1 on the platen 3, the belt 7 stops, and the original is scanned by the scanner unit 204. Then, the flapper 27 and the shutter 28 are returned to the positions respectively indicated by the alternate long-and-short dashed lines in FIG. 4, thereby enabling setting of the next original (FIG. 25B). When the scanning by the scanner unit 204 terminates, the belt 7 is reversely rotated to carry the original toward the paper discharge roller 12.

Figure 26A:
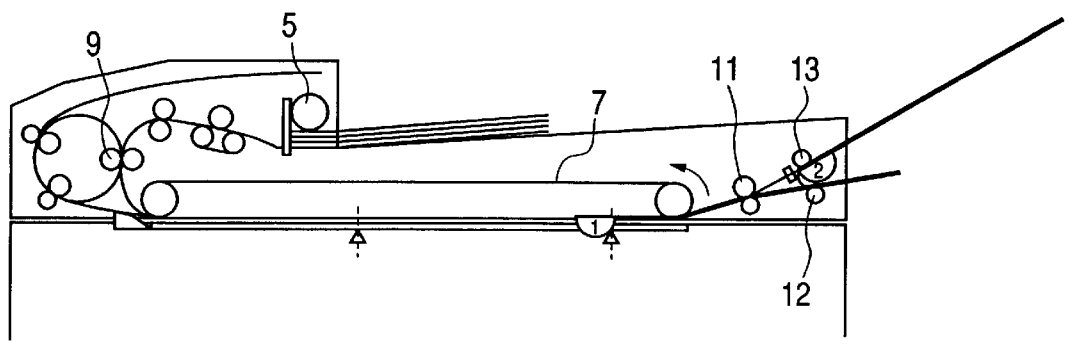
FIGS. 26A and 26B are views showing the flow of an original when the manually fed original is carried (part 2)
Figure 26B:
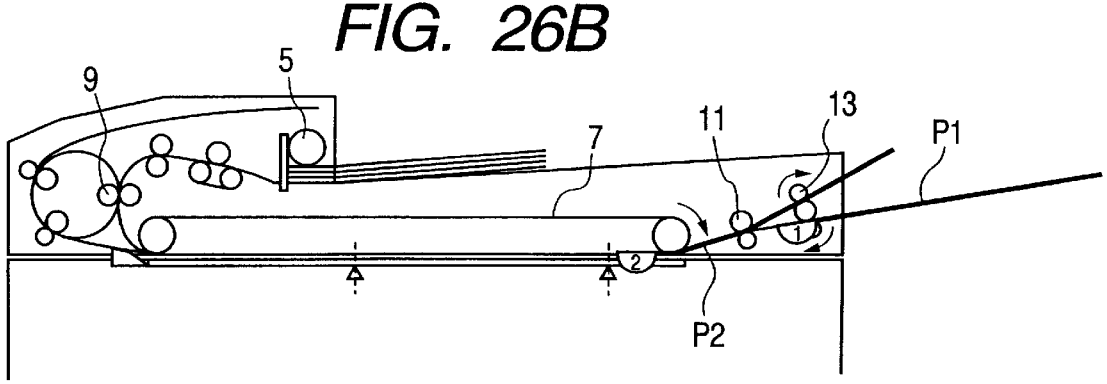

When the roller 12 rotates, the manual feed roller 13 also rotates. However, since the leading edge of the original P2 next fed manually is restricted by the shutter 28, the roller 13 slips, whereby the original P2 can not advance (FIG. 26A). Then, when the trailing edge of the original P1 is detected by the registration sensor 34, the roller 11 stops, and the flapper 27 and the shutter 28 are moved to the positions respectively indicated by the solid lines in FIG. 4. Subsequently, the original P2 is carried toward the roller 11 by the paper feed roller 13. As described above, after the bias correction is performed, the original P2 is carried along the path (d) on the platen 3 and placed at the reading position R1.

Explanation of control unit.

Subsequently, the ADF shown in FIGS. 27A and 27B will be explained. In FIGS. 27A and 27B, numerals 30 to 35, 39 and 50 denote the parts respectively identical with those in FIG. 4, and numeral 40 denotes the part identical with that in FIG. 1.

Numeral 201 denotes a CPU. Drive units of various loads and sensor signals from various sensors are connected to input/output ports of the CPU 201. Numeral 201a denotes a RAM which is used as a working area. Numeral 201b denotes a ROM in which various control programs have been stored. Numeral 202 denotes a communication control unit which controls data communication to the body 1 of the copy machine.

Numeral 203a denotes a controller to which a reference clock, an ON/OFF signal and the like are input from the CPU 201. The number of motor rotations is determined based on this reference clock. The controller 203a drives and controls the separation motor 100 (DC brush motor) through a driver 203. Numeral 204 denotes a stepping motor driver which drives the carrying motor 101 (stepping motor) on the basis of a phase excitation signal and a motor current control signal from the CPU 201. Numeral 205 denotes a stepping motor driver which constant-current drives the belt motor 102 (stepping motor) on the basis of the phase excitation signal and the motor current control signal from the CPU 201. Numeral 206 denotes a driver which constant-voltage drives a rocking motor 103 (stepping motor). Numeral 207a denotes a controller for an FG servomotor. The controller 207a drives and controls the paper discharge motor 104 (DC brush motor) through a driver 207. As shown in FIG. 4, an encoder to detect rotational speed of the motor 104 is composed of the clock board 104a and the paper discharge clock sensor 104b.

Numeral 208 denotes a driver which drives the shutter solenoid 105, numeral 209 denotes a driver which drives the separation clutch 106, numeral 210 denotes a driver which drives the path change solenoid 107, numeral 211 denotes a driver which drives the inversion flapper solenoid 108, and numeral 212 denotes a driver which drives the paper discharge flapper solenoid. These drivers 208 to 212 operate respectively based on the signals connected to the input/output ports of the CPU 201.

The separation sensor 30, the bias sensor 31, the mixture sensor 32, the inversion sensor 33, the manual feed registration sensor 34, the paper feed sensor 35, the inversion sensor 50, the manual-fed original sensor 60, the registration sensor 39, the original setting sensor 40, the original trailing edge sensor 41, the final original sensor 43, the paper width sensor 44, the paper feed roller home sensor 45 and the rocking position sensor 46 are connected to the input/output ports of the CPU 201 and used to monitor the movements of the originals and the movable loads in the apparatus.

Explanation of control programs.

FIGS. 28 to 34, 35A, 35B, 36A, 36B, 37A, 37B and 38 to 42 are flow charts showing examples of control programs stored in the ROM 201b shown in FIG. 27B. When a copy key of a not-shown operation unit on the body 1 of the copy machine is depressed, control starts. Initially, it is judged whether or not the original setting sensor 40 detects that the original has been set on the original tray 4 (main1). If judged that the sensor 40 detects the original setting, then it is judged whether or not the copy mode instructed by the body 1 is the single-face original mode (main2). If judged that the copy mode is not the single-face original mode, a series of copy processes is performed in the double-face original mode (main6), and then the control terminates. On the other hand, if judged that the copy mode is the single-face original mode, then it is judged whether or not the original trailing edge sensor 41 is OFF (main3). If judged that the sensor 41 is OFF, the series of copy processes is performed in a later-described first running reading mode (main4), and then the control terminates. On the other hand, if judged that the sensor 41 is not OFF, the series of copy processes is performed in a later-described second running reading mode (main5), and then the control terminates.

For the present embodiment, an example where mode selection according to the original size is restricted only based on a feeding direction controlled by ON/OFF of the sensor 41 will be explained. However, as described above, the mode selection according to the original size may be restricted based on the combination of the sensor 41 and the original width detection means (i.e., paper width sensor 44) provided under the original tray 4.

On the other hand, if judged that the sensor 40 does not detect the original setting, then it is judged whether or not a manual feed original setting sensor detects that the original has been set on the manual feed original tray (main7). If judged that the sensor detects the original setting, the series of copy processes is performed in a later-described manual feed mode (main8), and then the control terminates.

First running reading mode.

Figure 28:
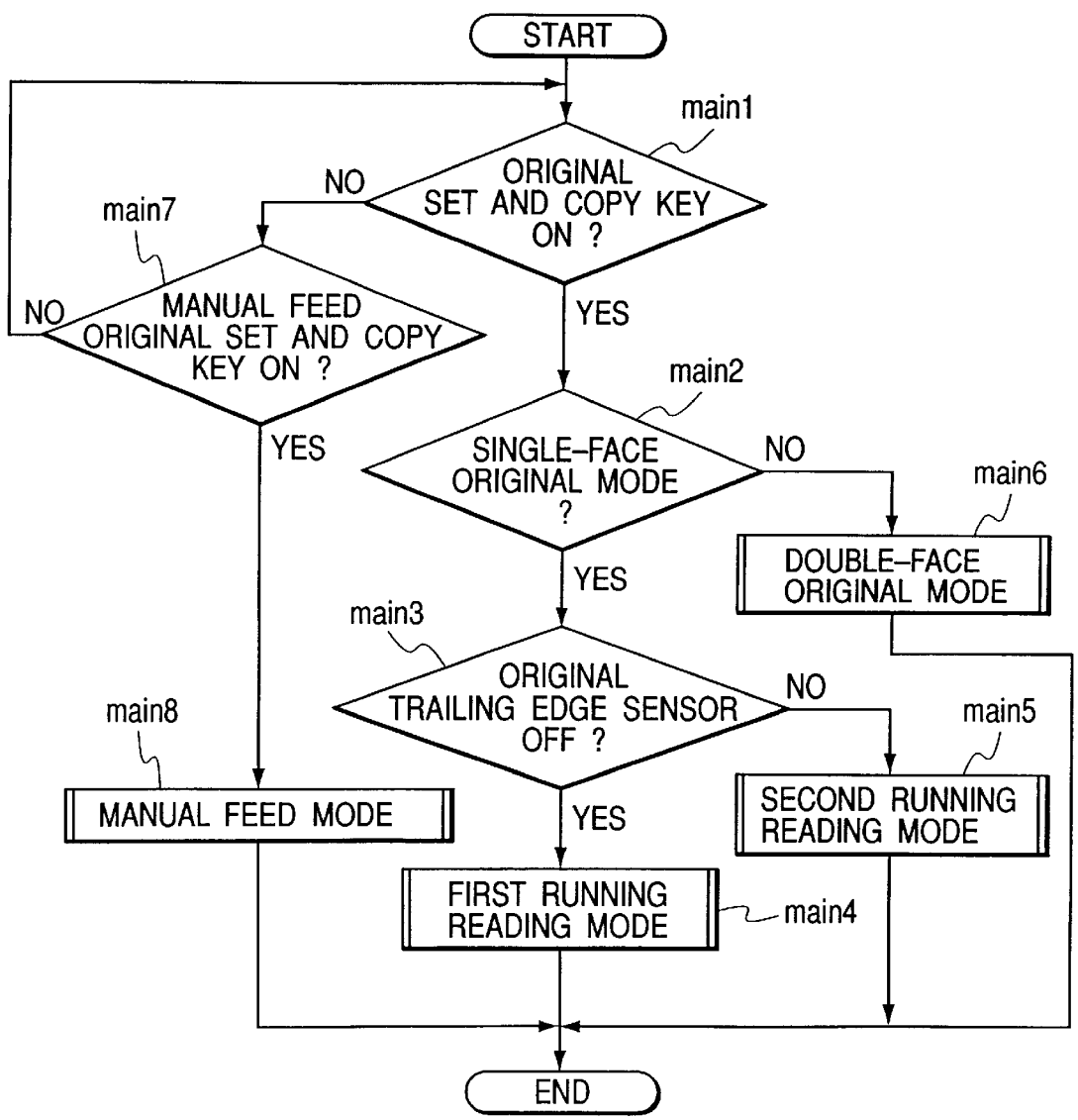
FIG. 28 is a flow chart showing an example of a control program stored in a ROM 201b in FIGS. 27A and 27B.
Figure 29:
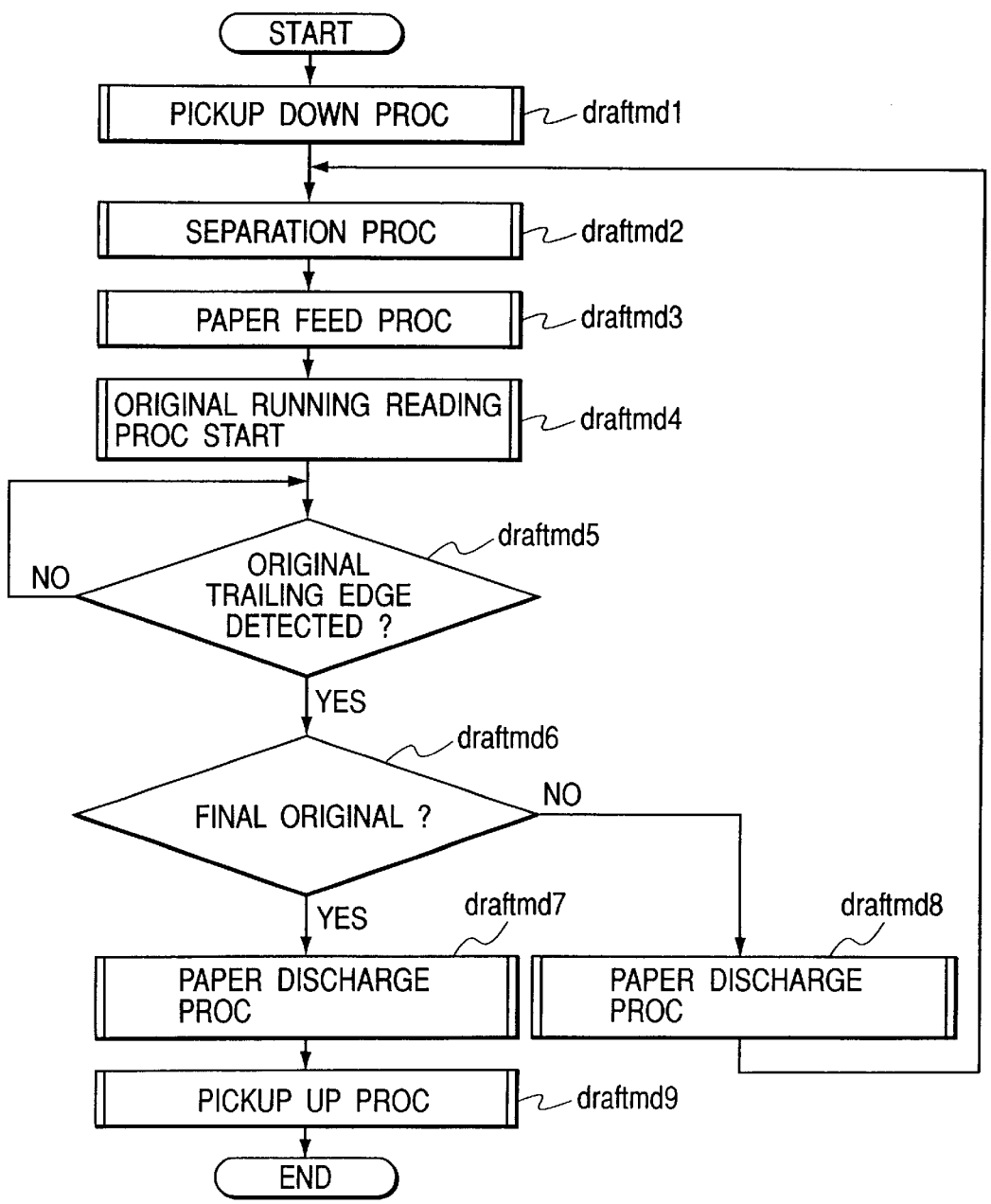
FIG. 29 is a flow chart showing an example of a control program in a first running reading mode (main4) in FIG. 28.

FIG. 29 is the flow chart showing an example of the control program in the first running reading mode (main4) in FIG. 28. In order to move the paper feed roller 5 onto the original face set on the original tray 4, a later-described pickup DOWN process is performed (draftmd1). Then, in order to separate only the uppermost one of the stacked sheet originals, a later-described separation process is performed (draftmd2), and then a paper feed process is performed (draftmd3). Subsequently, an original running reading process starts (draftmd4). In this process, as the scanner unit 204 (FIG. 1) in the body 1 of the copy machine is fixed at the predetermined reading position, the image reading on the original is performed. Then, the flow is on standby until the trailing edge of the original is detected by the separation sensor 30 (draftmd5). If the trailing edge is detected, then it is judged whether or not the end of the sheaf of originals is detected by the original setting sensor 40, i.e., whether or not the read original is the final original (draftmd6). If judged that the read original is not the final original, a later-described paper discharge process starts to discharge the originals onto the paper discharge tray 10 (draftmd7), and the flow returns to the step draftmd2. On the other hand, if judged that the read original is the final original, the paper discharge process is performed (draftmd8). Then, a later-described pickup UP process is performed to return the paper feed roller 5 to its uppermost position (draftmd9), and the control terminates.

At this time, when the half-size original is read, the scanner unit 204 in FIG. 1 is fixed at the position R2 in FIG. 11. On the other hand, when the large-size original is read, the scanner unit 204 is fixed at the position R3 in FIG. 11. The position of the scanner unit 204 may be controlled by driving and controlling a stepping motor or by using a mechanical stopper structure.

Second running reading mode.

Figure 30:
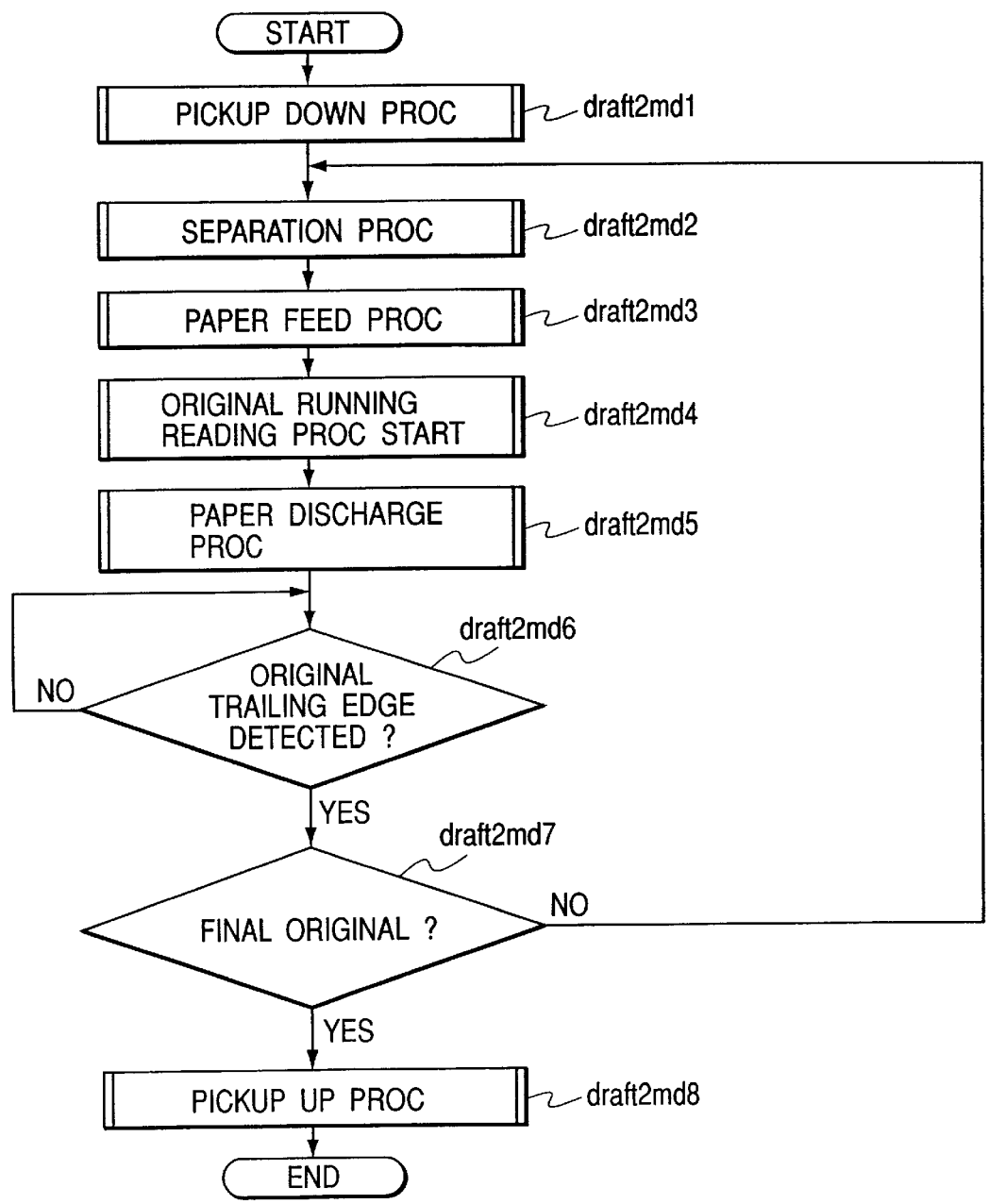
FIG. 30 is a flow chart showing an example of a control program in a second running reading mode (main5) in FIG. 28.

FIG. 30 is the flow chart showing an example of the control program in the second running reading mode (main5) shown in FIG. 28. In order to move the roller onto the original face set on the tray 4, the pickup DOWN process is performed (draft2md1). Then, in order to separate only the uppermost one of the stacked sheet originals, the separation process is performed (draft2md2), and then the paper feed process is performed (draft2md3). Subsequently, the original running reading process starts (draft2md4). Since the scanner unit 204 in FIG. 1 is fixed in the vicinity of a paper discharge unit, the paper discharge process starts to discharge the originals onto the tray 10 (draft2md5). Then, the flow is on standby until the trailing edge of the original is detected by the separation sensor 30 (draft2md6). If the trailing edge is detected, then it is judged whether or not the end of the sheaf of originals is detected by the sensor 40, i.e., whether or not the read original is the final original (draft2md7). If judged that the read original is not the final original, the flow returns to the step draft2md2. On the other hand, if judged that the read original is the final original, the pickup UP process is performed to return the roller 5 to its uppermost position (draft2md8), and then the control terminates. At this time, the scanner unit 204 is fixed at the reading position R3 shown in FIG. 11.

Double-face original mode.

Figure 31:
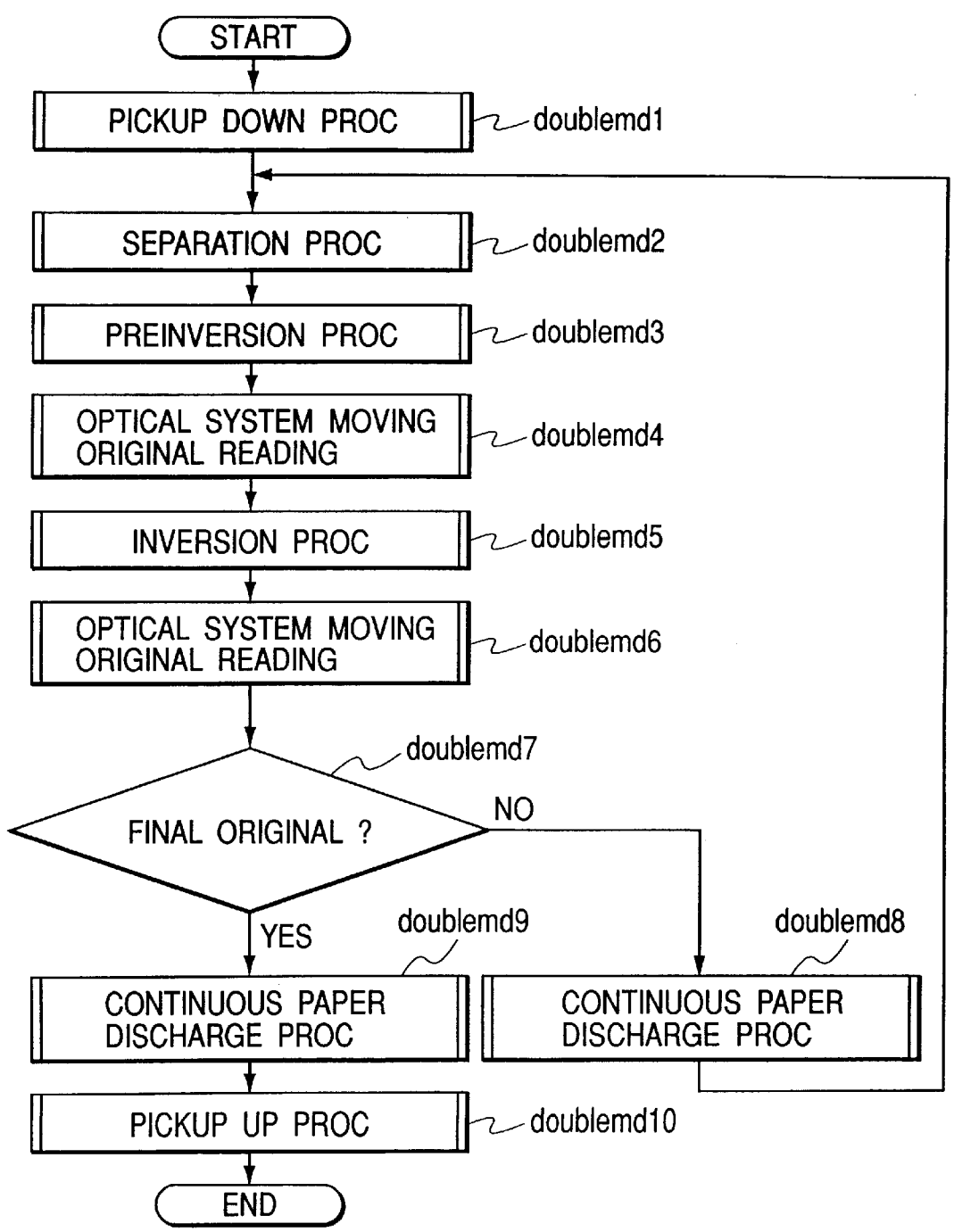
FIG. 31 is a flow chart showing an example of a control program in a double-face original mode (main6) in FIG. 28.

FIG. 31 is the flow chart showing an example of the control program in the double-face original mode (main6) shown in FIG. 28. In order to move the paper feed roller 5 onto the original face set on the original tray 4, the pickup DOWN process is performed (doublemd1). Then, in order to separate only the uppermost one of the stacked sheet originals, the separation process is performed (doublemd2). Subsequently, a later-described preinversion process is performed (doublemd3). In this process, the faces of the separated sheet original are inverted, and the original is then placed at the reading position R1 on the platen 3 such that the second face of the original is being turned downward. If the original is placed at the position R1 with its second face turned downward, the scanner unit 204 is moved to perform an optical system movement original reading process (doublemd4).

If the original image reading on the second face completes, an inversion process is performed to again invert the faces of the original (doublemd5). If the inverted original is placed at the position R1 with its first face turned downward, the optical system movement original reading process is performed on the first face (doublemd6).

While the image reading on the first face of the original is being performed, it is judged whether or not the end of the sheaf of originals is detected by the sensor 40, i.e., whether or not the read original is the final original (doublemd7). If judged that the read original is not the final original, the paper discharge process starts to discharge the originals onto the tray 10 (doublemd8), and the flow returns to the step doublemd2. On the other hand, if judged that the read original is the final original, the paper discharge process is performed (doublemd9), and the pickup UP process is then performed to return the roller 5 to its uppermost position (doublemd10). Then, the control terminates.

Manual feed mode.

Figure 42:
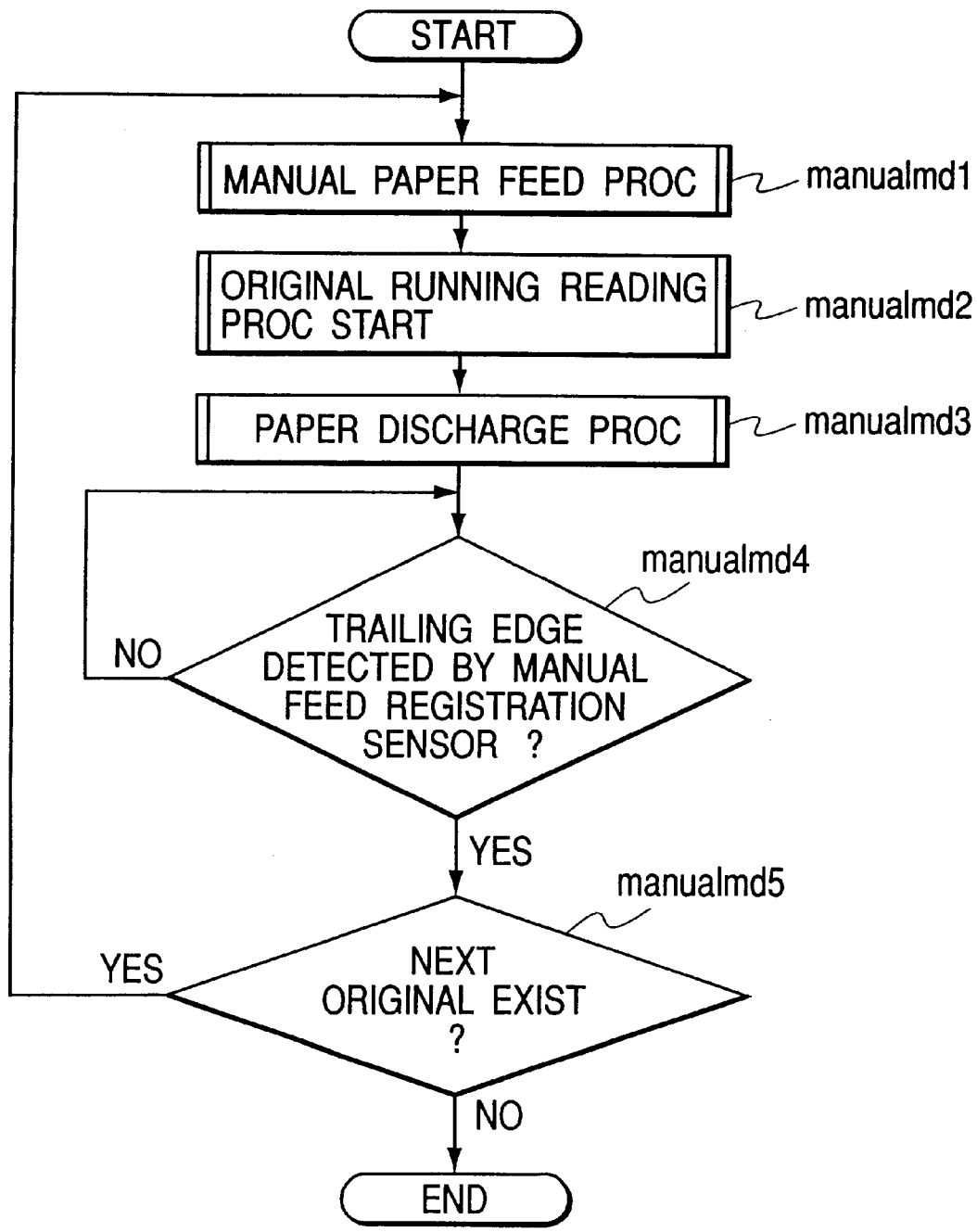
FIG. 42 is a flow chart showing an example of a control program in a manual feed mode (main8) in FIG. 28.

FIG. 42 is the flow chart showing an example of the control program in the manual feed mode (main8) shown in FIG. 28. Initially, the manual paper feed process is performed to the original set on the manual paper feed unit (manualmd1). If the manually fed original is placed at the reading position R1, the optical system movement original reading process is performed to the placed original (manualmd2). Then, if the reading process completes, the paper discharge process starts to discharge the original onto the tray (manualmd3), and the flow is on standby until the trailing edge of the original is detected by the manual feed registration sensor 34 (manualmd4). If the trailing edge is detected, then it is judged whether or not the next original exists in the manual paper feed unit by the manual feed original sensor 60 (manualmd5). If judged that the original exists, the flow returns to the step manualmd1. On the other hand, if judged that the original does not exist, a manual feed paper discharge process is performed, and the control terminates.

Pickup DOWN process.

Figure 32:
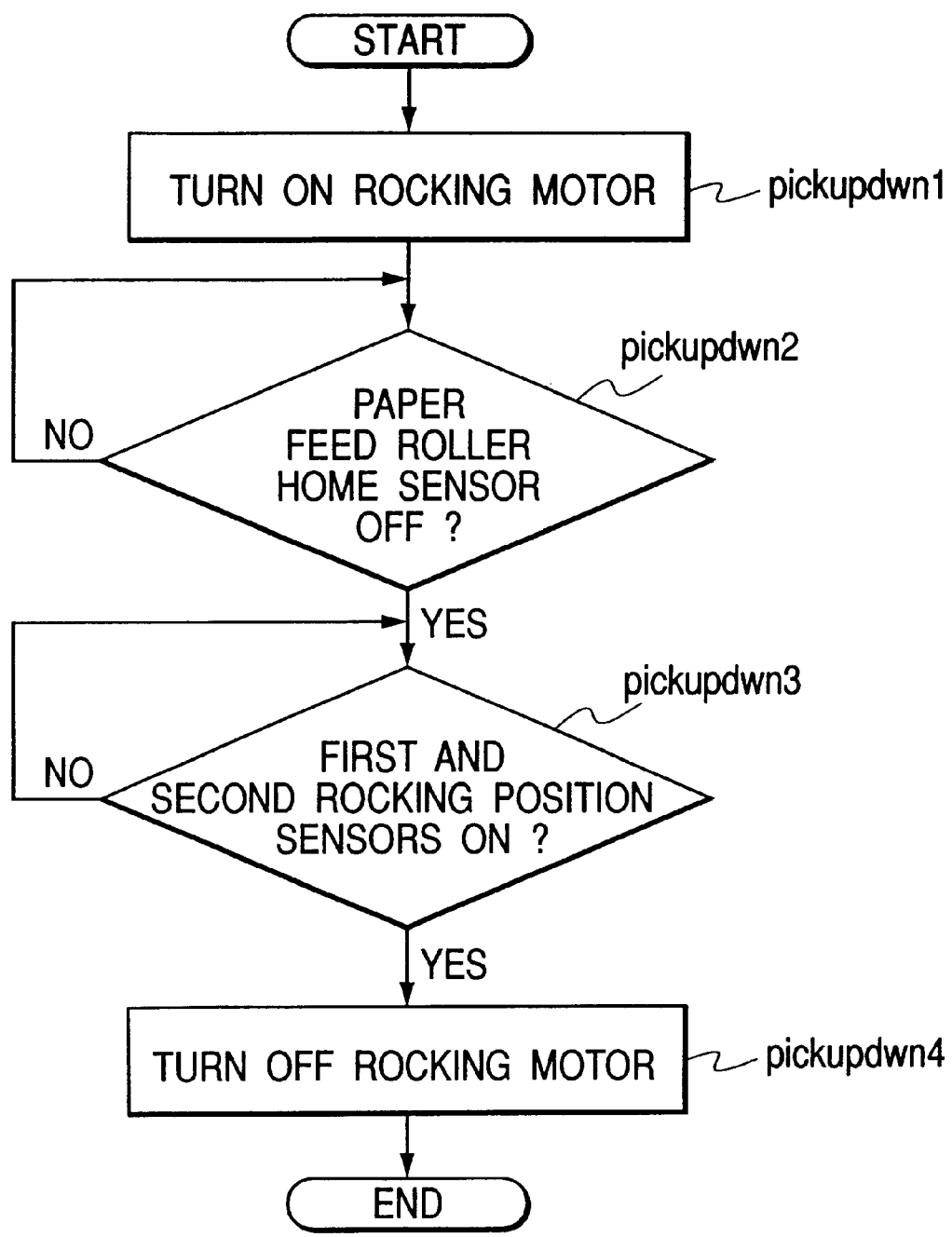
FIG. 32 is a flow chart showing an example of a pickup DOWN process procedure.

FIG. 32 is the flow chart showing an example of a procedure of the above-described pickup DOWN process. In order to lower the paper feed roller 5 from the position (FIG. 5) at which the paper feed roller home sensor 45 is ON onto the sheaf of the sheet originals P stacked on the original tray, the rocking motor 103 is driven to lower the up-and-down arm 51 and the rocking arms 57 and 53 (pickupdwn1). Then, the flow is on standby until the sensor 45 is turned off (pickupdwn2). If the sensor 45 is turned off, it is confirmed that the roller 5 has lowered, and then the flow is on standby until the first and second rocking position sensors 46 and 47 are turned on (pickupdwn3 ). Then, if the sensors 46 and 37 are turned on and it is detected that the roller 5 has been lowered onto the original, the rocking motor 103 stops (pickupdwn4).

Pickup UP process.

Figure 33:
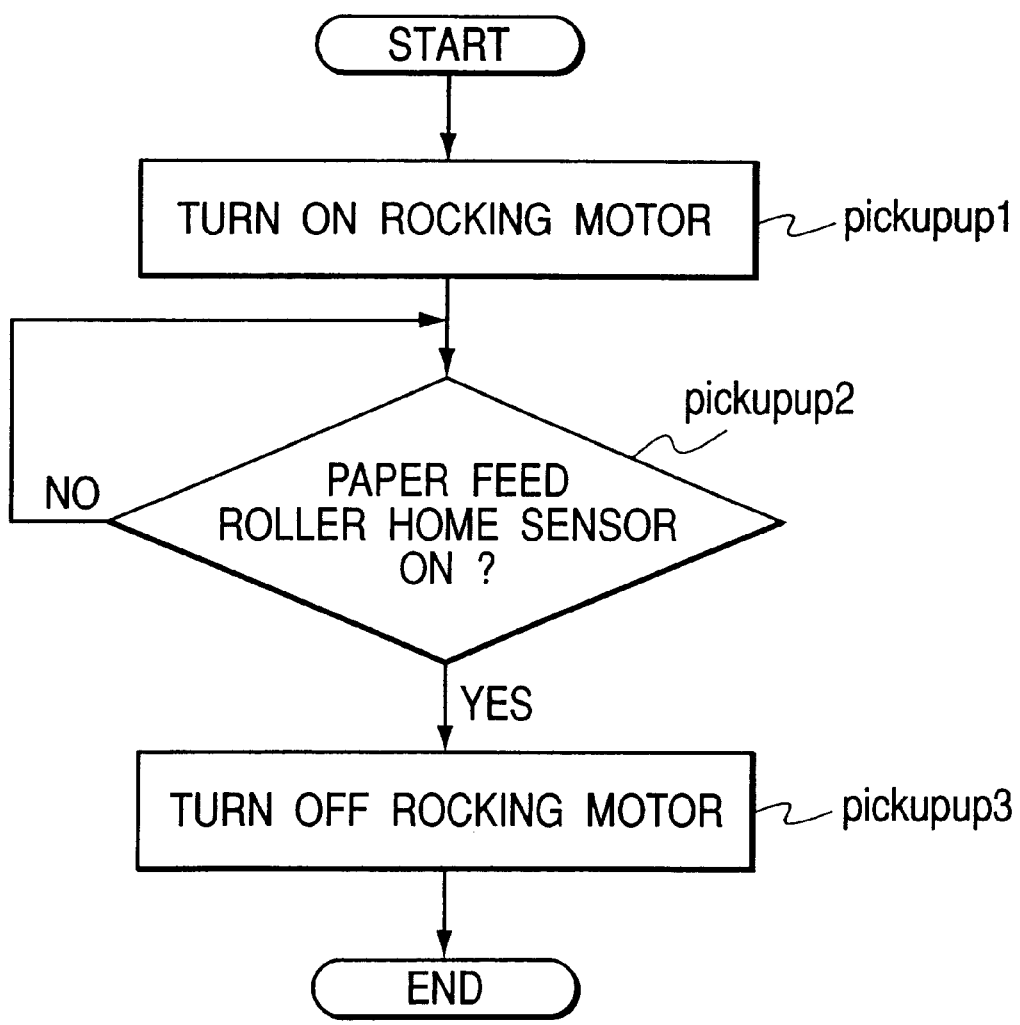
FIG. 33 is a flow chart showing an example of a pickup UP process procedure.

FIG. 33 is the flow chart showing an example of a procedure of the above-described pickup UP process. Initially, in order to raise the paper feed roller 5 up to the position shown in FIG. 5, the rocking motor 103 is driven (pickupup1), and then the flow is on standby until the paper feed roller home sensor 45 is turned on (pickupup2). Then, if the sensor 45 is turned on and it is detected that the sensor 45 is at its uppermost position, the rocking motor 103 stops (pickupup3). It should be noted that a rotational direction of the motor 103 in the pickup UP process is opposite to that in the pickup DOWN process.

Separation process.

Figure 34:
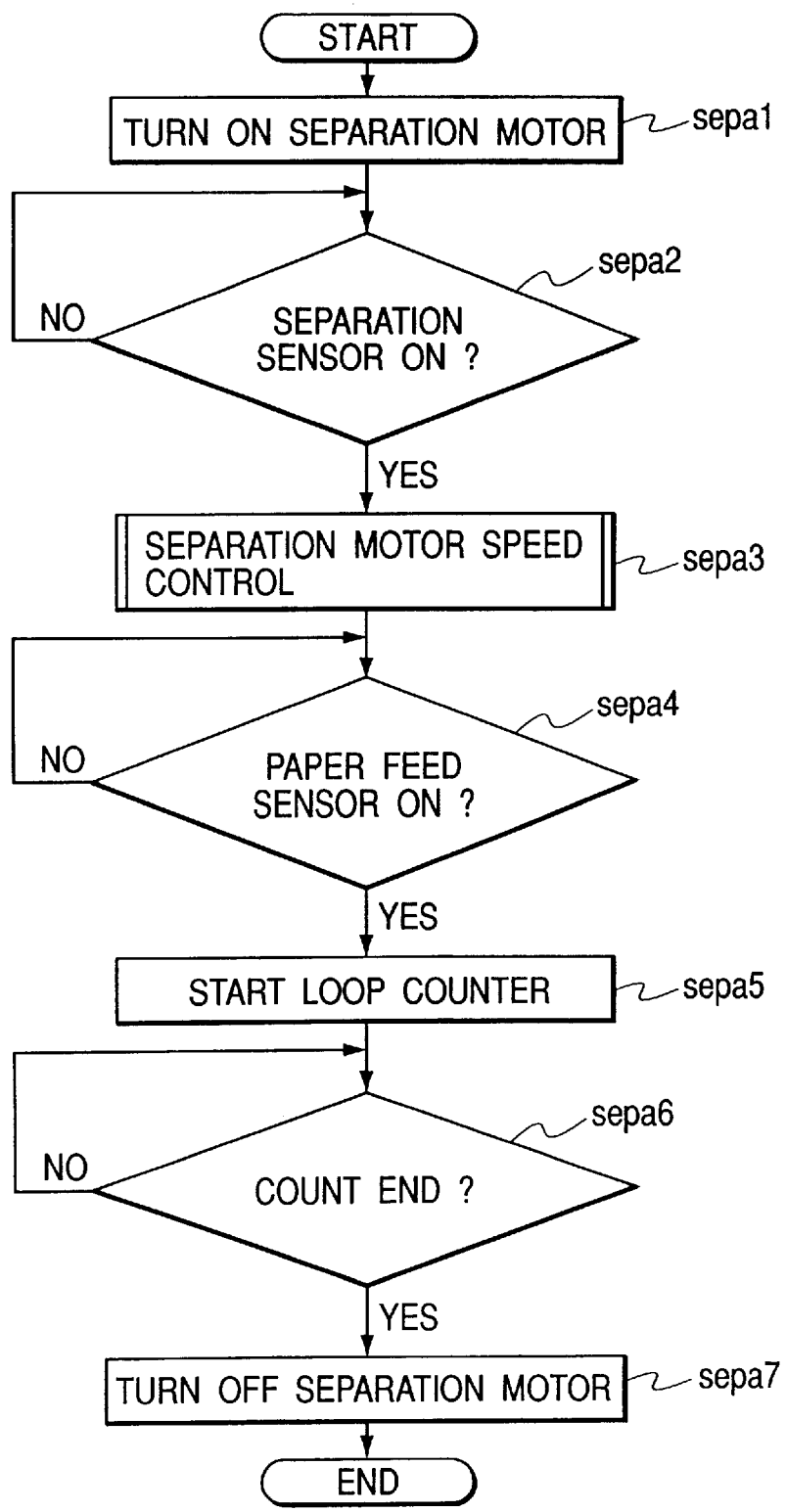
FIG. 34 is a flow chart showing an example of a separation process procedure.

FIG. 34 is the flow chart showing an example of a procedure of the above-described separation process. Initially, the separation clutch 106 and the separation motor 100 are turned on (sepa1), to rotate the paper feed roller 5 being lowered onto the sheaf of the sheet originals P, and also to rotate the separation belt 60, the separation carrying roller 8 and the first feed roller 16. Then, only the uppermost one of the sheet originals P in the sheaf is separated by the roller 5, and the separated original is guided to the carrying path (a) by the separation belt 6 and the roller 8. If the separation sensor 30 is turned on and the leading edge of the original is detected (sepa2), speed control of the motor 100 is performed (sepa3). Then, if the paper feed sensor 35 is turned on and thus the leading edge of the original is detected (sepa4), a separation loop counter starts to count clock signals input from a separation clock generator (sepa5). After then, the flow is on standby until the counting terminates (sepa6). If the counting terminates, the motor 100 is turned off (sepa7), and the leading edge of the original is butted against the nipping point of the second feed roller 9 by the roller 16 to form a predetermined-quantity loop. Then, the carrying of the original stops in a state that the loop is being formed, to correct the bias occurred in the original separation.

Paper feed process.

Figures 35, 35A:
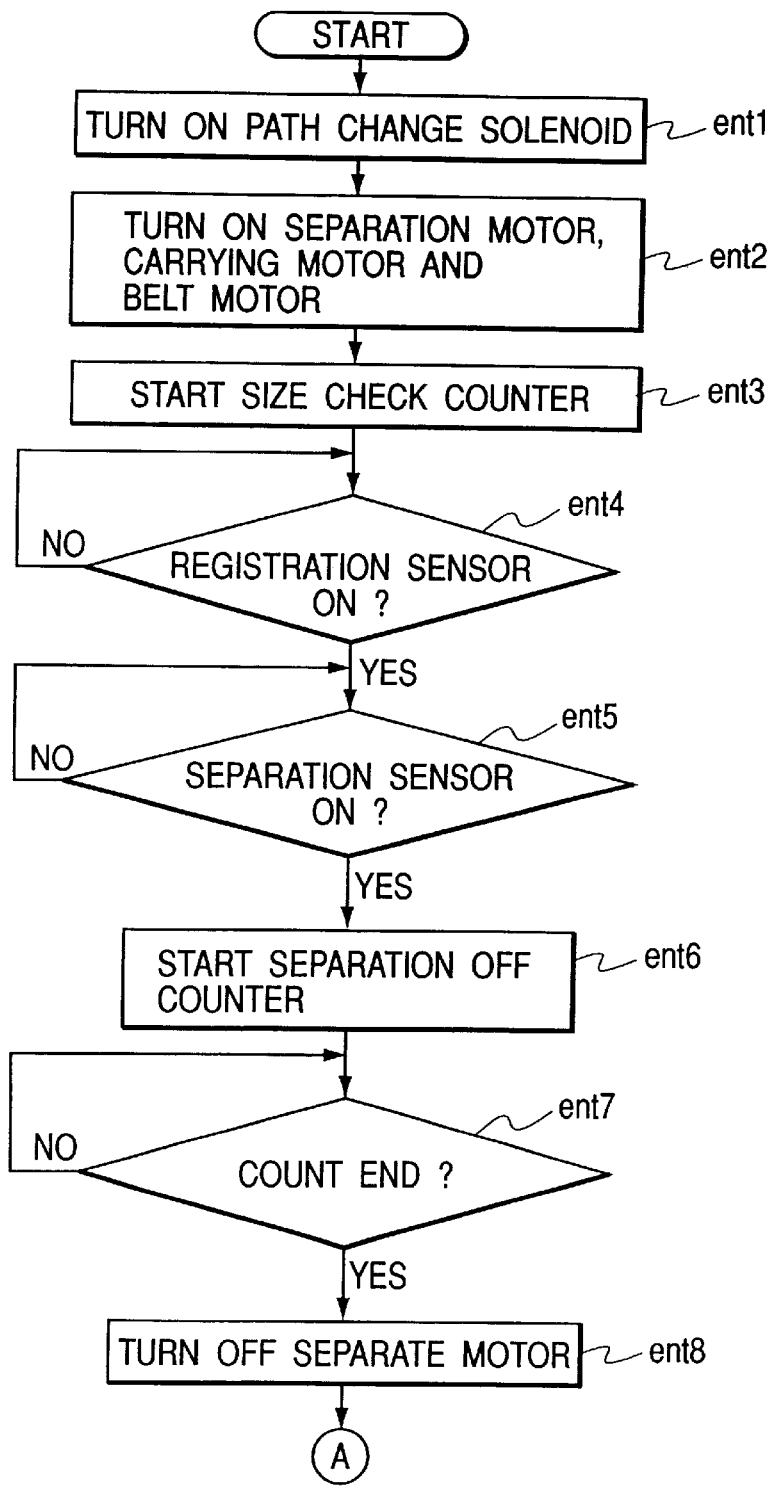
FIG. 35 comprised of FIGS. 35A and 35B is a flow chart showing an example of a paper feed process procedure.
Figure 35B:
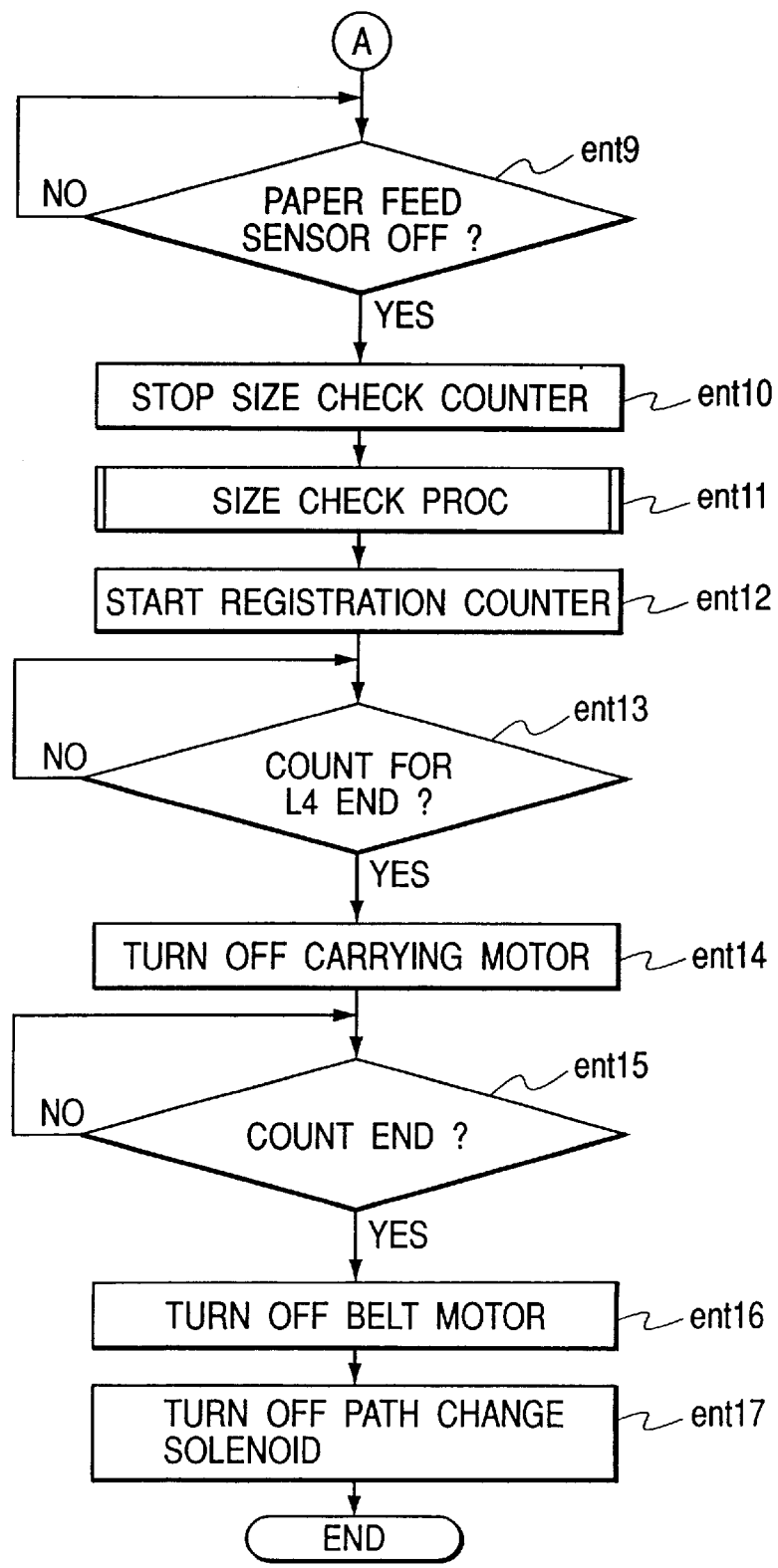

FIGS. 35A and 35B are the flow charts showing an example of a procedure of the above-described paper feed process. Initially, in order to feed the separated original to the carrying path (c), the path change solenoid 107 is turned on to move the inversion paper feed flapper 22 to the position indicated by the alternate long-and-short dashed line in FIG. 4 (ent1). Thus, the separation motor 100, the carrying motor 101 and the belt motor 102 are turned on (ent2), to drive the first and second feed rollers 16 and 9 and the wide belt 7. Speed control of the motor 100 at this time will be later explained in detail with reference to FIGS. 45A and 45B. Further, a size check counter starts to count clock signals input from an inversion clock generator (ent3). Then, if the leading edge of the original is detected by the registration sensor 39, i.e., if it is confirmed that the original has been carried to the path (c) (ent4), the flow is on standby until the trailing edge of the original is detected by the separation sensor 30.

If the trailing edge is detected by the separation sensor 30 (ent5), a separation start counter starts to count clock signals input from a separation clock generator (ent6), and the flow is on standby until the counting of the separation start counter completes. If the counting corresponding to the distance from the roller 16 to the sensor 30 completes (ent7), i.e., if the trailing edge of the original passes through the roller 16, the motor 100 starts to rotate at high speed (ent8). Then, the flow is on standby until the trailing edge of the original is detected by the sensor (ent9).

Then, if the trailing edge is detected by the sensor 35, the size check counter stops (ent10), and a later-described size check process (FIG. 40) is performed based on the data obtained by the size check counter (ent11). Subsequently, in order to stop the original at the predetermined position on the platen 3, a registration counter starts to count belt excitation clock signals (ent12). Then, the flow is on standby until the counting corresponding to the distance L4 from the sensor 35 to the roller 9 terminates (ent13). If the counting corresponding to the distance L4 terminates, the motor 101 is turned off (ent14), and the flow is on standby until the counting by the registration counter terminates. If the counting by the registration counter terminates (ent15), the belt motor 102 is turned off (ent16), and the solenoid 107 is also turned off (ent17).

Preinversion process.

Figure 36B:
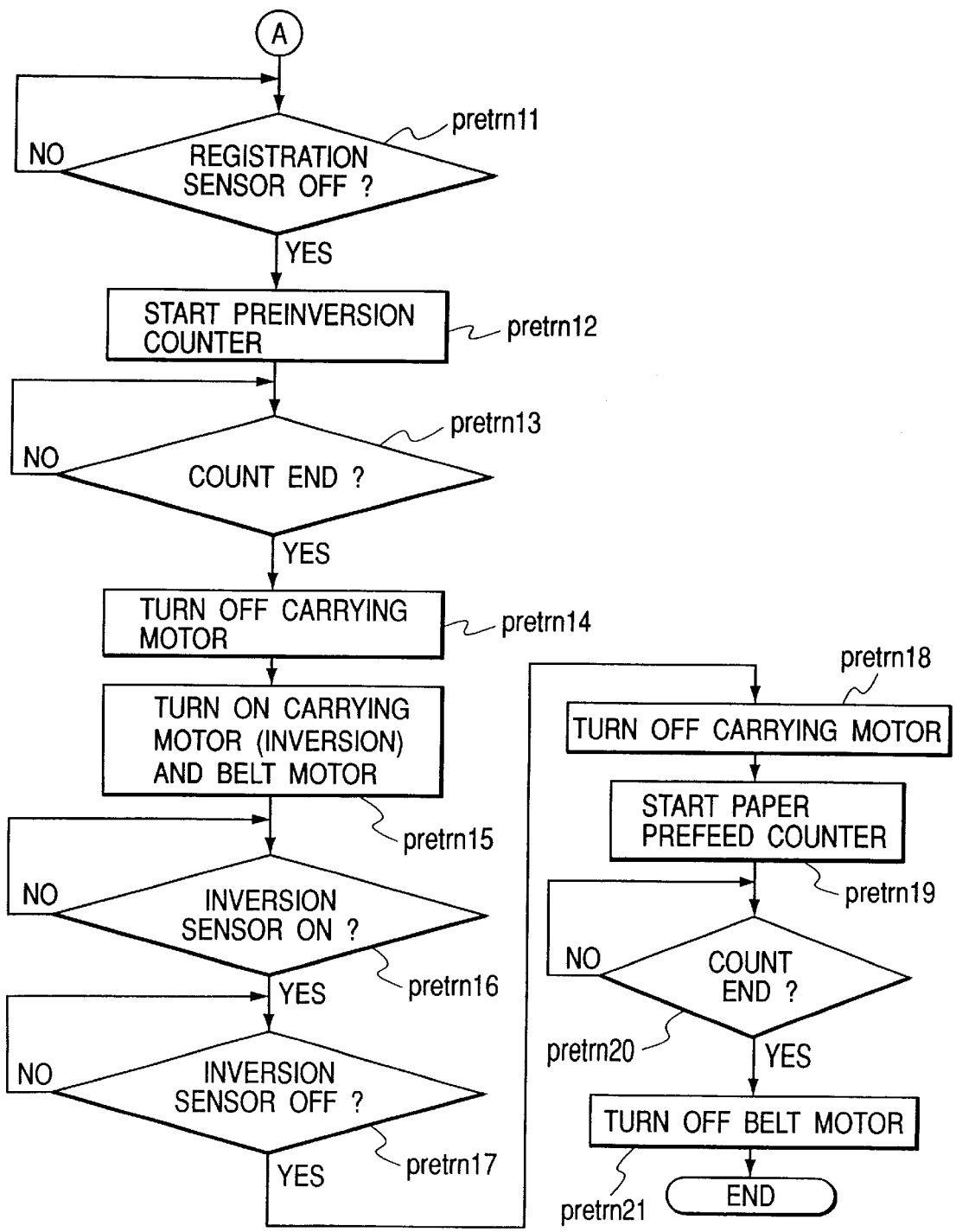
FIG. 36 comprised of FIGS. 36A and 36B is a flow chart showing an example of a pre-inversion process procedure.

FIGS. 36A and 36B are the flow charts showing an example of a procedure of the above-described preinversion process. In the process, the path change solenoid 107 is OFF, and the inversion paper feed flapper 22 is at the position indicated by the solid line shown in FIG. 4. In such a state, the separation motor 100 and the carrying motor 101 are turned on (pretrn1), to drive the first and second feed rollers 16 and 9 and the first and second inversion rollers 17 and 18. If so, the original being nipped by the roller 16 is then carried to the carrying path (h). Then, the size check counter starts to count the clock signals input from the inversion clock generator (pretrn2), and the flow is on standby until the leading edge of the original is detected by the registration sensor 39.

If the leading edge is detected by the sensor 39, i.e., if it is confirmed that the original has been carried to the path (h) (pretrn3), then the flow is on standby until the trailing edge of the original is detected by the separation sensor 30 (pretrn4). If the trailing edge is detected by the sensor 30, a separation off counter starts to count the clock signals input from the separation clock generator (pretrn5), and the flow is on standby until the counting corresponds to the distance from the roller 16 to the sensor 30 (pretrn6). If the counting by the separation off counter terminates, i.e., if the trailing edge of the original passes through the roller 16, the motor 100 is turned off to stop the roller 16 (pretrn7), and the flow is on standby until the trailing edge is detected by the sensor 35 (pretrn8).

Then, if the trailing edge is detected by the sensor 35, the size check counter stops (pretrn9), and the later-described size check process (FIG. 40) is performed based on the data of the size check counter (pretrn10). Then, the flow is on standby until the trailing edge of the original is detected by the registration sensor 39 (pretrn11). If the trailing edge is detected by the sensor 39, a preinversion counter starts to count inversion excitation clocks such that the original stops at a predetermined position after its trailing edge passed through the path (h) (pretrn12). At this time, the inversion flapper 23 is being set at the position indicated by the solid line in FIG. 4 to carry the original to the path (i).

If the counting by the preinversion counter terminates (pretrn13), the carrying motor 101 is turned on after a predetermined time (pretrn14). Then, the motor 101 is inversely rotated, and also the belt motor 102 is turned on (pretrn15). Then, the flow is on standby until the leading edge of the original is detected by the inversion sensor 36 (pretrn16). If the leading edge is detected by the sensor 36, i.e., if it is confirmed that the original has been carried to the path (e), the flow is on standby until the trailing edge of the original is detected by the sensor 36 (pretrn17). Then, if the trailing edge is detected by the sensor 36, the motor 101 is turned off (pretrn18). Further, in order to stop the original at the predetermined position on the platen 3, a paper prefeed counter starts to count the belt excitation clock signals (pretrn19), and the flow is on standby until the counting by the paper prefeed counter terminates (pretrn20). If the counting by the paper prefeed counter terminates, the belt motor 102 is turned off (pretrn21).

Inversion process.

Figures 37, 37A:
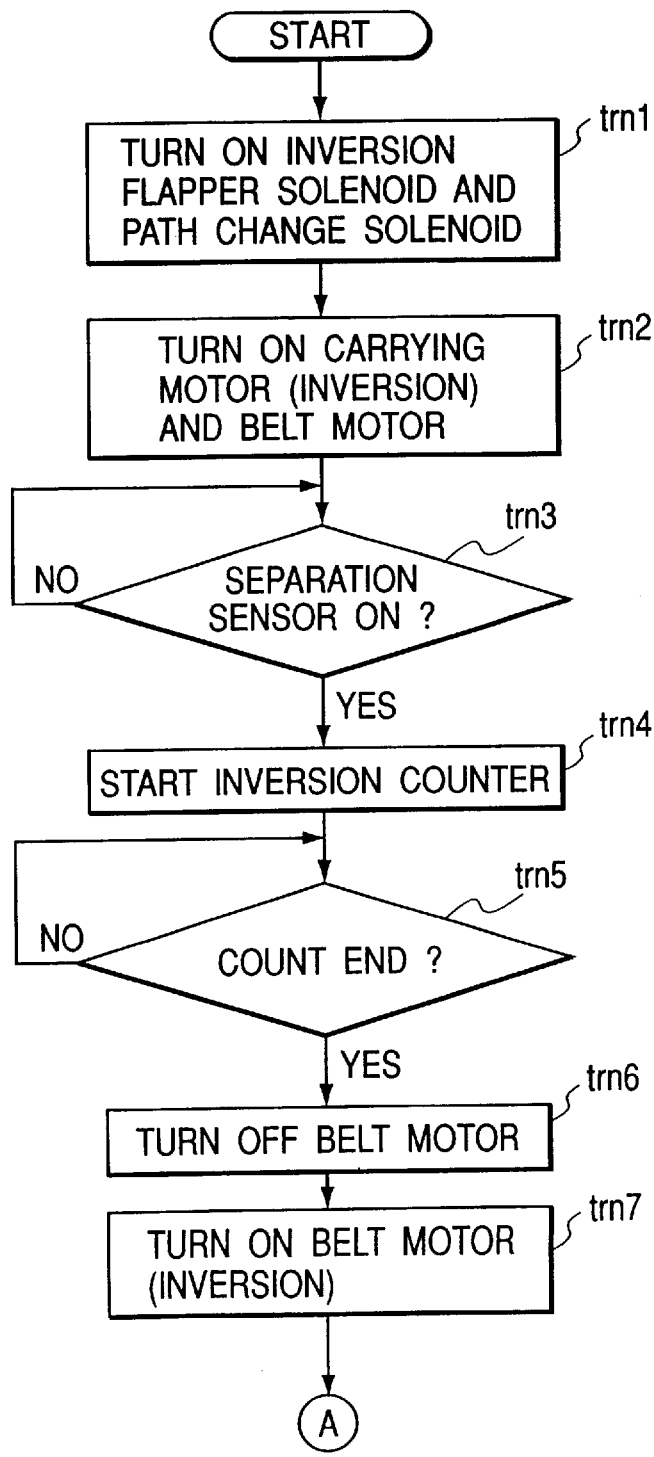
FIG. 37 comprised of FIGS. 37A and 37B is a flow chart showing an example of an inversion process procedure.
Figure 37B:
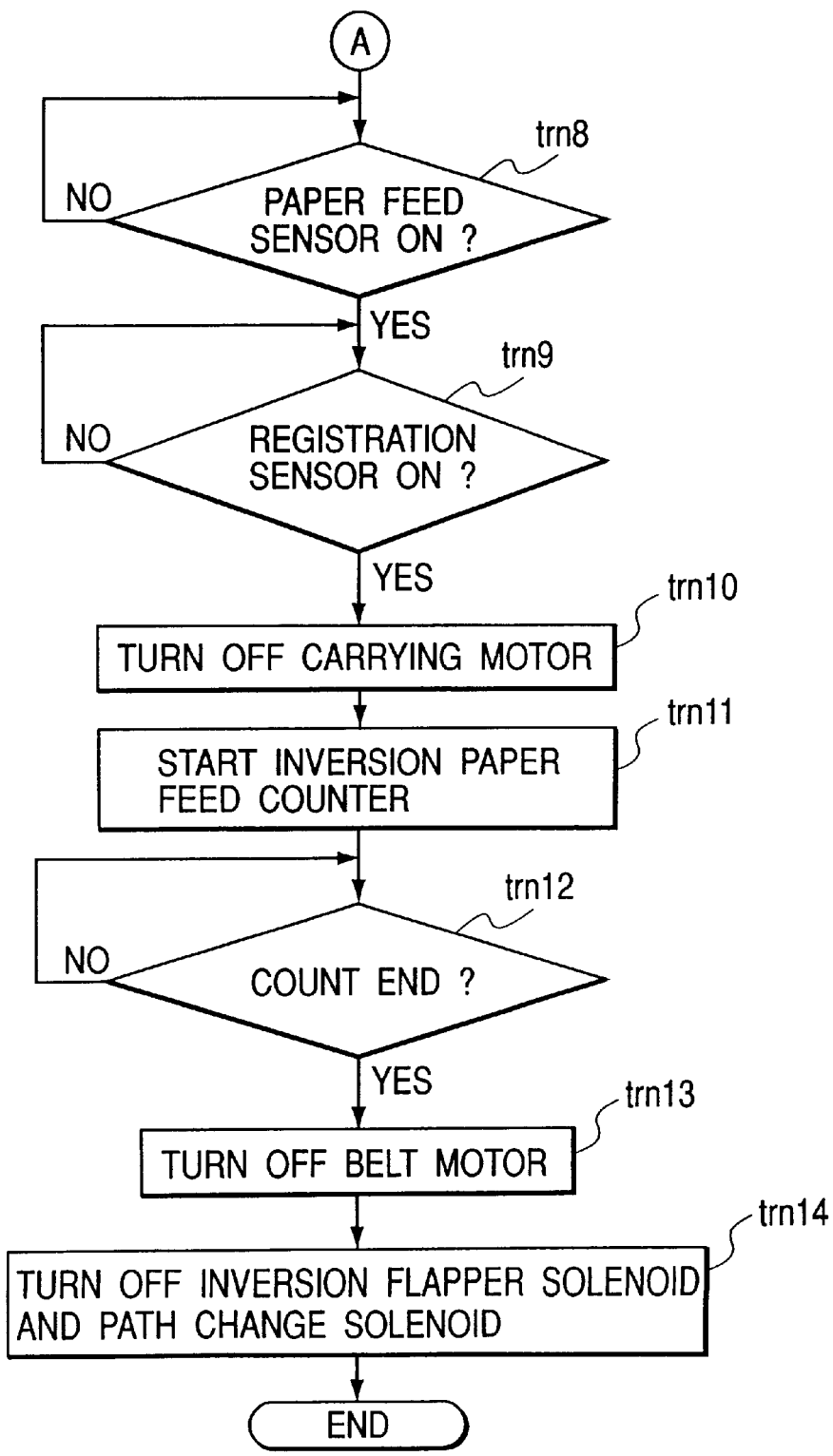

FIGS. 37A and 37B are the flow charts showing an example of a procedure of the above-described inversion process. In this process, the inversion flapper solenoid 108 is turned on, the inversion flapper 23 is moved to the position indicated by the solid line in FIG. 4, the path change flapper solenoid 107 is turned on, and the inversion paper feed flapper 22 and the feed and discharge flapper 25 are moved to the positions respectively indicated by the alternate long-and-short dashed lines in FIG. 4 (trn1). Then, the belt motor 102 and the carrying motor 101 are turned on to carry the original on the platen 3 to the carrying path (e) (trn2). Further, the wide belt 7, the second feed roller 9, the first inversion roller 17 and the second inversion roller 18 are driven, and then the flow is on standby until the leading edge of the original is detected by the inversion sensor 36 (trn3).

If the leading edge is detected by the sensor 36, i.e., if the leading edge reaches the predetermined position in the path (g) through the path (f), an inversion counter starts to count the belt excitation clock signals, so as to stop and inversely rotate the belt motor 102 (trn4). Then, the flow is on standby until the counting by the inversion counter terminates (trn5). If the counting terminates, the motor 102 is turned off after a predetermined time (trn6) and then inversely rotated (trn7). Then, the flow is on standby until the leading edge of the original is detected by the sensor 35. While the motor is reversely rotating, the first inversion roller 17, the second inversion roller 18 and the second feed roller 9 are driven by the carrying motor 101, whereby the original is carried through the paths (f) and (g).

If the leading edge of the original is detected by the sensor 35 (trn8), i.e., if it is confirmed that the original is being carried in the path (g), the flow is on standby until the trailing edge of the original is detected by the registration sensor 39 (trn9). Then, if the trailing edge is detected, the motor 101 is turned off (trn10). Further, an inversion paper feed counter starts to count the belt excitation clock signals, so as to stop the original at the predetermined position on the platen 3 (trn11). Then, the flow is on standby until the counting terminates (trn12).

Figure 3:
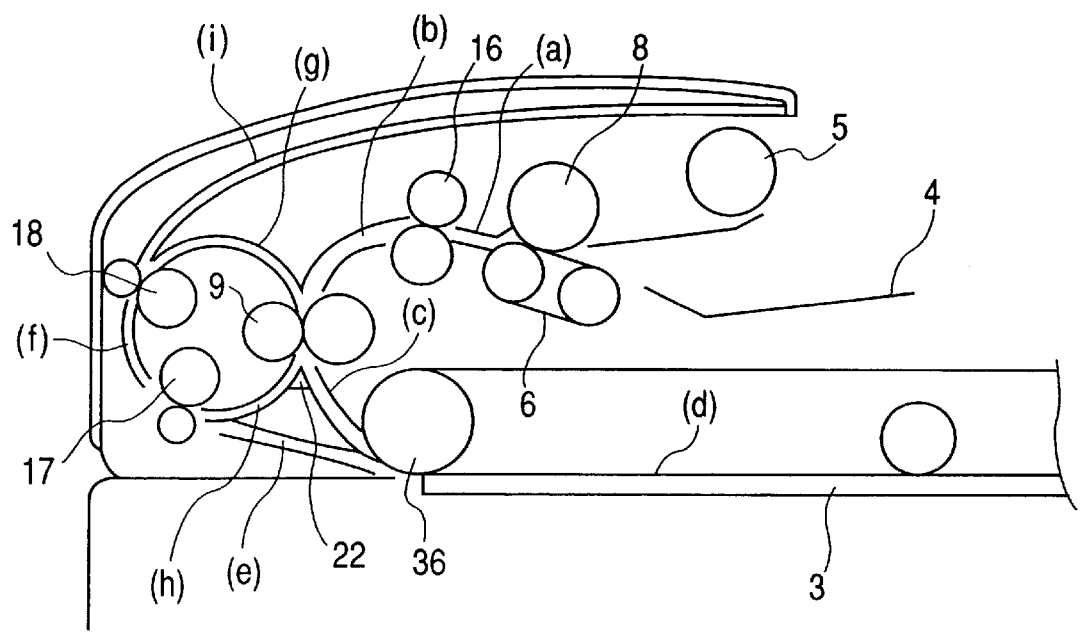
FIG. 3 is a sectional view showing paths of an automatic document feeder (ADF) 2.
Figure 4:
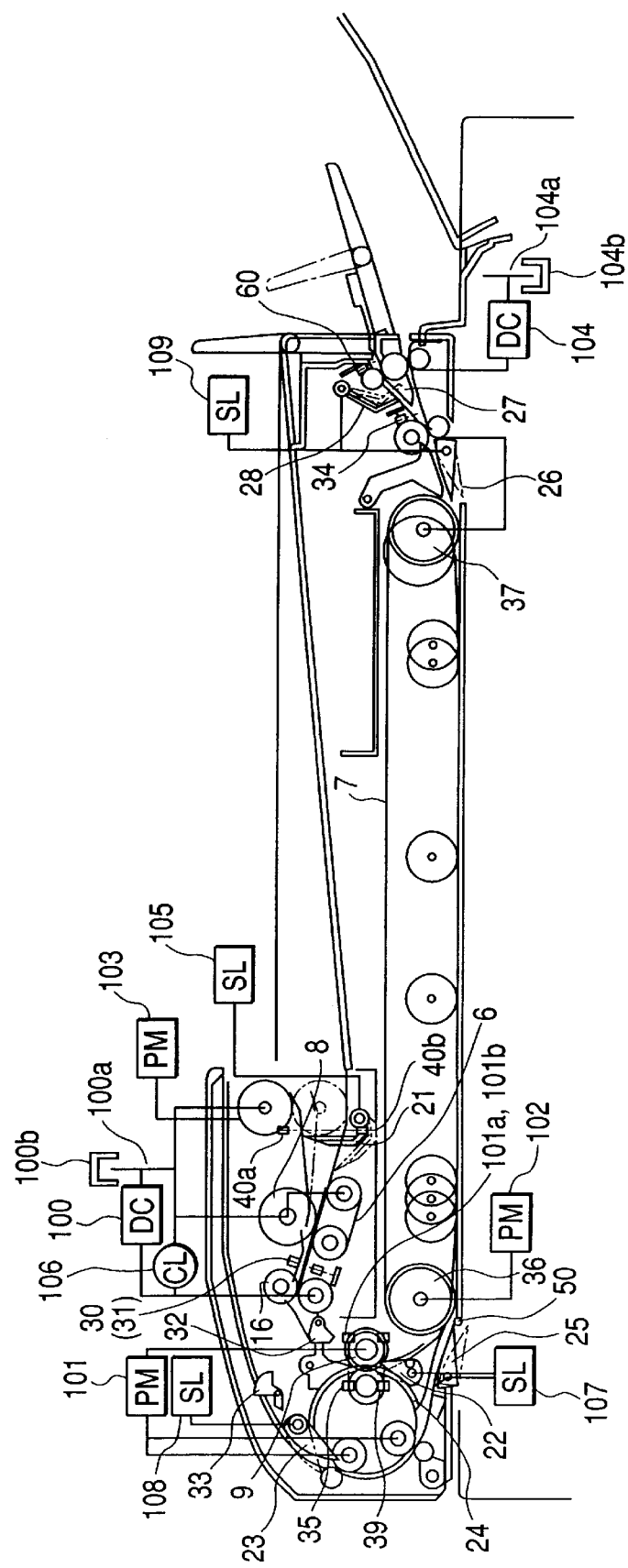
FIG. 4 is a sectional view showing a drive system of the ADF 2.

If the counting by the inversion paper feed counter terminates, the motor 102 is turned off (trn13), and also the solenoid 108 is turned off to return the flapper 23 to the position indicated by the solid line in FIG. 3. Further, the solenoid 107 is turned off to return the flappers 22 and 25 to the positions respectively indicated by the solid lines in FIG. 4 (trn14).

In the step trn7, although an original attracting direction of the roller 17 is opposite to that of the belt 7, nipping force of the roller 17 is greater than that of the belt 7. Thus, the carrying of the original is dependent on the roller 17. However, if the original has its longer side in the feed direction, the original is highly influenced by nipping force of pressure rollers arranged inside the belt 7 and the platen 3, whereby the carrying of the original is not dependent on the roller 17. For this reason, it is controlled so that the belt motor 102 stops to make inversion timing (i.e., count value of inversion counter) different from others according to the length of the original in the feed direction.

Paper discharge process.

Figure 38:
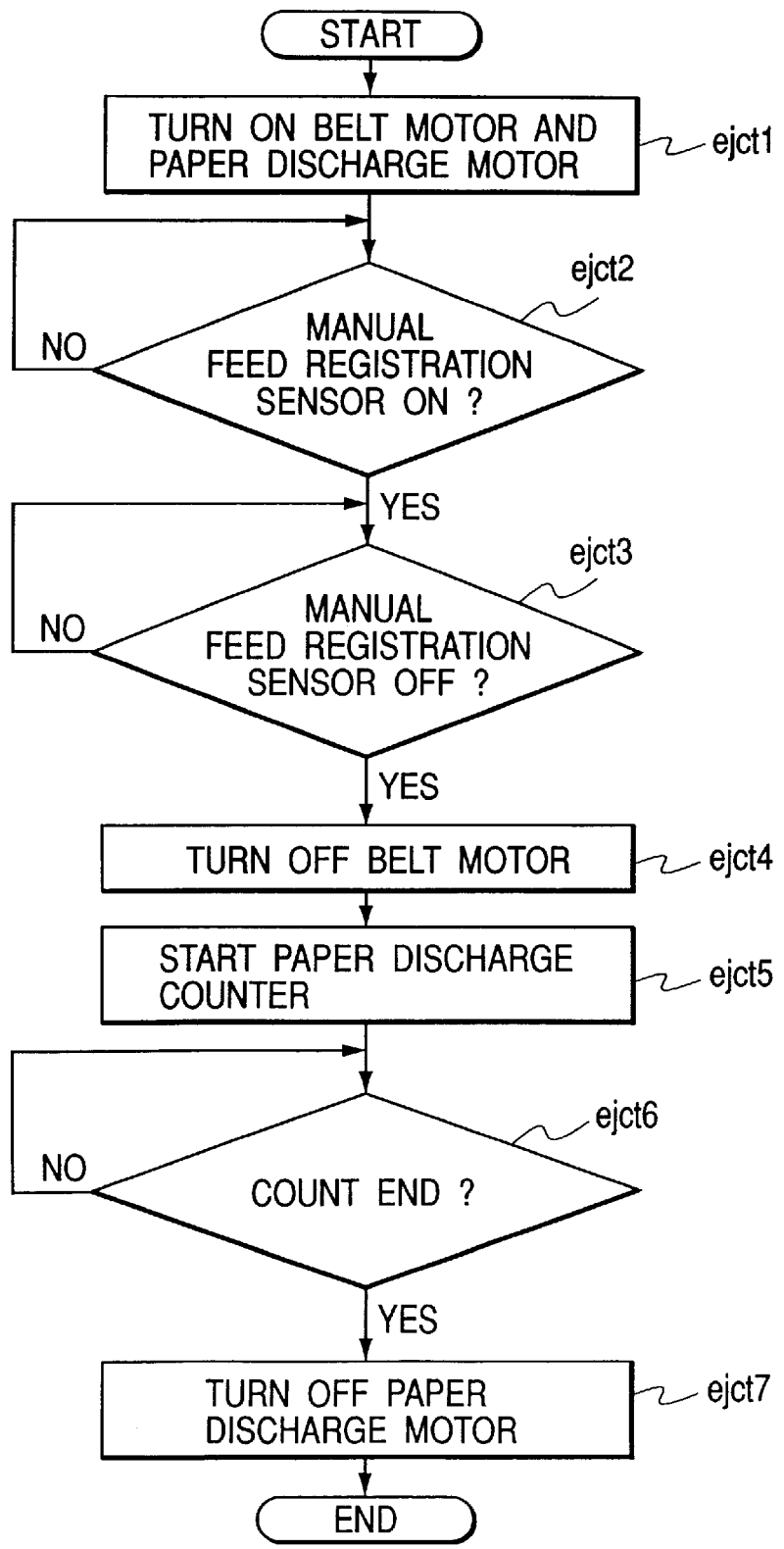
FIG. 38 is a flow chart showing an example of a paper discharge process procedure.

FIG. 38 is the flow chart showing an example of a procedure of the above-described paper discharge process. In this process, the paper discharge flapper solenoid 109 is OFF, and the end of the paper discharge flapper 26 is set at the position lower than that of the platen 3 as indicated by the alternate long and short dashed line in FIG. 4. In this state, in order to carry the original on the platen 3 to the paths (d) and (j), the belt motor 102 and the paper discharge motor 104 are both turned on (ejct1), to drive the wide belt 7, the manual paper feed roller 13 and the paper discharge roller 12. Then, the flow is on standby until the leading edge of the original is detected by the manual feed registration sensor 34 (ejct2). If the leading edge is detected by the sensor 34, i.e., it is confirmed that the original is being carried in the path (j), the flow is on standby until the trailing edge of the original is detected by the sensor 34 (ejct3). If the trailing edge is detected by the sensor 34, the belt motor 102 is turned off (ejct4). Then, a paper discharge counter starts to count the clock signals input from a paper discharge clock generator (ejct5), and the flow is on standby until the counting by the paper discharge counter terminates (ejct6). If the counting terminates, the motor 104 is turned off (ejct7). The original passes through the path (j) and the paper discharge roller 12, and is discharged onto the paper discharge tray 10.

Manual paper feed process.

Figure 41:
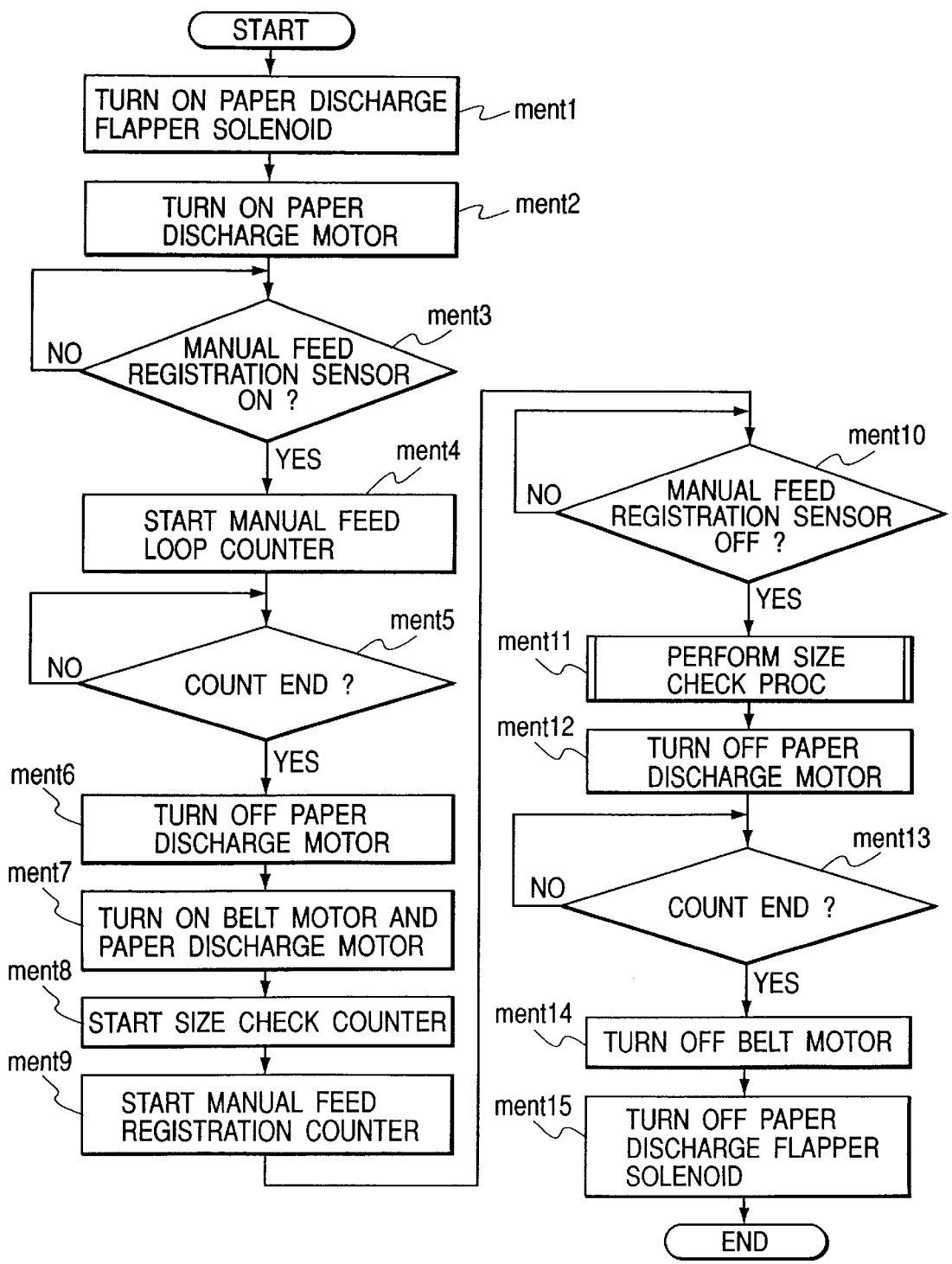
FIG. 41 is a flow chart showing an example of the paper discharge process procedure.

FIG. 41 is the flow chart showing an example of a procedure of the above-described paper discharge process. The leading edge of the original set in the manual paper feed unit is butted against the manual feed flapper 26. Further, the paper discharge flapper solenoid 109 is OFF, the manual feed shutter 28 is set at the position indicated by the solid line in FIG. 4, and the end of the paper discharge flapper 26 is set at the position lower than that of the platen 3. In this state, the solenoid 109 is turned on to move the shutter 28 and the flapper 26 to the positions respectively indicated by the alternate long and short dashed lines in FIG. 4 (ment1). Then, the paper discharge motor 104 is turned on (ment2), to rotate the manual paper feed roller 13, thereby carrying the original in the path (k). Subsequently, the flow is on standby until the manual feed registration sensor 34 is turned on.

If the leading edge of the original is detected by the sensor 34 (ment3), a manual feed loop counter starts to count the clock signals input from the paper discharge clock generator (ment4), and the flow is on standby until the counting terminates (ment5). If the counting by the manual feed loop counter terminates, the motor 104 is turned off after a predetermined time (ment6). In order to correct the bias which occurrs while the original is being carried by the roller 13, the original is butted against the nipping point of the roller 11 and then stopped in a state where a loop of predetermined size has been formed. After the motor 104 is turned off, the motors 104 and 102 are turned on to carry the original to the paths (k) and (d) (ment7), thereby driving the rollers 13 and 11 and the belt 7. Subsequently, the size check counter starts to count the clock signals input from a belt clock generator (ment8). Further, in order to stop the original at a predetermined position on the platen 3, a belt registration counter starts to count the belt excitation clock signals (ment9), and then the flow is on standby until the trailing edge of the original is detected by the sensor 34 (ment10).

If the sensor 34 is turned off and the trailing edge of the original is detected, the counting by the size check counter stops, and the later-described size check process (FIG. 41) is performed based on the counted data (ment11). Then, since the trailing edge of the original has passed through the roller 13, the motor 104 is turned off (ment12), and the flow is on standby until the counting by the manual feed registration counter terminates (ment13). If the counting terminates, the belt motor 102 is turned off (ment14), and the solenoid 109 is turned off (ment15).

Original running reading process.

Figure 39:
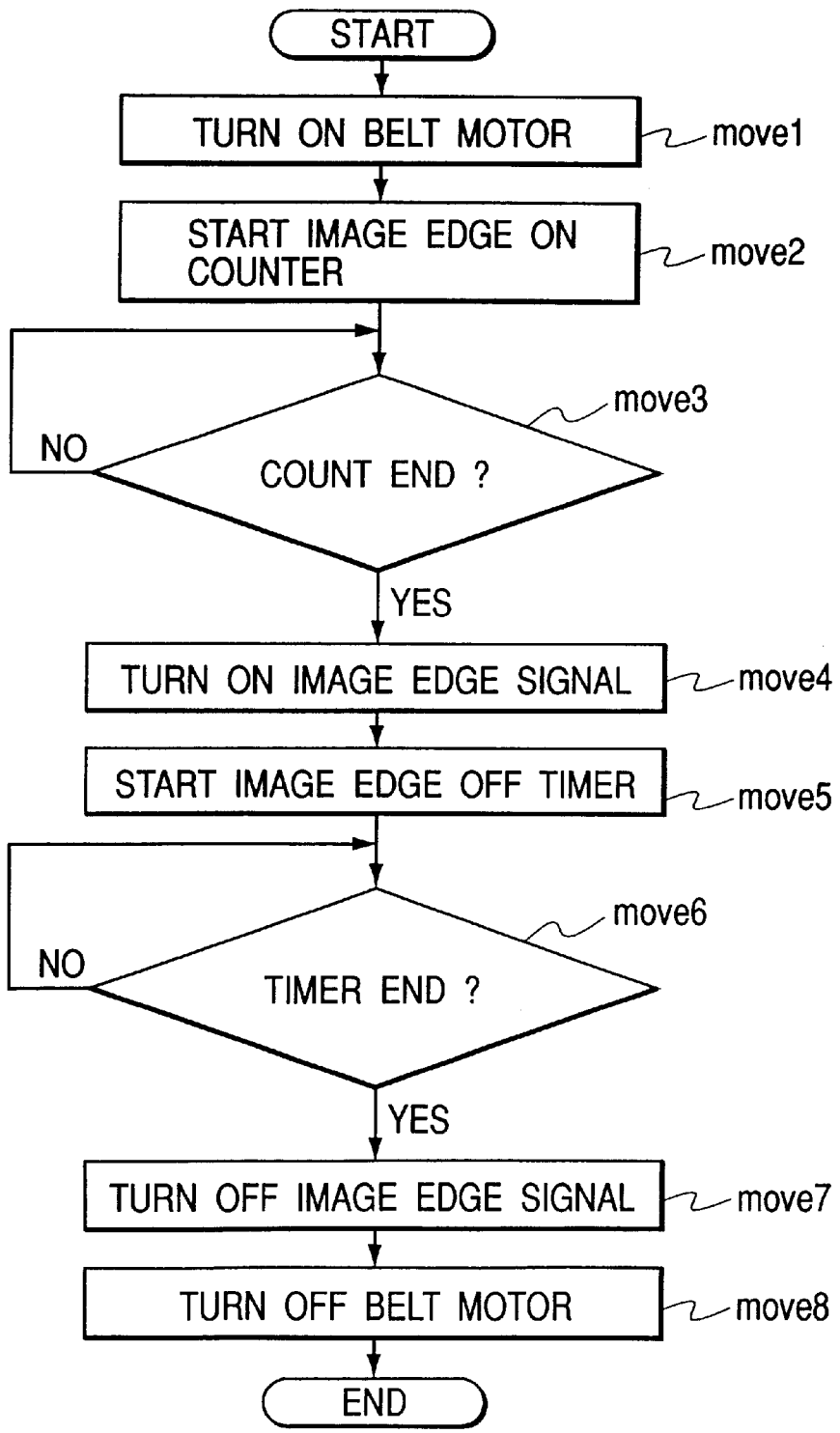
FIG. 39 is a flow chart showing an example of an original running reading process procedure.

FIG. 39 is the flow chart showing an example of a procedure of the above-described original running reading process. In order to read the original image with the optical system of the body 1 fixed, the belt motor 102 is turned on (move1), to drive the wide belt 7. Then, in order to set an image edge signal to be ON when the leading edge of the original reaches a predetermined position, an image edge on counter starts to count the belt excitation clock signals (move2), and the flow is on standby until the counting terminates (move3). At this time, the excitation clock signal is output based on running read speed data (V) from the body 1, to control the belt motor to operate at constant speed.

If the counting by the image edge on counter terminates (move3), the image edge signal is set to be ON (move4), and an image edge off timer starts (move5). When the body 1 of the copy machine receives the image edge signal being ON, it calculates a period of time passing until the leading edge of the original reaches the optical system fixed position in the running reading and then performs the actual image reading. If a predetermined time previously set in the image edge off timer passes (move6), the image edge signal being ON is set to be OFF (move7). At a time when the trailing edge of the original passed through the reading position, the belt motor 102 is turned off (move8).

It should be noted that the running reading speed data (V) may be equal to or different from the reading speed (i.e., image formation speed: V1) when moving the optical system. In a case where V>V1 is set, the original image reading is completed within a time shorter than a time necessary for the ordinary optical system movement reading. Therefore, copy speed can be improved by applying the ADF of the present invention.

Size check process.

Figure 40:
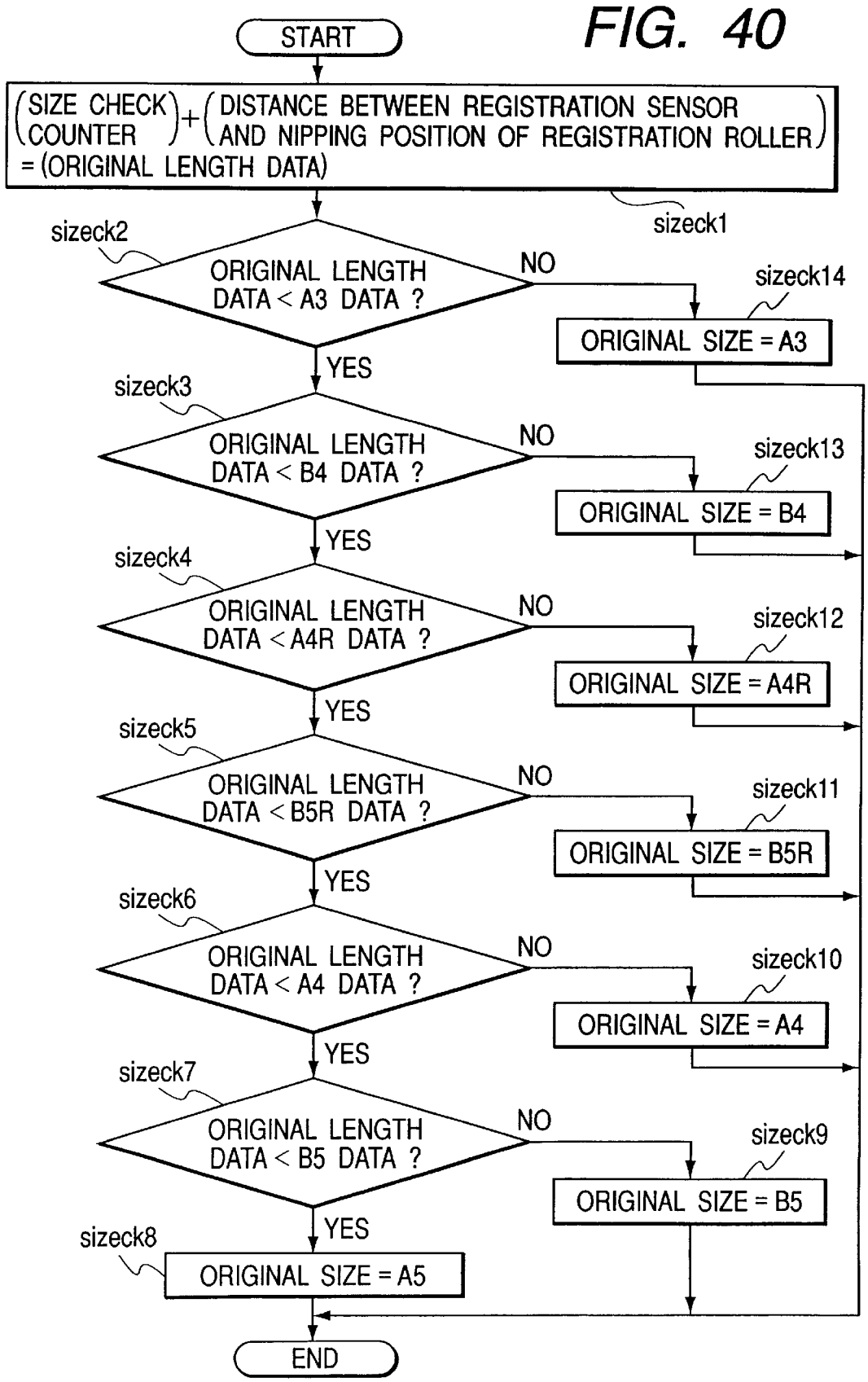
FIG. 40 is a flow chart showing an example of a size check process procedure.

FIG. 40 is the flow chart showing an example of a procedure of the above-described size check process. In the size check process, the true original size (i.e., original length in feed direction) is initially corrected by adding the distance between the nipping point of the second feed roller 9 and the paper feed sensor 35 to the data obtained by the size check counter, so as to calculate original length data (sizeck1). In this process, the original is carried by the roller 9 and the belt 7, and the carrying quantity surely coincides with the count value based on the belt excitation clock signal.

If the original length data is judged to be not shorter than "A3" (sizeck2), the original size is judged to be "A3" (sizeck14).

If the original length data is judged to be shorter than "A3" but not shorter than "B4" (sizeck3), the original size is judged to be "B4" (sizeck13).

If the original length data is judged to be shorter than "B4" but not shorter than "A4R" (sizeck4), the original size is judged to be "A4R" (sizeck12).

If the original length data is judged to be shorter than "A4R" but not shorter than "B5R" (sizeck5), the original size is judged to be "B5R" (sizeck11).

If the original length data is judged to be shorter than "B5R" but not shorter than "A4" (sizeck6), the original size is judged to be "A4" (sizeck10).

If the original length data is judged to be shorter than "A4" but not shorter than "B5" (sizeck7), the original size is judged to be "B5" (sizeck9).

If the original length data is judged to be shorter than "B5" (sizeck7), the original size is judged to be "A5" (sizeck8).

<Second Embodiment>

Figure 44:
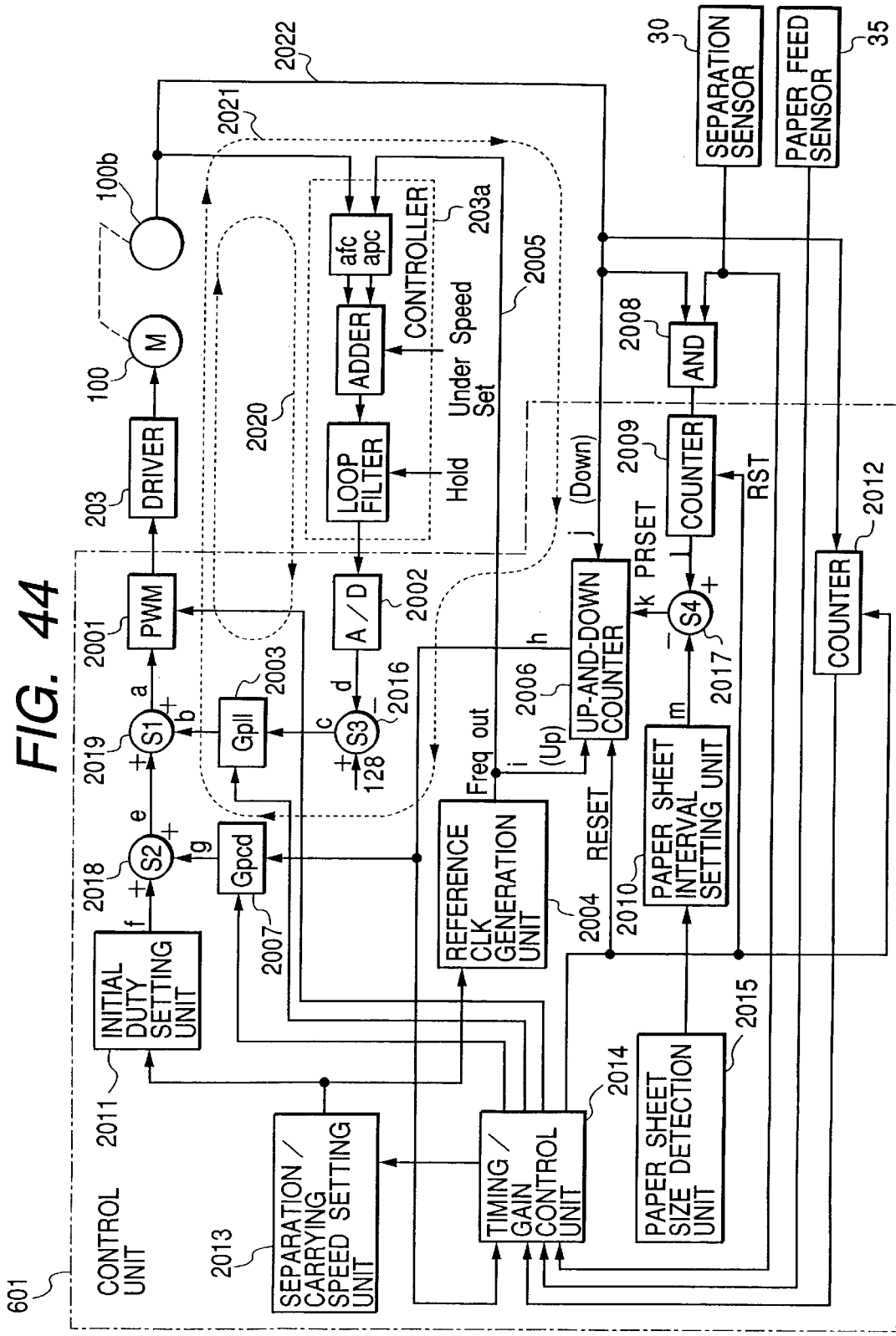
FIG. 44 is a block diagram showing a structure of a second embodiment of the present invention.

FIG. 44 is a block diagram showing the second embodiment of the present invention. In FIG. 44, numerals 30, 35, 203 and 203a denote the parts respectively identical with those in FIGS. 27A and 27B, and numerals 100 and 100b denote the parts respectively identical with those in FIG. 4. Numeral 601 denotes a control unit which drives and controls the separation motor 100 by using a speed control loop 2020 and a movement quantity control loop 2021.

The control unit 601 will be explained. Numeral 2014 denotes a timing/gain control unit which performs separation control in an original feed sequence. For example, the unit 2014 designates separation operation timing in response to the detection by the separation sensor 30, determines a gain of a speed control period loop in each separation operation, and clears each counter. Numeral 2013 denotes a separation/carrying speed setting unit which sets a condition for each unit according to a separation operation, a carrying operation, a sync operation with a second feed roller 9, and image reading speed. Numeral 2004 denotes a reference clock generation unit which generates a reference clock 2005 for speed control of the separation motor 100. The clock 2005 is output in relation to an excitation clock frequency of a stepping motor 101 for driving the second feed roller 9. Numeral 2006 denotes an up-and-down counter which outputs a difference between the reference clock 2005 from the reference clock generation unit 2004 and a separation clock 2022 from the separation clock sensor 100b. Numeral 2007 denotes a pulse counter loop gain setting unit (Gpcd) which sets a loop gain of the movement quantity control loop 2021 according to the difference output from the counter 2006. Numeral 2011 denotes an initial duty setting unit which sets a duty corresponding to an initial rotation control voltage of the separation motor 100, in accordance with the condition set by the separation/carrying speed setting unit 2013. Numeral 2018 denotes a calculation unit which adds the loop gain set by the setting unit 2007 and the duty set by the setting unit 2011 together.

Numeral 2002 denotes an A/D converter which converts an analog signal from a controller 202a into a digital signal. Numeral 2016 denotes a calculation unit which calculates a difference between the output from the A/D converter 2002 and a predetermined reference value (123 in this case). Numeral 2003 denotes a phase-locked loop (PLL) loop gain setting unit (Gpll) which sets the loop gain of the speed control loop 2020 on the basis of the difference obtained by the calculation of the calculation unit 2016. Numeral 2019 denotes a calculation unit which adds an added result of the calculation unit 2018 and an output of the PLL loop gain setting unit 2003 together.

Numeral 2001 denotes a pulse width modulation (PWM) control unit which controls a current carrying ratio to the separation motor 100 through the driver 203 according to a calculated result of the calculation unit 2019.

Numeral 2008 denotes an AND gate which outputs the reference clock 2005 while the separation sensor is being OFF. Numeral 2009 denotes a counter which counts the clocks output from the AND gate 2008. Numeral 2015 denotes a paper sheet size detection unit which detects a paper sheet size on the basis of a value obtained by a sensor on a tray, the number of carrying clocks in the original carrying, and the like. Numeral 2010 denotes a paper sheet interval setting unit which calculates an appropriate paper sheet interval on the basis of the paper sheet size detected by the paper sheet size detection unit 2015. Numeral 2017 denotes a calculation unit which calculates a difference between the paper sheet interval set by the setting unit 2010 and a counted value of the counter 2009. Namely, the calculation unit 2017 calculates preset data of the up-and-down counter 2006.

Numeral 2012 denotes a counter which counts the separation clocks 2022 from the separation clock sensor 100b, and outputs a counted value to the timing/gain control unit 2014. The up-and-down counter 2006 and the counter 2009 are simultaneously reset in response to a reset signal from the timing/gain control unit 2014.

Explanation of speed control loop 2020.

The speed control loop 2020 is composed of the separation clock sensor 100b, the controller 203a, the A/D converter 2002, the calculation unit 2016, the PLL loop gain setting unit 2003, the calculation unit 2019, the PWM control unit 2001, the driver 203, and the separation motor 100. In the loop 2020, known PLL speed control for the separation motor 100 is performed to synchronize frequencies and phases between the reference clock 2005 and the separation clock 2022 from an encoder. As described above, the loop gain of the loop 2020 can be set by the setting unit 2003, and can be changed according to modes. Further, if necessary, the loop 2020 can be made ineffective. The speed control loop 2020 becomes effective mainly when the original is nipped and carried by the first and second feed rollers 16 and 9. Thus, it becomes possible to perform sync carrying of the original.

Explanation of movement quantity control loop 2021.

The movement quantity control loop 2021 is composed of the separation clock sensor 100*b*, the up-and-down counter 2006, the pulse counter loop gain setting unit 2007, the calculation units 2018 and 2019, the pulse width modulation control unit 2001, the driver 203, and the separation motor 100.

The loop 2021 is to control movement quantity of a subsequent original. Thus, in the loop 2021, the interval between the preceding and subsequent originals is controlled to have the value equal to that set by the paper sheet interval setting unit 2010. That is, if the leading edge of the subsequent original is detected by the separation sensor 30, the difference between the counted value of the counter 2009 and the output of the paper sheet interval setting unit 2010 is simultaneously calculated by the calculation unit 2017. Then, the calculated difference is preset in the up-and-down counter 2006. After then, if the presetting of the difference completes, the counter 2006 starts to perform the counting.

The reference clock 2005 corresponding to the movement quantity of the preceding original is input to an upcount input of the counter 2006, and the separation clock 2022 corresponding to the movement quantity of the subsequent original is input to a downcount input thereof. Since the movement quantity is controlled such that the output of the counter 2006 becomes zero (i.e., difference between movement quantity of preceding original and movement quantity of subsequent original becomes zero), variations of the paper sheet intervals that occurred in the original carrying can be collectively corrected. If the value of the counter 2006 is equal to or smaller than a predetermined value, positional correction of the subsequent original is completed, and the interval between the preceding and subsequent originals (i.e., sheet-to-sheet distance) becomes the value substantially equal to that set by the paper sheet interval setting unit 2010.

Then, the movement quantity of the subsequent original is controlled by the first feed roller 16 such that the sheet-to-sheet distance becomes constant. As a result, the rotational speed of the first feed roller 16 is controlled to become identical with that of the second feed roller 9, whereby both the subsequent original and the preceding original move at the identical speed. However, since the speed between these two originals can not be highly precisely synchronized because of a control system, the movement quantity control loop 2021 is effective until the leading edge of the subsequent original reaches the second feed roller 9.

Since the position control loop gain can be changed by the pulse counter loop gain setting unit 2007, the loop gain can be made larger or smaller according to the operation mode. Further, if necessary, this loop can be made ineffective. For convenience, the structure of the control unit 601 has been explained in a hardware block diagram. However, the structure can be practically realized by peripheral functions of a CPU 201 and a control algorithm.

Separation motor control flow.

Figure 45:
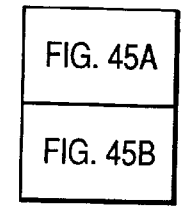
FIG. 45 comprised of FIGS. 45A and 45B is a flow chart showing a speed control change state of a separation motor 100.
Figure 45A:
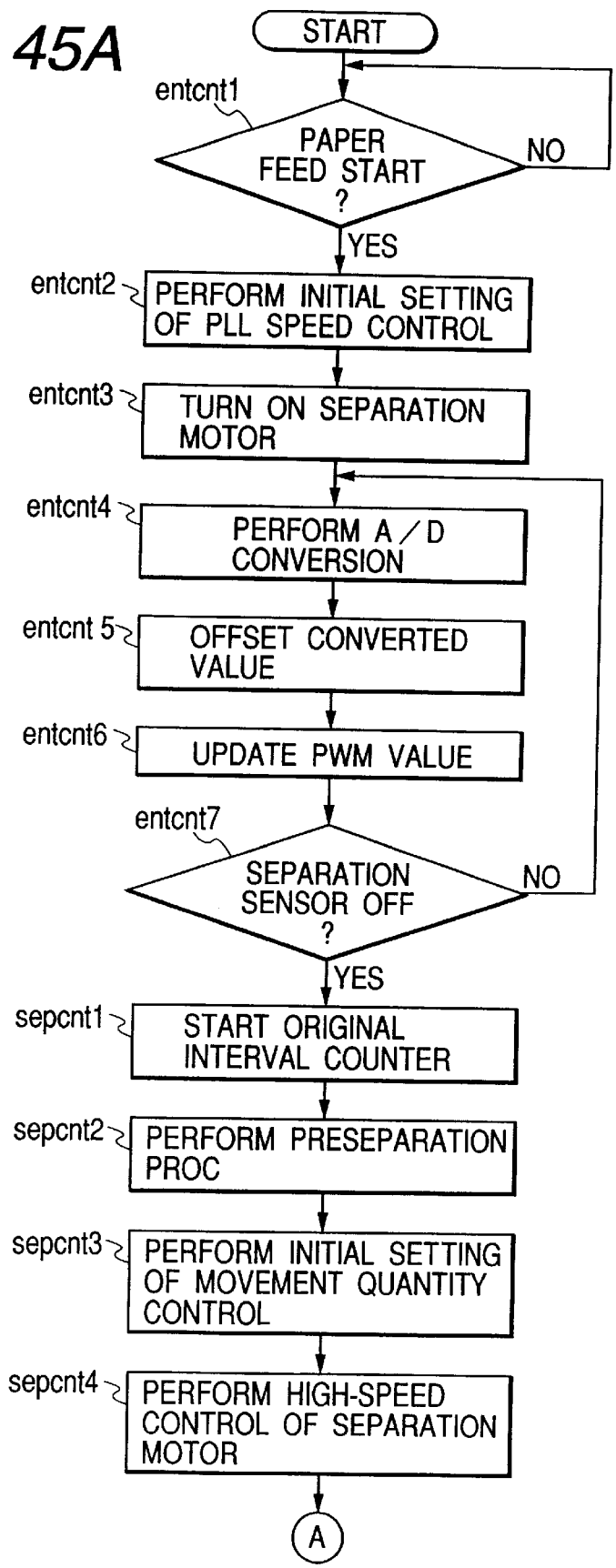
Figure 45B:
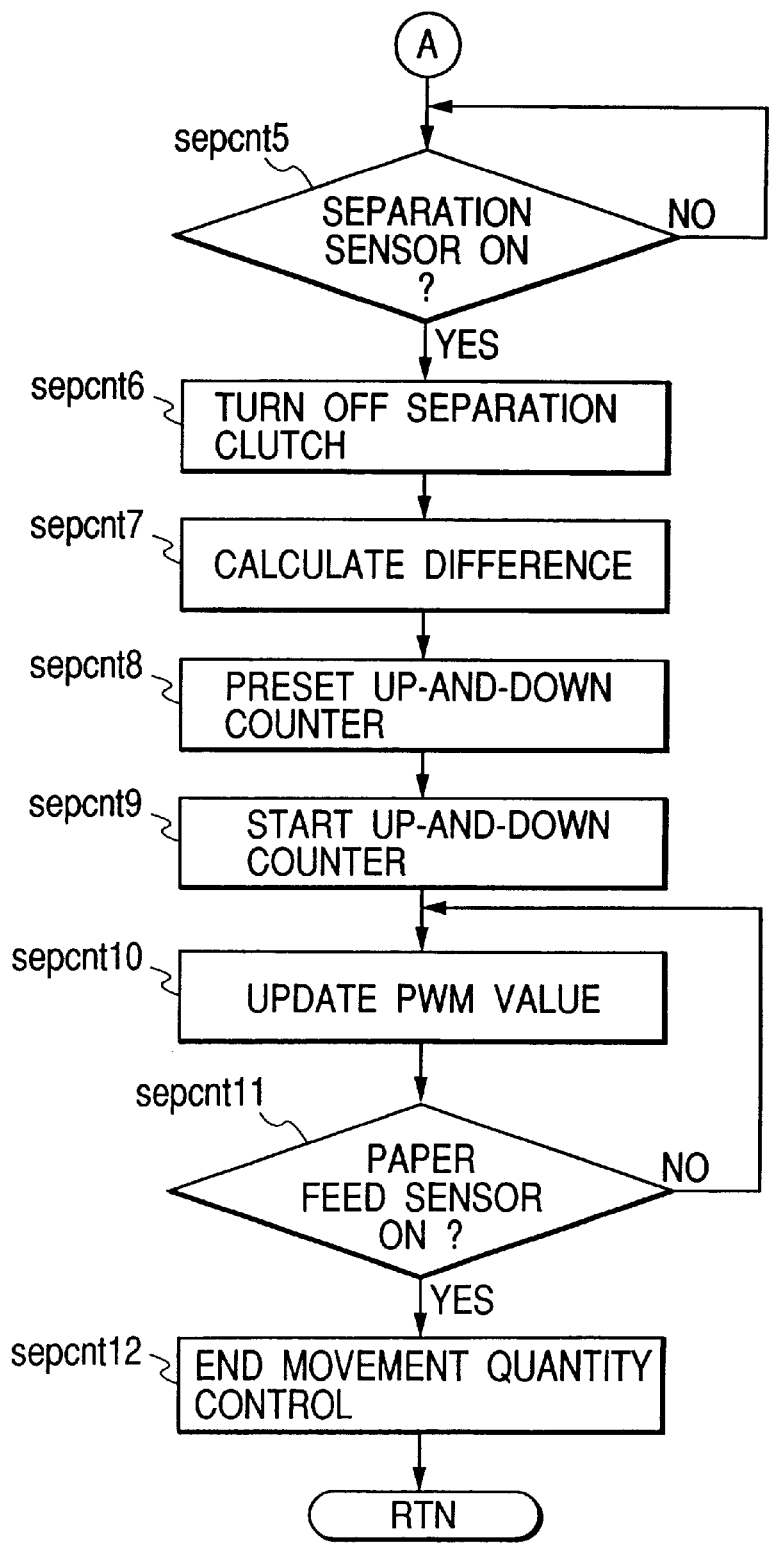
Figure 46:
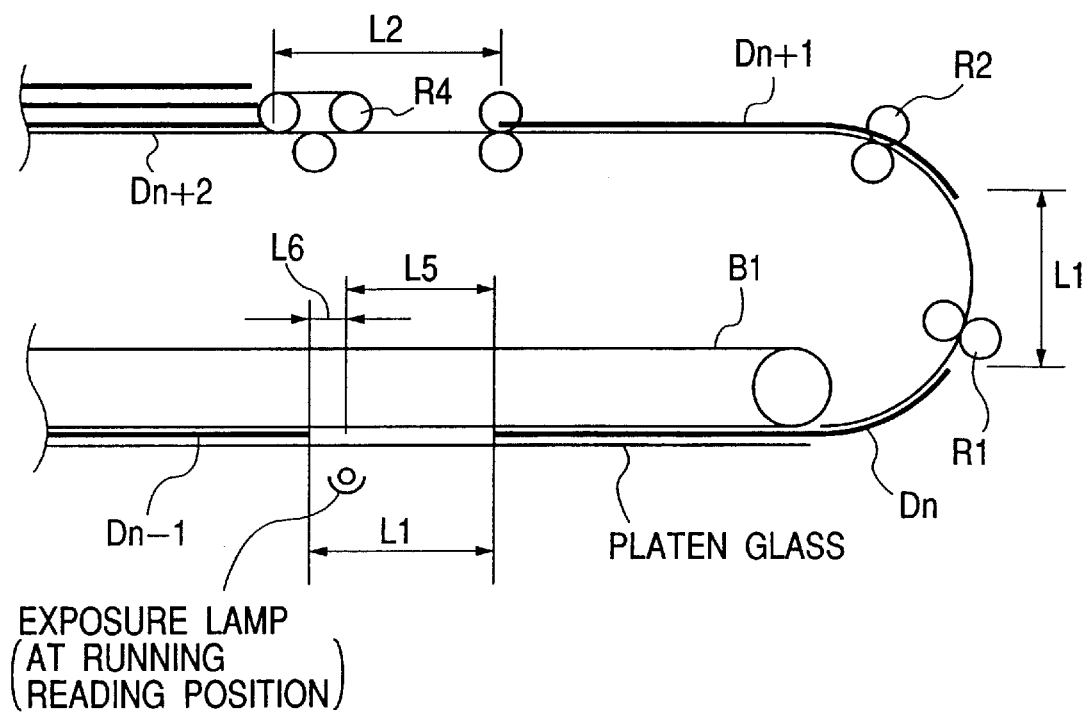
FIG. 46 is a view for explaining original feed control in conventional running reading.

FIGS. 45A and 45B are the flow charts showing a speed control change state of the separation motor 100.

This flow chart shows a control state in a case where the originals are continuously separated and fed. The flow starts from the paper feed process (FIGS. 35A and 35B) for the uppermost sheet original of the sheaf stacked on the tray.

Initially, the flow is on standby until the paper feed process starts (entcnt1). If the paper feed process starts, then the PLL speed control loop 2020 is made effective, the reference clock for the PLL control is output, and the value corresponding to an initial voltage applied to the separation motor 100 is set in a PWM register (entcnt2). Then, the separation motor 100 is turned on (entcnt3), and the output voltage from a phase/frequency comparator is A/D converted at periodic intervals (entcnt4). The A/D converted value is offset by predetermined quantity (entcnt5), and the offset value is multiplied by a certain coefficient (Gpll). Then, the obtained value is added to the PWM value corresponding to the initial voltage (entcnt6), and the obtained new voltage is applied to the separation motor 100 to change the rotational speed thereof.

Subsequently, the flow is on standby until the trailing edge of the preceding original passes through the separation sensor 30 (entcnt7). While the preceding original is being monitored by the sensor 30, the flow returns to the step entcnt4 to repeat the update of the PWM value to control the separation motor 100 to operate at uniform speed.

If the trailing edge of the preceding original passed through the sensor 30, the movement quantity control process starts. That is, since a sheet-to-sheet interval counter register is reset and then starts to operate, the reference clock is input to the counter to perform a count-up operation. The counted value is corresponds to the distance between the separation sensor 30 and the trailing edge of the preceding original (sepcnt1). Then, a paper feed roller 5 is lowered, and a preseparation process including connection of a separation clutch 106 and the like is performed (sepcnt2).

In this state, the first and second feed rollers 16 and 9 cooperate to carry the preceding original, and the PLL speed control loop 2020 is effective.

Subsequently, initial setting is performed for a movement quantity control mode (sepcnt3). That is, an up-and-down counter register is reset, a sheet-to-sheet interval control value is set in a sheet-to-sheet interval register, the reference clock corresponding to carrying quantity of the preceding original is output, and the value corresponding to the voltage applied for rotating the motor 100 at high speed is set in the PWM register. Then, the speed control mode for the separation motor 100 is changed to the movement quantity control loop 2021. By such change, the PWM modulated initial voltage for high-speed rotation is applied to the motor 100, whereby the operation speed of the motor 100 is increased (sepcnt4).

If the leading edge of the subsequent original is detected by the separation sensor 30 (sepcnt5), the separation clutch 106 is turned off (sepcnt6). Since the AND circuit 2008 prohibits inputting the clock to the original interval counter, the counter value corresponding to the interval between the preceding and subsequent originals is maintained. Further, the difference between the value of the original interval counter and the sheet-to-sheet interval control value of the sheet-to-sheet interval register is calculated (sepcnt7), and the calculated result (objective sheet-to-sheet interval) is preset in the up-and-down counter (sepcnt8). The up-and-down counter performs the count-up operation on the basis of the reference clock, and performs a count-down operation on the basis of the separation clock 100*b* (sepcnt9). The value of the up-and-down counter is read at constant timing, multiplied by a certain coefficient (i.e., multiplied by Gpcd), and then added to the PWM value corresponding to the initial voltage (sepcnt10). Thus, since the new voltage is applied to the separation motor 100, the rotational speed of the motor 100 changes.

If it is detected that the leading edge of the subsequent original reaches the paper feed sensor 35 (sepcnt11), the movement quantity control terminates (sepcnt12). Then, the original bias correction already explained in the separation process flow chart of FIG. 34 is performed. On the other hand, if the paper feed sensor 35 does not detect the subsequent original, the flow returns to the step sepcnt10, and the updating of the PWM value continues.

By this control, in the case where the original is carried only by the separation unit (i.e., paper feed roller 5, separation carrying roller 8, and first feed roller 16), speed control is performed sacrifices the rotational accuracy of the first feed roller 16 but attaches importance to the condition that the sheet-to-sheet interval is equal to or shorter than a prescribed value. On the other hand, in the case where the original is fed by the first and second feed rollers 16 and 9 simultaneously, speed control is performed that gives priority to the rotational accuracy of the first feed roller 16. Therefore, it is possible to prevent the inconvenience that the original is inappropriately attracted by both the first and second feed rollers 16 and 9.

As explained above, according to the above structure, productivity can be enhanced.

Further, according to the above structure, accuracy of the sheet-to-sheet distance can be more improved.

What is claimed is:

1. An original carrying apparatus comprising:

separation means for separating one original from a plurality of stacked originals;

first carrying means for carrying the original separated by said separation means;

second carrying means for receiving the original carried by said first carrying means, and carrying the original in a state where the plurality of stacked originals are being held; and control means for performing control to set an interval between two of the plurality of originals carried by said second carrying means to be a first distance, wherein said control means performs the control to set the interval between the two originals to be the first distance after setting it to be a second distance shorter than the first distance, by using said first carrying means.

2. An apparatus according to claim 1, wherein said control means drives said second carrying means at a first speed when the original carried by said second carrying means passes through an exposure position.

3. An apparatus according to claim 2, wherein the original is exposed and scanned while it is passing through the exposure position.

4. An apparatus according to claim 2, wherein said control means drives said second carrying means at a second speed faster than the first speed, before the original carried by said second carrying means reaches the exposure position.

5. An apparatus according to claim 4, wherein said control means accelerates said second carrying means up to the second speed, decelerates the second speed to the first speed, and then drives said second carrying means at the first speed, before the original carried by said second carrying means reaches the exposure position.

6. An apparatus according to claim 1, wherein said control means intermittently drives said second carrying means.

7. An apparatus according to claim 6, wherein said control means starts to drive said first carrying means after starting to drive said second carrying means.

8. An apparatus according to claim 7, wherein said first carrying means comprises a roller, and said control means starts to drive said first carrying means in a state where a leading edge of the original abuts against a nipping portion of said roller.

9. An apparatus according to claim 1, wherein said second carrying means is a carrying belt.

10. An apparatus according to claim 1, wherein said second carrying means carries the original such that the original moves on a platen glass of a copy machine.

* * * * *

UNITED STATES PATENT AND TRADEMARK OFFICE
CERTIFICATE OF CORRECTION

PATENT NO.   : 6,203,003 B1
DATED        : March 20, 2001
INVENTOR(S)  : Chikara Sato et al.

It is certified that error appears in the above-identified patent and that said Letters Patent is hereby corrected as shown below:

Column 9,
Line 50, "slips" should read -- it slips --.

Column 10,
Line 64, "a" ($2^{nd}$ occurrence) should read -- an --.

Column 12,
Line 20, "[explanation" should read -- Explanation --, "operation]" should read -- operation. --.

Column 17,
Line 5, "completes," should read -- is completed, --.

Column 23,
Line 42, "completes." should read -- is completed. --.
Line 43, "completes" should read -- is completed --.

Signed and Sealed this

Eighth Day of January, 2002

*Attest:*

JAMES E. ROGAN
*Attesting Officer*   *Director of the United States Patent and Trademark Office*